US011215392B2

(12) United States Patent
Lim et al.

(10) Patent No.: US 11,215,392 B2
(45) Date of Patent: Jan. 4, 2022

(54) REFRIGERATOR

(71) Applicant: Samsung Electronics Co., Ltd., Suwon-si (KR)

(72) Inventors: Kyoung Ae Lim, Seoul (KR); Yoo Lim Baek, Seoul (KR); Mi A Oh, Seongnam-si (KR); Sae Mi Kim, Goyang-si (KR); Da Hey Yoo, Seoul (KR); Kyung Hoon Lee, Seoul (KR); Tae Hyoung Cho, Seoul (KR); Jung Hwi Eun, Suwon-si (KR); Ye Kyung Yoo, Seoul (KR); Mun Keun Lee, Yongin-si (KR); Young Bin Jung, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/329,886

(22) Filed: May 25, 2021

(65) Prior Publication Data

US 2021/0278124 A1 Sep. 9, 2021

Related U.S. Application Data

(63) Continuation of application No. 16/406,727, filed on May 8, 2019, which is a continuation of application
(Continued)

(30) Foreign Application Priority Data

Sep. 3, 2015 (KR) .................. 10-2015-0124702
Dec. 23, 2015 (KR) .................. 10-2015-0184542

(51) Int. Cl.
*F25D 11/02* (2006.01)
*F25D 23/02* (2006.01)
(Continued)

(52) U.S. Cl.
CPC .......... *F25D 23/028* (2013.01); *F25D 29/00* (2013.01); *G06Q 10/0875* (2013.01);
(Continued)

(58) Field of Classification Search
CPC ...................................................... G06F 3/167
See application file for complete search history.

(56) References Cited

U.S. PATENT DOCUMENTS 9,679,563 B2 * 6/2017 Lee .................... G10L 15/22
9,965,798 B1 5/2018 Vaananen
(Continued)

FOREIGN PATENT DOCUMENTS

CN 103712410 A 4/2014
JP 6221048 B2 11/2017
(Continued)

OTHER PUBLICATIONS

Machine Translation of JP 2014-196847 to Nakamuta et al., eSpacenet, description, all pages (Year: 2014).*
(Continued)

*Primary Examiner* — Filip Zec
(74) *Attorney, Agent, or Firm* — Jefferson IP Law, LLP

(57) ABSTRACT

A refrigerator provides visual information indicating a map of the refrigerator and technical operations of the corresponding regions. The refrigerator includes a voice recognition function using a proximity sensor. The refrigerator has input/output (I/O) management functions for foods stored therein. The refrigerator communicates with a peripheral device over a network.

20 Claims, 47 Drawing Sheets

Related U.S. Application Data

No. 15/516,574, filed as application No. PCT/KR2016/009390 on Aug. 24, 2016, now Pat. No. 10,436,498.

(51) Int. Cl.
  *F25D 29/00* (2006.01)
  *G06Q 10/08* (2012.01)
  *G06F 3/16* (2006.01)

(52) U.S. Cl.
  CPC ........ *F25D 11/02* (2013.01); *F25D 2400/361* (2013.01); *F25D 2500/06* (2013.01); *F25D 2600/02* (2013.01); *F25D 2700/02* (2013.01); *F25D 2700/04* (2013.01); *G06F 3/167* (2013.01)

(56) References Cited

U.S. PATENT DOCUMENTS

| | | | | |
|---|---|---|---|---|
| 9,972,342 | B2 * | 5/2018 | Furuta | G10L 25/51 |
| 10,436,498 | B2 | 10/2019 | Lim et al. | |
| 2006/0154642 | A1 * | 7/2006 | Scannell, Jr. | G08B 7/066 |
| | | | | 455/404.1 |
| 2010/0088100 | A1 * | 4/2010 | Lindahl | G10L 15/30 |
| | | | | 704/270.1 |
| 2011/0126119 | A1 * | 5/2011 | Young | G06F 3/048 |
| | | | | 715/744 |
| 2011/0131291 | A1 * | 6/2011 | Hon-Anderson | G10L 15/30 |
| | | | | 709/217 |
| 2012/0260683 | A1 | 10/2012 | Cheon et al. | |
| 2012/0265348 | A1 | 10/2012 | Kim et al. | |
| 2013/0067375 | A1 | 3/2013 | Kim et al. | |
| 2014/0028918 | A1 * | 1/2014 | Kim | H04N 21/4222 |
| | | | | 348/564 |
| 2014/0045433 | A1 | 2/2014 | Kim | |
| 2014/0169640 | A1 | 6/2014 | Park et al. | |
| 2015/0161909 | A1 | 6/2015 | Won et al. | |
| 2016/0182864 | A1 | 6/2016 | Izawa et al. | |
| 2017/0039511 | A1 | 2/2017 | Corona et al. | |
| 2017/0076716 | A1 * | 3/2017 | Lee | G10L 15/19 |
| 2017/0205138 | A1 | 7/2017 | Hwang et al. | |
| 2018/0114529 | A1 | 4/2018 | Gerner | |
| 2018/0137462 | A1 | 5/2018 | Zohar et al. | |
| 2018/0189027 | A1 * | 7/2018 | Jeon | F25D 29/00 |

FOREIGN PATENT DOCUMENTS

| | | |
|---|---|---|
| KR | 10-2000-0073574 A | 12/2000 |
| KR | 10-0568242 B1 | 4/2006 |
| KR | 10-2006-0104364 A | 9/2006 |
| KR | 10-0764281 B1 | 10/2007 |
| KR | 10-2007-0116336 A | 12/2007 |
| KR | 10-0901020 B1 | 6/2009 |
| KR | 10-2010-0047707 A | 5/2010 |
| KR | 10-2012-0116750 A | 10/2012 |
| KR | 10-2014-0093045 A | 7/2014 |

OTHER PUBLICATIONS

European Office Action dated Jan. 17, 2019; Application #/Patent#: 16842185.7-100913287723 PCT/KR/2016009390.

European Search Report dated Oct. 4, 2018, issued in European Patent Application No. 16842185.7.

Chinese Office Action dated Dec. 26, 2019, issued in Chinese Patent Application No. 201680035898.3.

European Office Action dated Mar. 17, 2020, issued in European Patent Application No. 16842185.7.

Chinese Office Action dated Sep. 16, 2020, issued in Chinese Application No. 201680035898.3.

* cited by examiner

REFRIGERATOR

CROSS-REFERENCE TO RELATED APPLICATION(S)

This application is a continuation application of prior application Ser. No. 16/406,727, filed on May 8, 2019, which is a continuation application of prior application Ser. No. 15/516,574, filed on Apr. 3, 2017 and has issued as U.S. Pat. No. 10,436,498 on Oct. 8, 2019, which is a U.S. National Stage application under 35 U.S.C. § 371 of an International application number PCT/KR2016/009390, filed on Aug. 24, 2016, which was based on and claimed priority of a Korean patent application number 10-2015-0124702, filed on Sep. 3, 2015, in the Korean Intellectual Property Office, and of a Korean patent application number 10-2015-0184542, filed on Dec. 23, 2015, in the Korean Intellectual Property Office, the disclosure of each of which is incorporated by reference herein in its entirety.

TECHNICAL FIELD

Embodiments of the present disclosure relate to a refrigerator.

BACKGROUND ART

Generally, a refrigerator stores foods or beverages (hereinafter referred to as "stored goods") in a fresh state for a long time using cool air. The refrigerator generally classifies a storage chamber into a refrigerating chamber for storing the stored goods at a temperature above zero and a freezing chamber for storing the stored goods at a temperature below zero.

The refrigerator includes a compressor, a condenser, an expansion valve, and an evaporator in a machine room, such that the refrigerator repeatedly performs a cooling cycle for sequentially performing compression→condensation→expansion→evaporation of a refrigerant.

The refrigerator can allow the inner space of the storage chamber to be kept at a freezing or refrigerating temperature using cool air heat-exchanged in the evaporation process of the cooling cycle.

Recently, due to improvement in the standard of living, storage capacity of the refrigerator is rapidly increasing to store more various and much more stored goods, such that functions have become more diversified for improvement of user convenience.

DISCLOSURE

Technical Problem

An object of the present disclosure is to provide a refrigerator for providing visual information indicating a map of the refrigerator and technical operations of the corresponding regions.

Another object of the present disclosure is to provide a refrigerator configured to include a voice recognition function using a proximity sensor.

Another object of the present disclosure is to provide a refrigerator having input/output (I/O) management functions for foods stored therein.

Another object of the present disclosure is to provide a refrigerator configured to communicate with a peripheral device over a network.

Technical Solution

The objects of the present disclosure can be achieved by providing a refrigerator including: a main body; a display provided in the main body; and a controller configured to control the display, wherein, if a predetermined condition is satisfied, the display is configured to display a refrigerator management screen image including a refrigerator map.

The refrigerator may further include: a sensing part configured to detect an opening or closing state of a refrigerator door, wherein the controller, if the sensing part detects the opening or closing state of the refrigerator door, is configured to display the refrigerator management screen image.

If the sensing part detects the opening or closing state of the refrigerator door, the controller may be configured to control the display in a manner that constant temperature technology is visualized and displayed on the display.

The display may be configured to display the refrigerator management screen image for visualizing/providing a state of the refrigerator.

The display may be configured to display the list of recommended foods per indoor temperature in the vicinity of the refrigerator map.

The refrigerator may further include: a button part located in the vicinity of the display.

The refrigerator may further include a voice input part configured to collect a voice command of a user.

The display may be configured to display a process for recognizing user voice commands collected by the voice input part.

The refrigerator may further include a sensing part configured to detect user approach in the vicinity of the refrigerator.

The controller may be configured to activate the voice input part on the basis of user approach information collected by the sensing part.

In accordance with another aspect of the present disclosure, a refrigerator includes: a capturing part configured to capture bar codes provided to foods or a packing container of the foods; a display configured to display food information collected by the capturing part; and a controller configured to generate food information collected by the capturing part, and control the display to display the generated food information.

The display may be configured to display at least one preset tag on a preset tag region provided to an upper end of a screen image of the display, and may display images of foods stored in each chamber on a food display region provided at a lower end of the preset tag region.

The controller may be configured to control the display in a manner that a reminder tag is established in the vicinity of the food image on the basis of a user input regarding the preset tag.

The display may be configured to display a list of foods stored in a refrigerating chamber on a refrigerating chamber management region, may display the list of foods stored in a freezing chamber on a freezing chamber management region, and may display a list of foods stored in a temperature changeable chamber on a temperature changeable chamber management region.

The controller may be configured to generate a shopping list on the basis of the generated food information, and may control the display to display the generated shopping list.

The refrigerator may further include a communication part configured to communicate with an external device.

The communication part may be configured to transmit the generated food information to the external device upon receiving a request from the external device.

Advantageous Effects

As is apparent from the above description, the refrigerator according to the embodiments of the present disclosure has the following effects.

First, the refrigerator can visualize functions thereof, and can provide the visualized functions to a user. Therefore, the user can easily recognize an indoor temperature of the storage chamber and a state of foods stored in the storage chamber.

The refrigerator includes a voice recognition function based on a proximity sensor so that the user can easily utilize necessary services.

The refrigerator can allow the user to easily manage foods stored in the storage chamber through food input/output and management functions.

In addition, the refrigerator can communicate with the peripheral device over the network, resulting in high convenience of general services (e.g., TV services) frequently used by the user.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
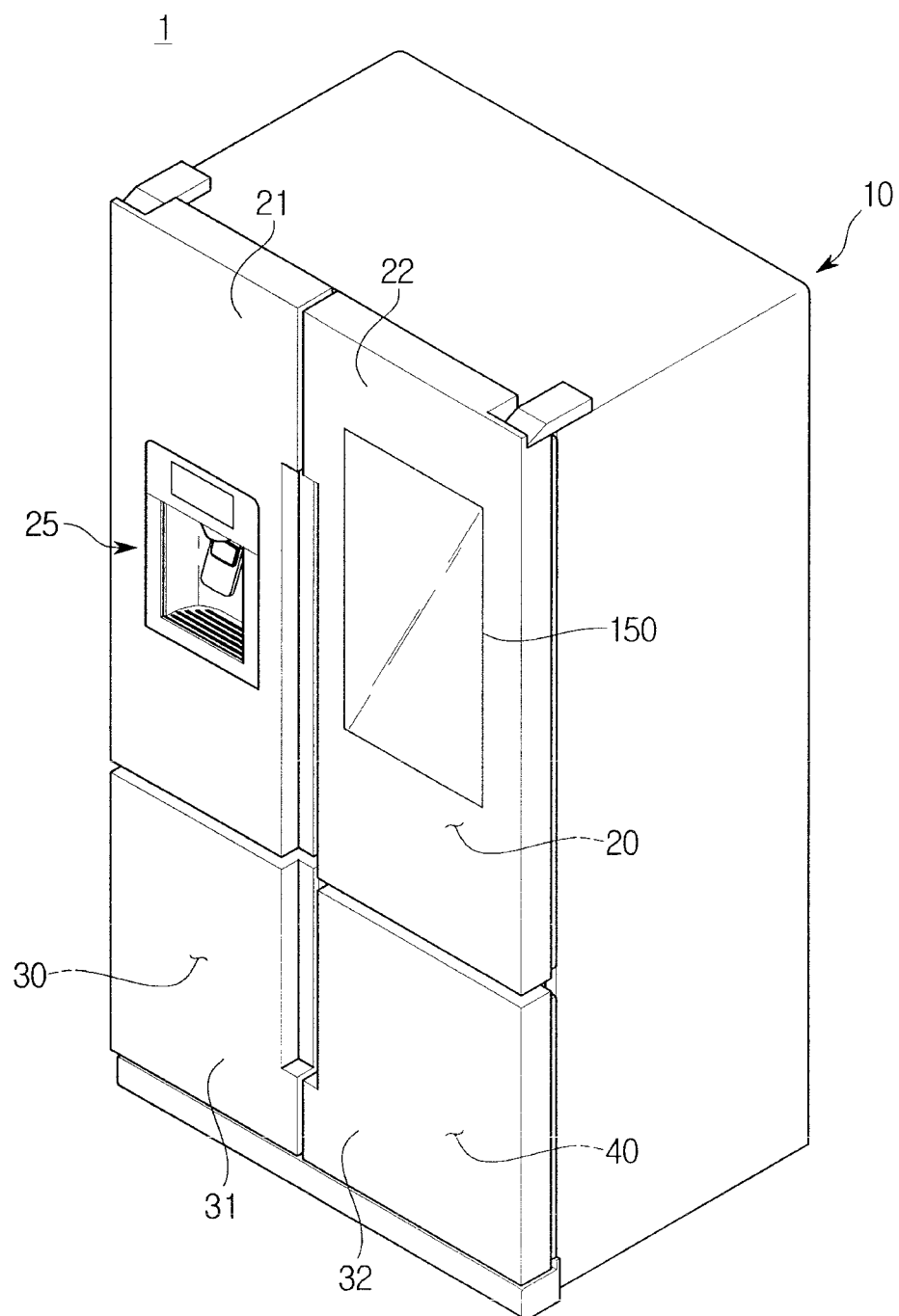
FIG. 1 is a perspective view illustrating a refrigerator according to an embodiment of the present disclosure.

Reference will now be made in detail to the embodiments of the present disclosure, examples of which are illustrated in the accompanying drawings, wherein like reference numerals refer to like elements throughout.

A refrigerator according to an embodiment may provide a refrigerator management function, may visualize technical information thereof, and may provide the visualized technical information.

Figure 2:
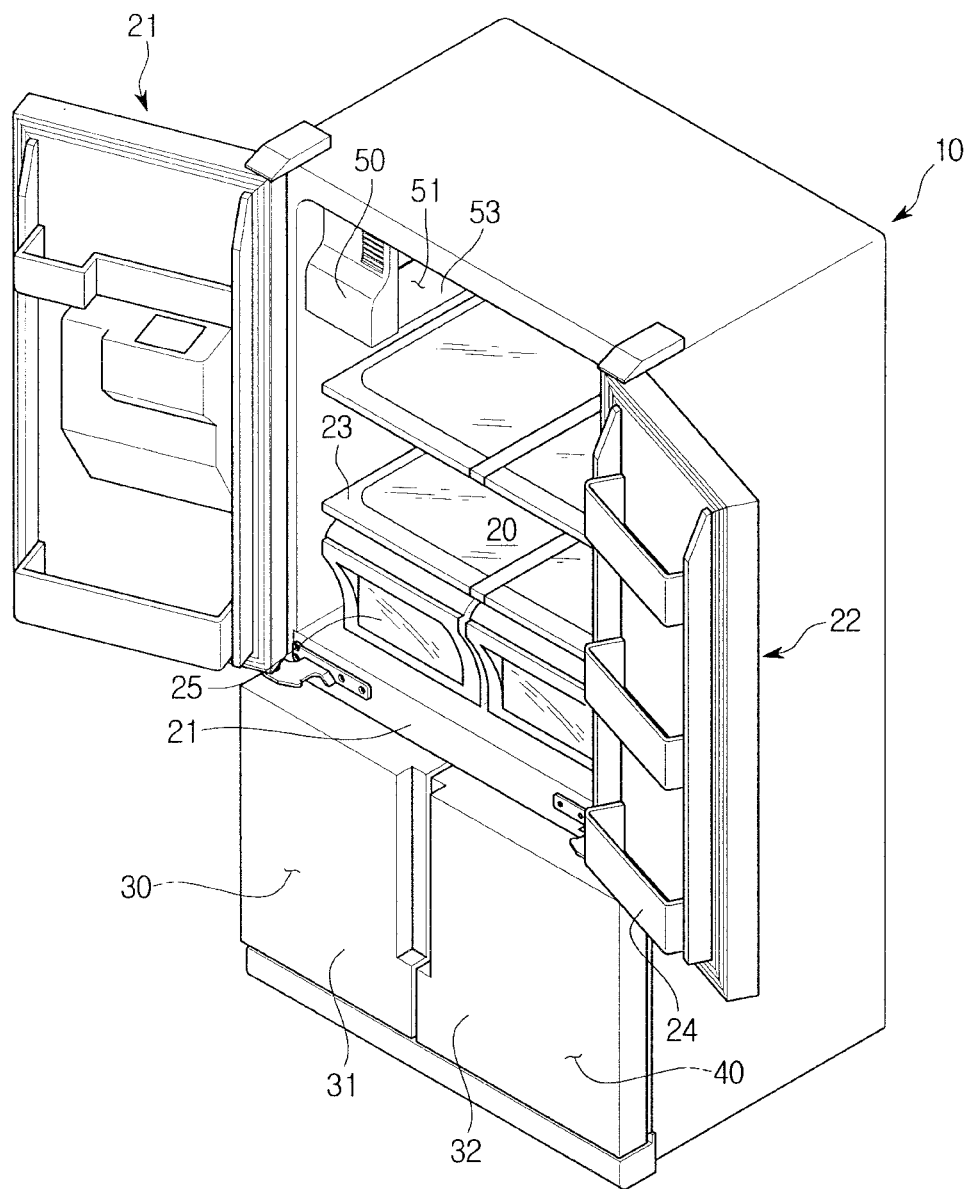
FIG. 2 is a perspective view illustrating an internal structure of the refrigerator shown in FIG. 1.

FIG. 1 is a perspective view illustrating a refrigerator 1 according to an embodiment of the present disclosure. FIG. 2 is a perspective view illustrating an internal structure of the refrigerator 1 shown in FIG. 1.

Referring to FIGS. 1 and 2, the refrigerator 1 includes a main body 10, storage chambers (20, 30, 40) formed in the main body 10, and a cool air supply device (not shown) to supply cool air to the storage chambers (20, 30, 40).

The main body 10 may include an inner casing to form the storage chambers (20, 30, 40); an outer casing coupled to the exterior of the inner casing so as to form the exterior appearance of the refrigerator 1; and insulation disposed between the inner casing and the outer casing so as to insulate the storage chambers (20, 30, 40).

The storage chambers (20, 30, 40) may be classified into an upper storage chamber 20 and lower storage chambers (30, 40) by a first intermediate partition 21. In addition, the lower storage chambers (30, 40) may be classified into a left storage chamber 30 and a right storage chamber 40 on the basis of the front surface of the refrigerator 1. For convenience of description, it is assumed that the upper storage chamber 20 is used as a refrigerating chamber, the left lower storage chamber 30 is used as a freezing chamber, and the right lower storage chamber 40 is used as a temperature changeable chamber.

The temperature of the refrigerating chamber 20 may be maintained at about 3° C. to keep foods in a cooled state, while the temperature of the freezing chamber 30 may be maintained at about −18.5° C. to keep foods in a frozen state. The temperature changeable chamber 40 may store foods therein by changing a temperature according to a user desire.

The refrigerating chamber 20 may be provided with a shelf 23 allowing food to be placed thereon, and at least one storage box 25 to store food in a sealed state.

Also, an ice-making chamber 51 to make ice may be provided at an upper corner of the refrigerating chamber 20, compartmentalized separately from the refrigerating chamber 20 by the ice-making chamber case 53. The ice-making chamber 51 may be provided with an ice-making tray to make ice, and an ice-making device 100 such as an ice bucket to store the ice made in the ice-making tray.

The refrigerating chamber 20 may be provided with a water tank 60 to retain water. The water tank 60 may be provided between storage boxes 25 as shown in FIG. 2, but embodiments of the present invention are not limited thereto. The water tank 60 may be placed at any position in the refrigerating chamber 20 so long as the position allows the water tank 60 to be cooled by the cool air in the refrigerating chamber 20.

The refrigerating chamber 20 and the freezing chamber 30 may respectively have open front surfaces for entrance/exit of food. The open front surfaces of the refrigerating chamber 20 may be opened or closed by doors (21, 22) hinged to the main body 10. The open front surfaces of the freezing chamber 30 and the temperature changeable chamber 40 may be opened or closed by the doors (31, 32) hinged to the main body 10. Door guards 24 for storing food therein may be provided at back surfaces of the refrigerating chamber doors (21, 22).

A gasket (not shown) for sealing a space between the main body 10 and the refrigerating chamber doors (21, 22) when the refrigerating chamber doors (21, 22) are closed may be provided to the rear borders of the refrigerating chamber doors (21, 22) so as to control cool air of the refrigerating chamber 20. In addition, a rotation bar (not shown) for locking or unlocking cool air of the refrigerating chamber 20 by sealing the space between the refrigerating chambers doors (21, 22) may be provided to any one of the refrigerating chamber doors (21, 22).

In addition, a sensing part 70 for sensing opening or closing of the doors of the refrigerator 1 may be provided to the rear borders of the storage chamber doors (21, 22, 31, 32). Although the sensing part 70 is implemented using a capacitive sensor, the scope or spirit of the sensing part 70 is not limited thereto.

In addition, one of the refrigerating chamber doors (21, 22) may be provided with a dispenser 90 allowing a user to dispense water or ice at the outside of the refrigerator without opening the refrigerating chamber door (21, 22).

A control panel 100 may be mounted to one of the refrigerating chamber doors (21, 22) such that the user located at the outside of the refrigerator can confirm a state of the refrigerator or can establish the operation conditions of the refrigerator 1 without opening the refrigerating chamber doors (21, 22). The control panel 100 is mounted to a large display having a size of about 20 inches, resulting in increased user convenience. However, the size of the control panel 100 is not limited to examples of the above-mentioned numerical values.

A refrigerator management screen mage S1 may be displayed on the display of the control panel 100. For example, when the doors of the refrigerator 1 are opened or closed, the display of the control panel 100 may display a refrigerator map (M) or may display functions related to the indoor setting region. In addition, the indoor operation state, the indoor cold airflow, the food optimum for each indoor temperature, the operation state of the dispenser 25, and the indoor temperature change caused by the door opening/closing of the refrigerator 1 may be visually displayed. Parts related to an exemplary display of the control panel 100 will hereinafter be described.

Figure 3:
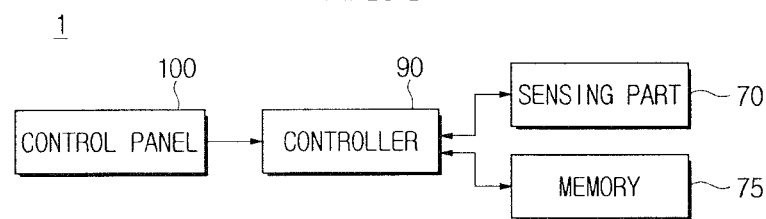
FIGS. 3 and 4 are control block diagrams illustrating the refrigerator according to an embodiment of the present disclosure.
Figure 4:
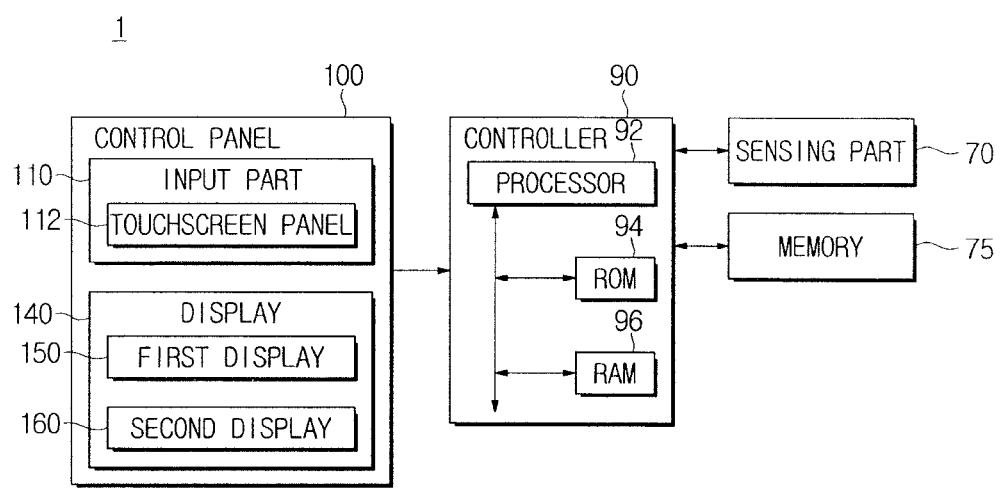

FIGS. 3 and 4 are control block diagrams illustrating the refrigerator 1 according to an embodiment of the present disclosure.

Referring to FIGS. 3 and 4, the refrigerator 1 may include a control panel 100, a sensing part 70, a memory 75, and a controller 90.

The control panel 100 may provide a user interface (UI). Therefore, the control panel 100 may be arranged at the front surfaces of the refrigerating chamber doors (21, 22) so that the user can easily approach and manipulate the control panel 100.

The control panel 100 may include the input part 110 for user manipulation, and a display 140 for providing the user with necessary information.

The input part 110 may receive a control command for the refrigerator 1 from the user. The input part 110 may also be implemented as a hard key for user input, a proximity sensor, a Graphical User Interface (GUI) such as a touch pad. If the input part 110 is implemented as a GUI such as a touch pad, the input part 110 is implemented as a touch-screen panel, so that the input part 110 and the display 140 may construct a dual-layer structure. For convenience of description, the following description assumes that the input part 110 is implemented as a touchscreen panel.

The display 140 may provide the user with visual information indicating the indoor setting region. The display 140 may include a display 150 to display state information of the refrigerator 1 and a display 160 to display state information of the dispenser 25. For clarity of the above-mentioned structure, the display 150 for displaying the state of the refrigerator 1 may be defined as a first display, and the display 160 for displaying the state of the dispenser 25 may be defined as a second display.

Although the first and second displays (150, 160) may display different screen images, a screen image of the first display 150 may also extend to the second display 160 as necessary. An example of the first display 150 will hereinafter be described with reference to the associated parts.

Each of the first and second displays (150, 160) may be implemented as any one of a Cathode Ray Tube (CRT), a Digital Light Processing (DLP) panel, a Plasma Display Panel, a Liquid Crystal Display (LCD) panel, an Electro Luminescence (EL) panel, an Electrophoretic Display (EPD) panel, an Electrochromic Display (ECD) panel, a Light Emitting Diode (LED) panel, and an Organic Light Emitting Diode (OLED) panel, without being limited thereto.

The sensing part 70 may collect the opening/closing information of the doors of the refrigerator. The sensing part 70 may collect information acquired when the user opens or closes the doors of the refrigerator 1. Although the sensing part 70 can collect the door opening/closing information of the refrigerator using the capacitive sensor or the like, the scope or spirit of the sensing part 70 is not limited thereto. The door opening/closing information collected by the sensing part 70 may be applied to the controller 90. The door opening/closing information applied to the controller 90 may be used as a trigger for displaying the refrigerator management screen image S1 of the first or second display 150 or 160.

The memory 75 may store various data, control programs or applications needed to drive or control the refrigerator 1. For example, the memory 75 may control the refrigerator 1, and may visualize a control screen image, such that it can store the refrigerator management program or application needed for visualization of the control screen image.

The memory 75 may store a User Interface (UI) related to the control program or application needed to control the refrigerator 1, objects (e.g., images, text, icons, buttons, etc.) needed to provide the UI, user information, documents, databases (DBs), and/or related data. For example, the memory 75 may store a 2D or 3D refrigerator map (M) image, and may visualize images and text needed to visualize a temperature or state of the storage chamber region as well as to provide the visualized information to the user.

Upon receiving a control signal from the controller 90, the memory 75 may store not only position information of a touch signal detected by the input part 110, but also position information of successive touch signals corresponding to successive touch movement.

The memory 75 may be implemented as at least one of a flash memory type, a hard disk type, a multimedia card micro card, a card type memory (e.g. a Secure Digital (SD) memory or an eXtreme Digital (XD) memory), a Random Access Memory (RAM), a Static Random Access Memory (SRAM)), a Read Only Memory (ROM), an Electrically Erasable Programmable Read Only Memory (EEPROM), a Programmable Read Only Memory (PROM), a magnetic memory, a magnetic disk, an optical disc, etc., without being limited thereto.

The controller 90 may control signal flow of the internal constituent elements of the refrigerator and overall operation of the refrigerator 1, and may perform data processing. If a control command of the user is input or a predetermined setting is satisfied, the controller 90 may execute the refrigerator management program or application stored in the memory 75.

The controller 90 may store the ROM 94 storing the control program or application for controlling the processor 92 and the refrigerator 1, and the RAM 96 storing the external input signal or data of the refrigerator 1 or used as a storage region corresponding to various tasks performed in the refrigerator 1. Hereinafter, the ROM 94 and RAM 96 of the controller 90 may conceptually include ROM and RAM of the memory 75.

The processor 92 may include a graphics processor for processing of images or video. The processor 92 may be implemented as an SoC (System On Chip) including a Core and a GPU. In accordance with the embodiment, the controller 90 may include a graphics processor constructed in a separate circuit board electrically connected to the controller 90, and a graphic processing board including ROM 94 or ROM 96.

If a user command is input or a predetermined condition is satisfied, the controller 90 may output first content corresponding to either the user command or the predetermined condition to the first and second displays (150, 160). If user touch is detected, the controller 90 changes the first content corresponding to the detected user touch to the synchronized second content, and outputs the second content to the first and second displays (150, 160).

The refrigerator management function of the refrigerator 1 according to the embodiments will hereinafter be described with reference to the example of the display 140 shown in FIGS. 5 to 16B.

Although FIGS. 5 to 16B are only examples of the screen image displayable on the display 140, the scope of the present disclosure is not limited to FIGS. 5 to 16B. Meanwhile, although the refrigerator management screen image of FIGS. 5 to 16B can be displayed on the first and second displays (150, 160) of the display 150, it is assumed that the refrigerator management screen image is provided to the first display 150 for convenience of description.

Figure 5:
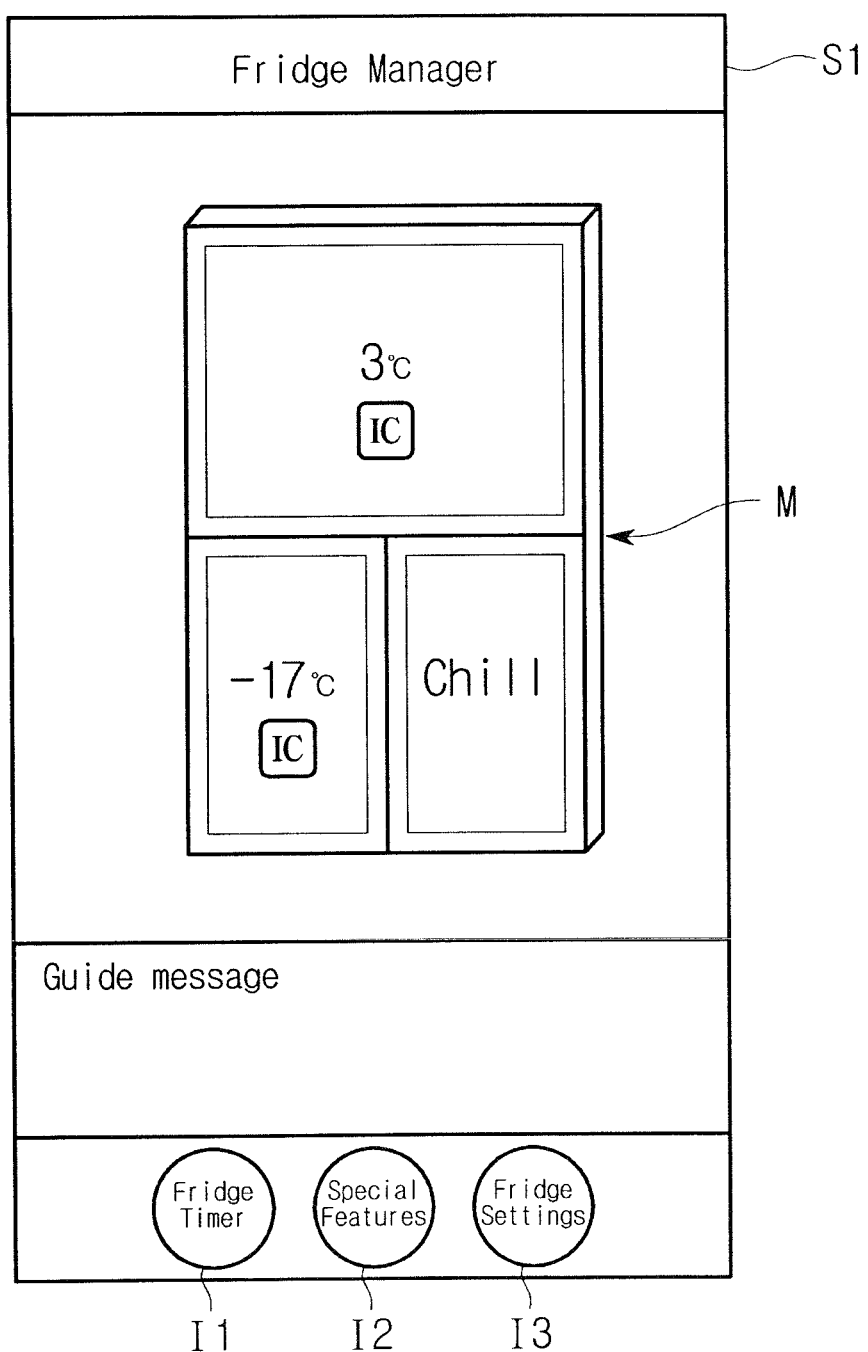
FIG. 5 is a view illustrating an exemplary refrigerator management screen image.

If the refrigerator management application is executed or the door opening/closing information of the refrigerator 1 is received from the sensing part 70, the first display 150 may output the refrigerator management screen image S1 shown in FIG. 5.

Referring to FIG. 5, words (e.g., fridge manager) indicating execution of the refrigerator management function may be displayed on a top bar (TB) of the refrigerator management screen image S1.

The refrigerator map (M) may be displayed at the center of the refrigerator management screen image S1, and the refrigerator map (M) may visualize and provide the refrigerator function information. For example, current temperature information of the corresponding region, setting temperature information or mode information may also be displayed on the refrigerator map (M). Although the refrigerator map (M) of FIG. 5 exemplarily illustrates that the storage chambers (20, 30, 40) of the refrigerator 1 are classified into the upper refrigerating chamber 30, the left lower freezing chamber 30, and the right lower temperature changeable chamber 40, the refrigerator map (M) may be provided in different ways according to shapes of the refrigerator 1.

An information message for indicating functions of the refrigerator 1 may be displayed at the lower end of the refrigerator management screen image S1, various icons for operation control, function description, or environment setting of the refrigerator 1 may be displayed according to various embodiments. For example, the timer setting icon (I1), the function description icon (I2), and the environment setting icon (I3) may be displayed at the lower end of the information message.

The refrigerator management screen image S1 will hereinafter be described in detail.

If the user touches the corresponding region of the refrigerator map (M) from among the refrigerator management screen S1, the first display 150 may output the management screen image for the corresponding region in response to the user touch.

Figure 6:
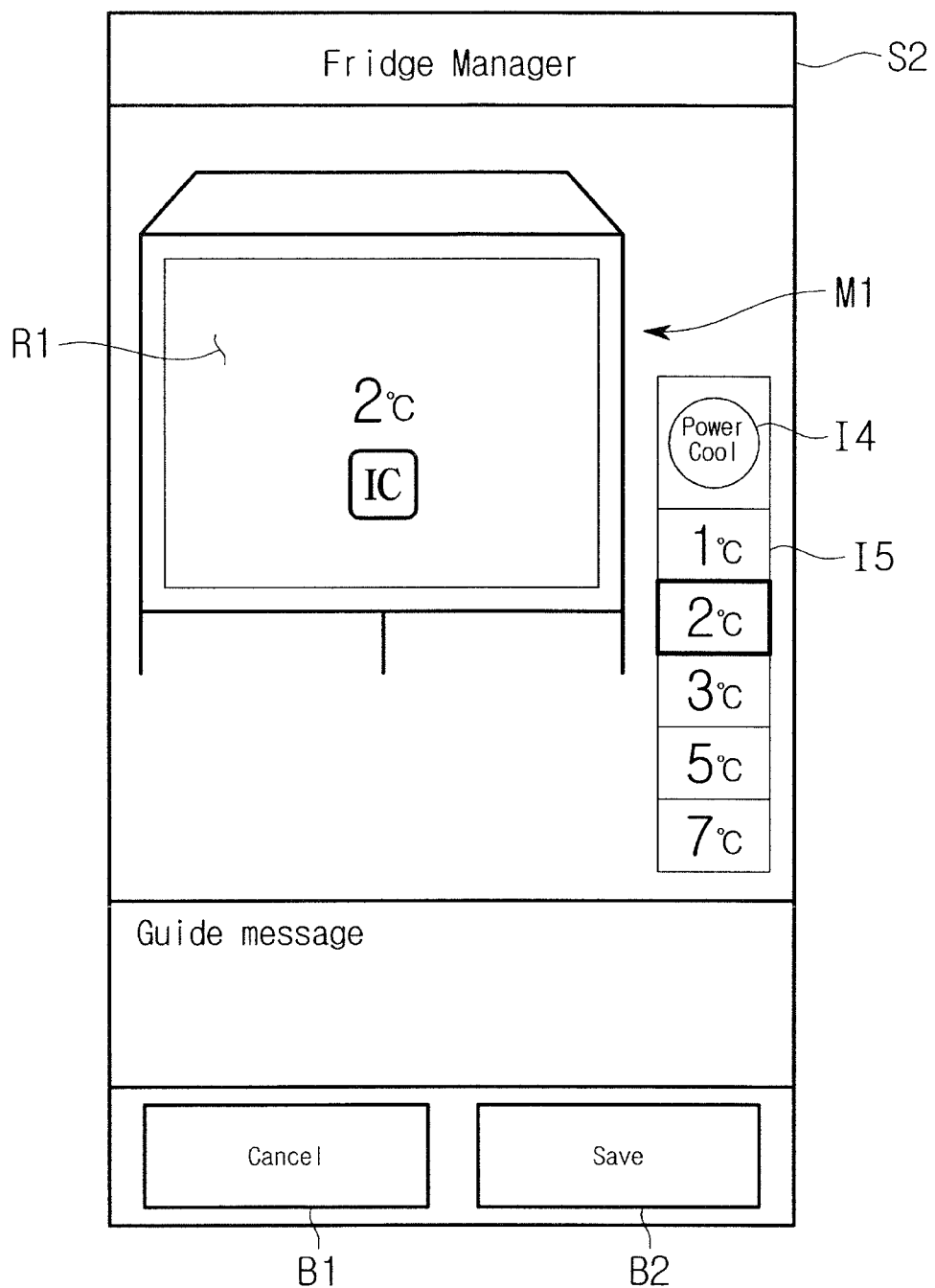
FIGS. 6 to 8 are views illustrating exemplary management screen images of the corresponding region for use in a refrigerator map.
Figure 7:
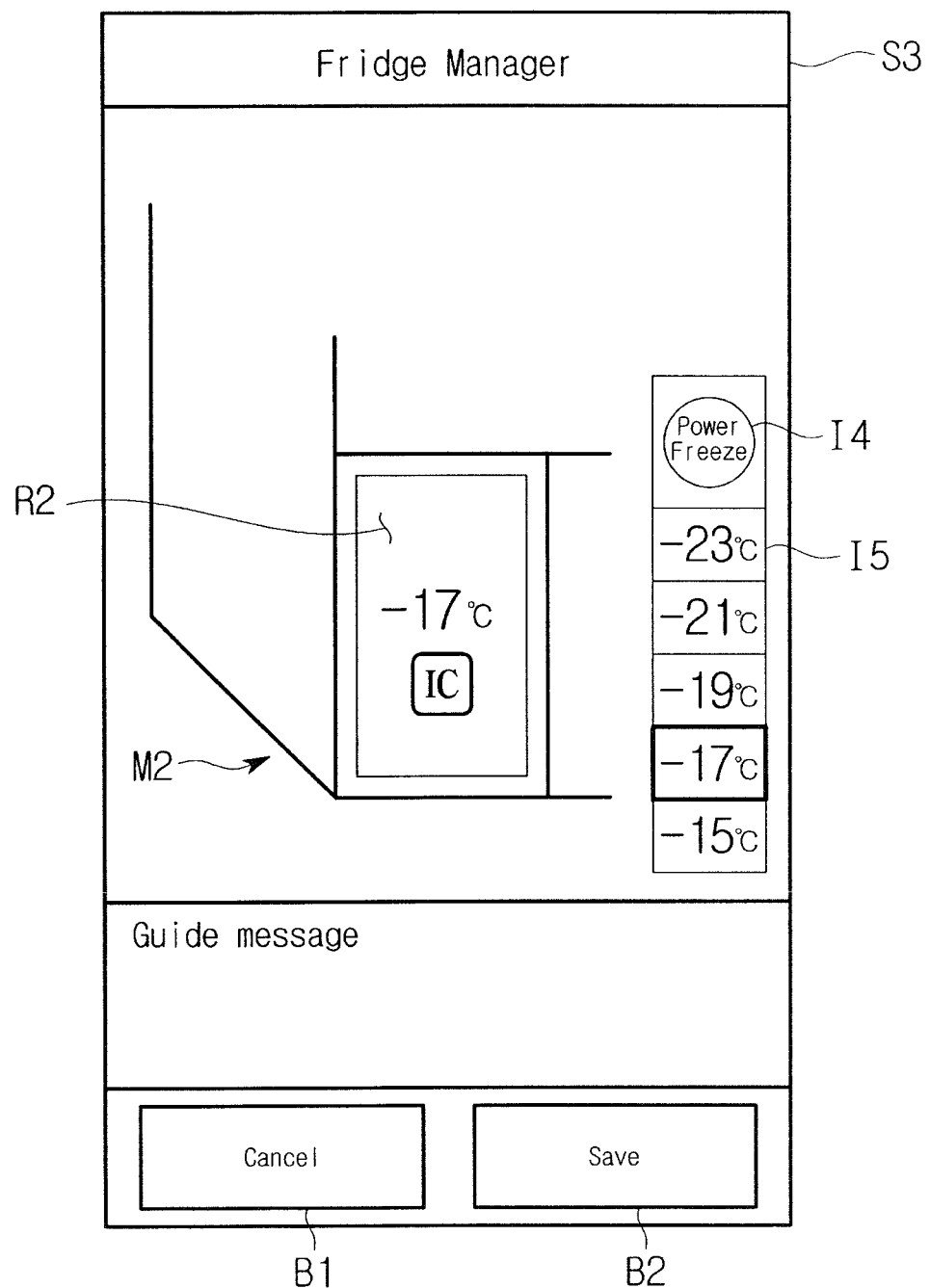
Figure 8:
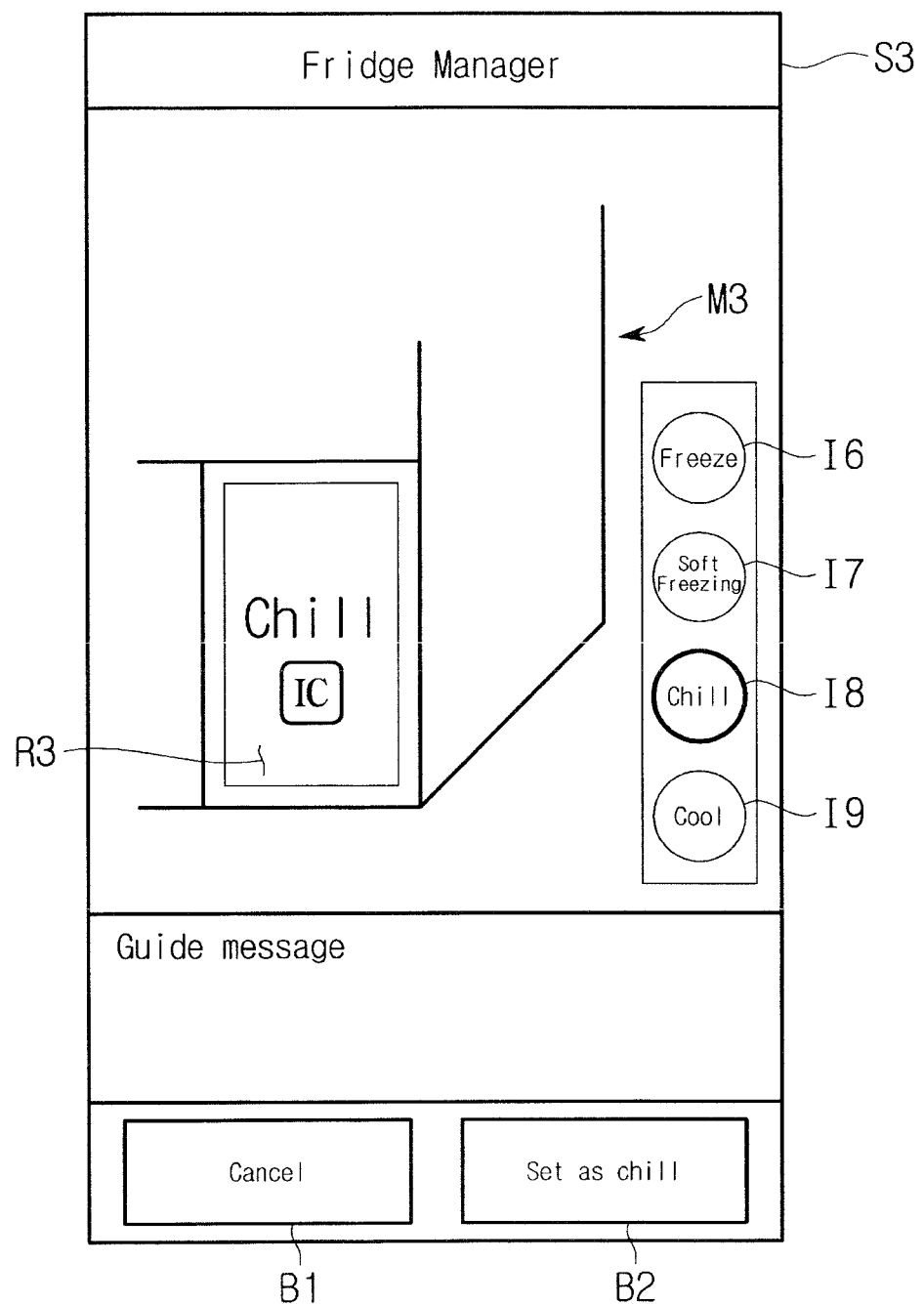

FIGS. 6 to 8 are views illustrating exemplary management screen images of the corresponding region for use in the refrigerator map (M).

If user touch is detected in the refrigerating chamber region of the refrigerator map (M), the refrigerating chamber management screen image S2 may be displayed as shown in FIG. 6. Referring to FIG. 6, the refrigerating chamber expansion map M1 may be displayed at the center of the refrigerating chamber management screen image S2.

A refrigerating chamber function visualization region R1 may be provided to the refrigerating chamber expansion map M1 of the refrigerating chamber management screen image S2. Images related to the refrigerating chamber temperature, the cooling mode, etc. may be provided to the refrigerating chamber function visualization region R1. In addition, the current temperature information of the refrigerating chamber 20 may be displayed on the refrigerating chamber expansion map M1. In accordance with the embodiment, a setting information temperature of the refrigerating chamber 20 may be displayed on the refrigerating chamber expansion map M1, or the icon indicating selection of a power-cool mode may also be displayed together with the setting information temperature. The power-cool mode is used to reduce the cooling time of foods stored in the storage chamber. After lapse of a predetermined time for energy saving, the power-cool mode may be automatically terminated.

The power cool mode setting icon (I4) and the temperature setting icon (I5) may be simultaneously displayed at the right side of the refrigerating chamber expansion map M1 of the refrigerating chamber management screen image S2. The user may rapidly cool the temperature of the refrigerating chamber 20 through the power-cool mode setting icon (I4), and may set the temperature of the refrigerating chamber 20 to a desired temperature through the temperature setting icon (I5).

The information message indicating functions of the refrigerating chamber 20 may be displayed at the lower end of the refrigerating chamber management screen image S2. Although the message "The ideal temperature setting for the refrigerator is 3° C." may be displayed as an example, the scope or spirit of the displayable information message is not limited thereto.

"Cancel" button B1 and "Save" button B2 may be displayed at the lowermost part of the refrigerating chamber management screen image S2. If the user touches the Cancel button B1, a cancel pop-up window may be displayed. If the user touches the Save button B2, user-input setting information may be stored.

Thereafter, if user touch is detected in the freezing chamber region of the refrigerator map (M), the freezing chamber management screen image S3 may be provided as shown in FIG. 7. Referring to FIG. 7, the refrigerating chamber expansion map M1 may be displayed at the center of the freezing chamber management screen image S3.

A freezing chamber function visualization region R2 may be provided to the freezing chamber expansion map M2 of the freezing chamber management screen image S3. Images related to the freezing chamber temperature, the cooling mode, etc. may be provided to the freezing chamber function visualization region R2. In addition, the current temperature information of the freezing chamber 30 may be displayed on the freezing chamber expansion map M2. In accordance with the embodiment, a setting information temperature of the freezing chamber 30 may be displayed on the freezing chamber expansion map M2, or the icon indicating selection of a power-cool mode may also be displayed together with the setting information temperature.

The power-cool mode setting icon (I4) and the temperature setting icon (I5) may be simultaneously displayed at the right side of the freezing chamber expansion map M2 of the freezing chamber management screen image S3.

An information message indicating functions of the freezing chamber 30 may be displayed at the lower end of the freezing chamber management screen image S3.

Although the message "The ideal temperature setting for a freezer is -19° C." may be displayed as an example, the scope or spirit of the displayable information message is not limited thereto.

"Cancel" button B1 and "Save" button B2 may be displayed at the lowermost part of the freezing chamber management screen image S3. Redundant matters will not be described herein for clarity.

If the user touches the temperature changeable chamber region of the refrigerator map (M), the temperature changeable management screen image S4 may be provided as shown in FIG. 8. The temperature changeable chamber expansion map M3 may be displayed at the center of the temperature changeable chamber management screen image S4 as shown in FIG. 8.

The temperature changeable chamber function visualization region R3 may be provided to the temperature changeable chamber expansion map M3 of the temperature changeable chamber management screen image S4. Temperature of the temperature changeable chamber 40, and images related to the temperature changeable mode may be provided to the temperature changeable chamber function visualization region M3. In addition, the icon indicating temperature changeable mode information established in the temperature changeable chamber 40 may also be displayed on the temperature changeable chamber expansion map M3.

Mode setting icons may be provided to the right side of the temperature changeable chamber expansion map M3 of the temperature changeable chamber management screen image S4. For example, the temperature changeable chamber mode may be classified into a freezer mode, a soft freezing mode, a chill mode, and a cool mode. In the freezer mode, the environment of the temperature changeable chamber 40 may be set to the environment of the freezing chamber 30. In the soft freezing mode, the temperature of the temperature changeable chamber 40 is set to about -5° C., foods (e.g., fish, meat, etc.) may be stored in the refrigerating chamber 20 for a long time. In addition, during the chill mode, the temperature of the temperature changeable chamber 40 is set to about -1° C., and foods (e.g., fish, meat, etc.) may be stored in an optimum fresh state such that original quality of foods can be optimally stored in the temperature changeable chamber 40. In the cool mode, the temperature of the temperature changeable chamber 40 is set to about 5° C., such that beverages, vegetables, and fruits may be optimally stored in the temperature changeable chamber 40.

If the user touches one of the plurality of icons (i.e., the freezer mode icon (I6), the soft freezing mode icon (I7), the chill mode icon (I8), and the cool mode icon (I9), the temperature changeable chamber 40 may be set to the corresponding mode, information indicating that the corresponding icon was selected in the vicinity of the corresponding mode setting icon (e.g., I8) may be provided.

The information message indicating the mode setting icon may be displayed at the lower end of the temperature changeable chamber management screen image S4. In the embodiment, not only the information message, but also images indicating functions of the corresponding mode setting icon may be simultaneously displayed.

A Cancel button B1 and a Save button B3 may be displayed at the lowermost end of the temperature changeable chamber management screen image S4. The same description as in FIG. 6 will herein be omitted for convenience of description.

Referring back to FIG. 5, if the user touches the timer setting icon (I1) in the refrigerator management screen image 51, the first display 150 may output the management screen image for the corresponding region in response to the user touch.

Figure 9:
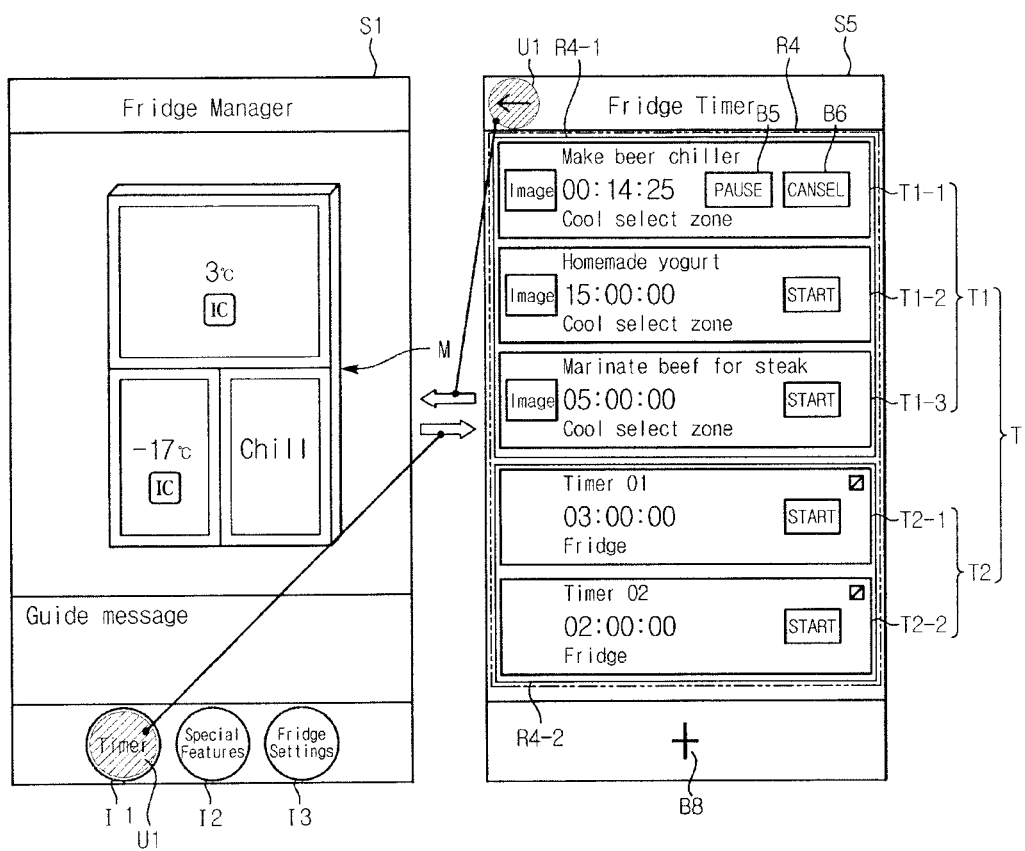
FIGS. 9 and 10 are views illustrating exemplary timer setting screen images.
Figure 10:
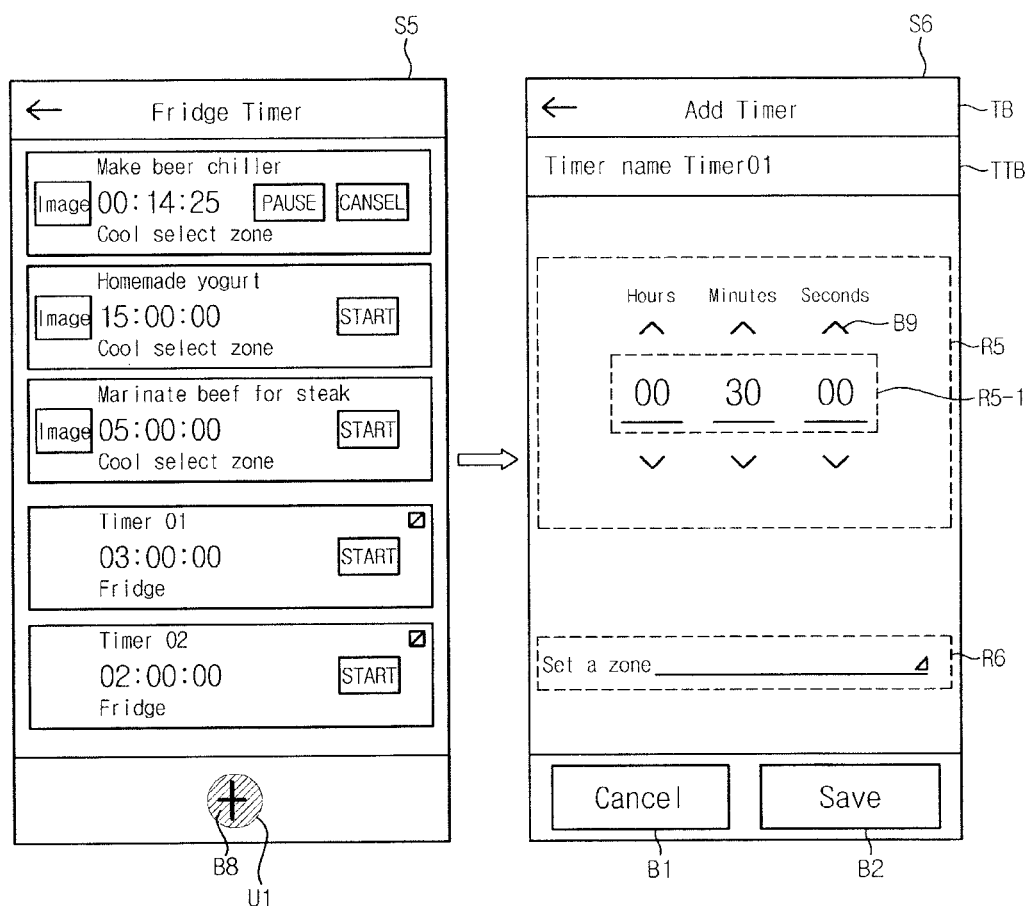

FIGS. 9 and 10 are views illustrating exemplary timer setting screen images.

If user touch (U1) is detected in the timer setting icon (I1) of the refrigerator management screen image S1, the timer setting screen image S5 may be provided as shown in FIG. 9.

Referring to FIG. 9, words (e.g., Fridge Timer) indicating execution of the timer setting function may be displayed at the top bar (TB) of the timer setting screen image S5. In accordance with the embodiment, the Back button B3 configured to return to the refrigerator management screen image S1 may be provided to the top bar (TB).

If user touch (U1) is input to the Back button B3, the refrigerator management screen image S1 may be displayed on the first display 150.

The timer setting region R4 may be provided at the center of the timer setting screen image S5. The timer setting region R4 may include a first timer setting region (R4-1) and a second timer setting region (R4-2). The first timer setting region (R4-1) may include timers (T1: T1-1, T1-2, T1-3) initially provided to a manufacturer of the refrigerator 1, and the second timer setting region (R4-2) may include timers (T2: T2-1, T2-2) established by the user. If the timer T is in operation, an additional display for indicating that the timer is in operation may be provided to the operating timer. For example, the Stop button B5 and the Cancel button B6, instead of the start button B4, may be provided to the timer (T1-1).

The timer T1 of the first timer setting region (R4-1) may include the timer name, the timer image, the set time, the set zone, and the start button B4.

The timer T2 of the second timer setting region (R4-2) may include the timer name, the timer image, the set time, the set zone, the start button B4, and the delete button B7. The timer T2 of the second timer setting region (R4-2) may be a timer T2 randomly established by the user. If user touch U1 is applied to the delete button B7, the corresponding timer may be deleted. The same content as in the above-mentioned description in association with other functions will herein be omitted for convenience of description.

The timer add timer B8 may be provided at the lower end of the timer setting screen image S5. If user touch U1 is applied to the timer add button B8, the timer add screen image S6 may be provided to the first display 150 as shown in FIG. 10. Words (e.g., Add Timer) indicating execution of the timer add function may also be displayed at the top bar (TB) of the timer add screen image S6.

A timer title bar (TTB) may be provided to the lower end of the top bar (TB). The title of the timer to be added may be established in the TTB, or the conventionally established time title may be corrected through the TTB. If the timer title is not established, a predetermined timer title (e.g., timer01 or timer02) may be provided.

The time setting region R5 may be provided to the center of the timer add screen image S6. The display region (R5-1) for displaying the setting time may be provided to the time setting region R5, and the timer picker button B9 for time setting may be provided in the vicinity of the display region.

The timer setting target designation region R6 may be provided at the lower end of the time setting region R5. If user touch U1 is input to the timer setting target designation region R6, the list of timer setting possible regions may be provided. For example, although the list of timer setting possible regions including the refrigerating chamber 20, the freezing chamber 30, and the temperature changeable chamber 40 may be provided, and the scope or spirit of the list is not limited thereto.

Cancel button B1 and Save button B2 may be provided at the lower end of the timer setting target designation region R6. The same description as in FIG. 6 will herein be omitted for convenience of description.

Referring back to FIG. 5, if user touch U1 is detected at the function description icon (I2) in the refrigerator management screen image 1, the first display 150 may provide the function description screen image in response to the user touch U1.

Figure 11:
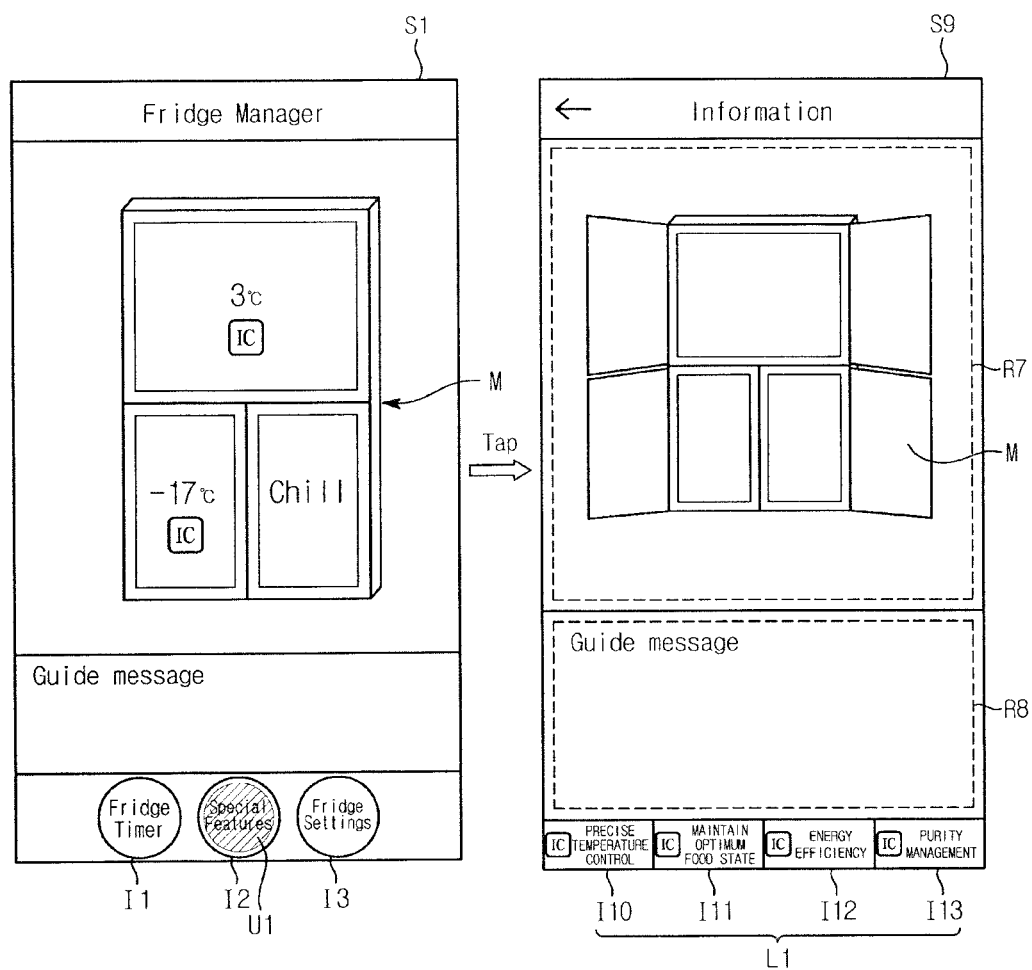
FIGS. 11 and 12 are views illustrating exemplary function explaining screen images.
Figure 12:
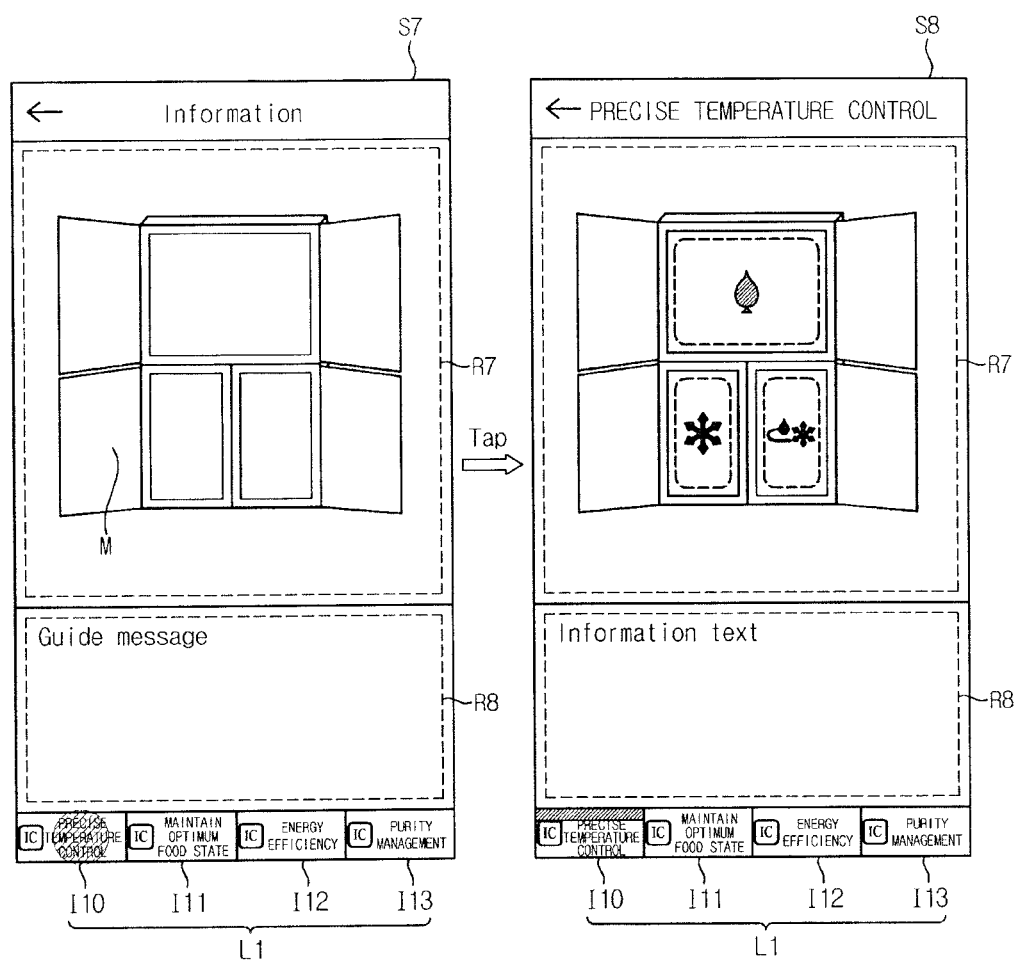

FIGS. 11 and 12 are views illustrating exemplary function explaining screen images.

If user touch U1 is detected in the function description icon (I2) of the refrigerator management screen image S1, the function description screen image S7 may be provided as shown in FIG. 11.

Referring to FIG. 11, words (e.g., "information") indicating entry to the function description screen image may be displayed at the top bar (TB) of the function description initial screen image S7. In accordance with the embodiment, the Back button B3 configured to return to the refrigerator management screen image S1 may be provided to the top bar (TB).

The image region R7 for providing an image explaining functions may be provided at the center of the function description screen image S7. The text region R8 for providing text explaining functions may be provided at the lower end of the function description screen image S7, and the icon list L1 regarding description provision functions may be provided at the lower end of the text region R8.

For example, the refrigerator map (M) may be displayed on the image region R7 of the function description screen image S7. The information message for the user, for example, "Please select icon to view information" may be provided to the text region R8. The icon list L1 may include at least one of a "Precise Temperature Control" icon (I10), a "Maintain Optimum Food State" icon (I11), an "Energy Efficiency" icon (I12), and a "Purity Management" icon (I13). The scope or spirit of exemplary icons contained in the icon list L1 is not limited thereto. Further, it should be noted that the present disclosure may be achieved in various ways through substitution, change, and modification by those skilled in the art without departing from the scope of the present disclosure as defined by the following claims.

If user touch U1 from among various icons provided to the icon list L1 is received from the user, the detailed description screen related to the corresponding function may be displayed.

For example, if the user touch U1 regarding the precise temperature control icon is received from the user as shown in FIG. 12, the function description screen image S8 regarding precise temperature control may be displayed. Words (e.g., Precise Temperature Control) for displaying the function description target may be displayed at the top bar (TB) of the function description screen image S8.

In addition, the image region R7 for providing the function description image may be provided at the center of the function description screen image S8, the text region R8 for providing text explaining functions may be provided at the lower end of the function description screen image S8, and the icon list L1 regarding the description providing function. The image indicator may also be displayed at the lower end of the image region R7 according to the embodiment. For example, the image for function description may be provided to the image region R7 of the function description screen image S8 regarding precise temperature control. If plural images are provided, the image indicator may also be displayed.

If the user touches (U1) the "Maintain Optimum Food State" icon, "Energy Efficiency" icon, or "Purity Management" icon, the function description screen image may be provided as shown in FIG. 12.

Referring back to FIG. 5, if user touch U1 is detected in the environment setting icon (I3) from among the refrigerator management screen image S1, the first display 150 may provide the environment setting screen image in response to the user touch U1.

FIGS. 13, 14, 15, 16A, and 16B are views illustrating exemplary environment setting screen images.

Figure 13:
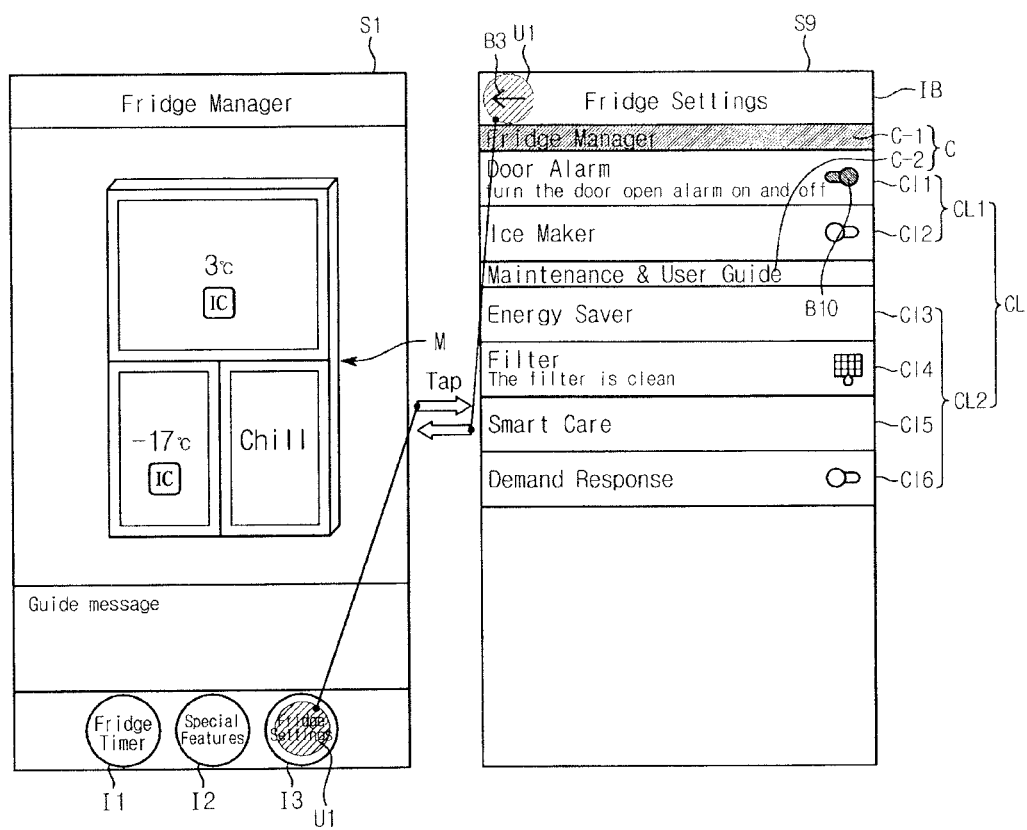
FIGS. 13, 14, 15, 16A, and 16B are views illustrating exemplary environment setting screen images.

If the user touch U1 is detected in the environment setting icon (I3) from among the refrigerator management screen image S1, the environment setting screen image S9 may be provided as shown in FIG. 13. Referring to FIG. 13, words (e.g., Fridge Setting) indicating execution of the environment setting function may be displayed at the top bar (TB) of the environment setting screen image S9. In accordance with the embodiment, the Back button B3 configured to return to the refrigerator management screen image S1 may be provided to the top bar (TB).

The item list (CL) regarding the environment setting item C and the corresponding items may be provided to the environment setting screen image S9.

For example, the environment setting item C may include the refrigerator management item (C-1) and the maintenance and user guidance item (C-2).

The refrigerator management item (C-1) of the environment setting item C may include environments regarding the refrigerator management function. For example, the refrigerator management item (C-1) may include the item list (CL1) comprised of the door alarm item (CI1) and the icemaker item (CI2). In addition, the on/off setting button (B10) constructed to switch the corresponding item function on or off may also be provided at the right side of the strings of the respective items (CI1, CI2).

The maintenance and user information item (C-2) from among the environment setting items (C) may provide user information regarding the refrigerator maintenance function or the like. For example, the maintenance and user information item (C-2) may provide the item list (CL2) including at least one of the energy saver item (CI3), the filter item (CI4), the smart care item (CI5), and the demand reaction item (CI6). In accordance with the embodiment, the icon for visually providing state information of the corresponding item may also be provided at the right side of the string indicating each item. The icon (e.g., the icon for displaying a filter state using the color of the filter icon) for visually providing state information of the corresponding item may be provided at the right side of the string displaying each item.

If user touch UI is detected in the items (CI1, CI2) of the refrigerator management item (C-1), the detailed information screen image of the corresponding function may be displayed. In accordance with the embodiment, if user touch U1 is detected in the on/off setting button B10 of the respective items (CI1, CI2), the corresponding function may be established or released.

Figure 14:
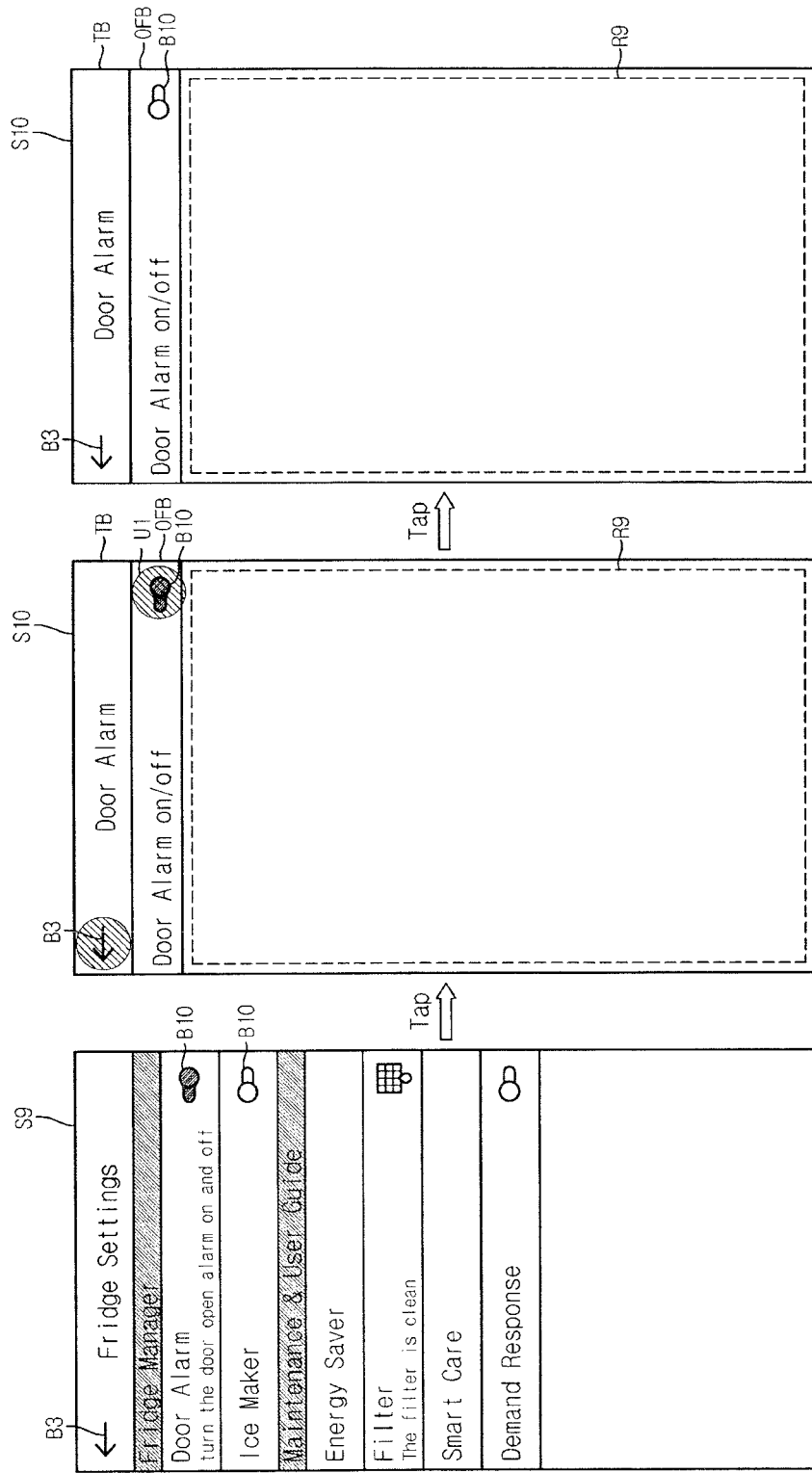

For example, if user touch U1 is detected in the door alarm item (CI1) as shown in FIG. 14, the detailed information screen image S10 for the door alarm function may be displayed.

Words (e.g., "Door Alarm") indicating entry to the detailed information screen image of the door alarm function may be displayed at the top bar (TB) of the detailed information screen image S10. In accordance with the embodiment, the Back button B3 configured to return to the environment setting screen image S9 may be provided to the top bar (TB).

The on/off setting bar (OFB) for switching the door alarm function on or off may be provided at the lower end of the top bar (TB) of the detailed information screen image S10, and the on/off setting button B10 for the door alarm function may be provided at the on/off setting bar (OFB). If user touch U1 is detected in the on/off setting button as shown in FIG. 14, the on/off setting information for door alarm may be switched.

Meanwhile, the information region R9 for providing the text or images describing the door alarm function may be provided at the lower end of the on/off setting bar (OFB).

Figure 15:
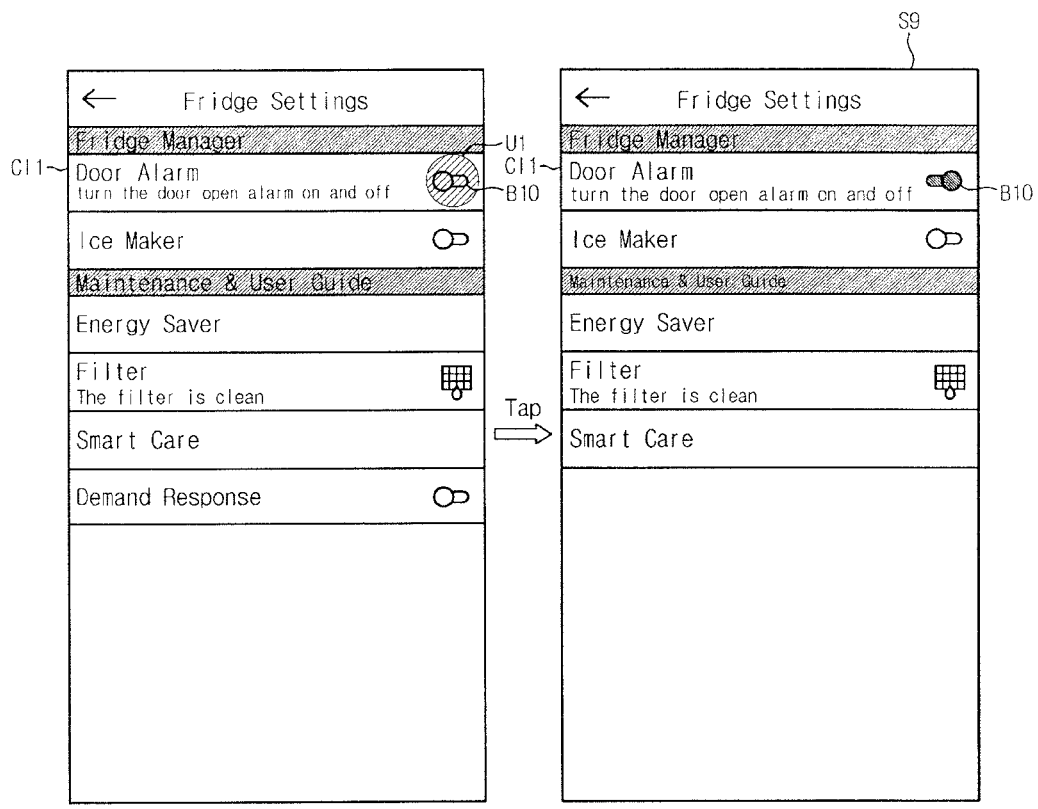

In accordance with the embodiment, if user touch U1 is detected in the on/off setting button of the door alarm item (CI1) as shown in FIG. 15, the on/off setting for the door alarm function may be switched. For example, assuming that the on/off setting button B10 for the door alarm function is switched off, if user touch U1 is detected in the on/off setting button B10, the door alarm function may be switched on, and vice versa.

Figure 16A:
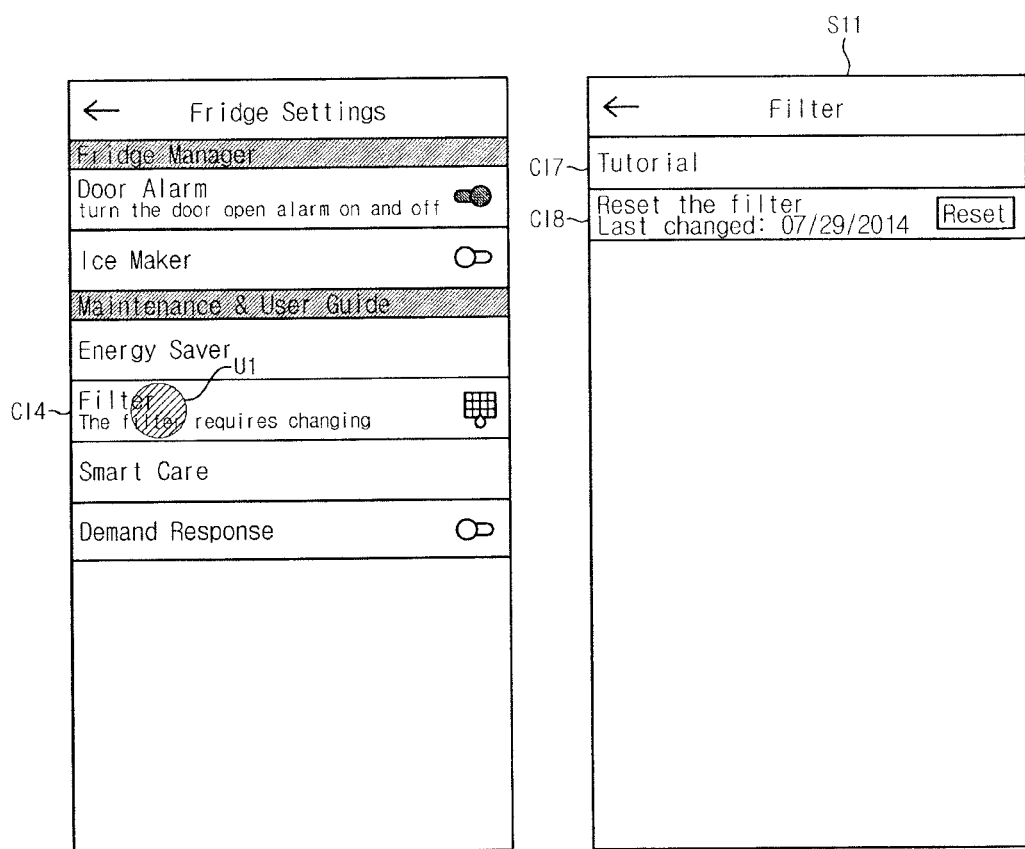

Thereafter, if user touch UI is detected in the items (CI3, CI4, CI5, CI6) of the maintenance and user information item (C-2), the detailed information screen image for the corresponding function may be displayed. In accordance with the embodiment, functions related to refrigerator maintenance may be switched on or off For example, if user touch U1 is detected in the filter item (CI4) as shown in FIG. 16A, the detailed information screen image S11 of the filter function may be displayed. The item for directing the filter function, the item for filter management, etc. may be provided to the detailed information screen image S11 of the filter function. For example, the tutorial item (CI7) and the filter reset item (CI8) may be provided to the detailed information screen image S11 of the filter function.

After the user receives the detailed description of the filter reset method by selecting the tutorial item (CI7), the user can reset the filter by directly selecting the filter reset item (CI8).

Figure 16B:
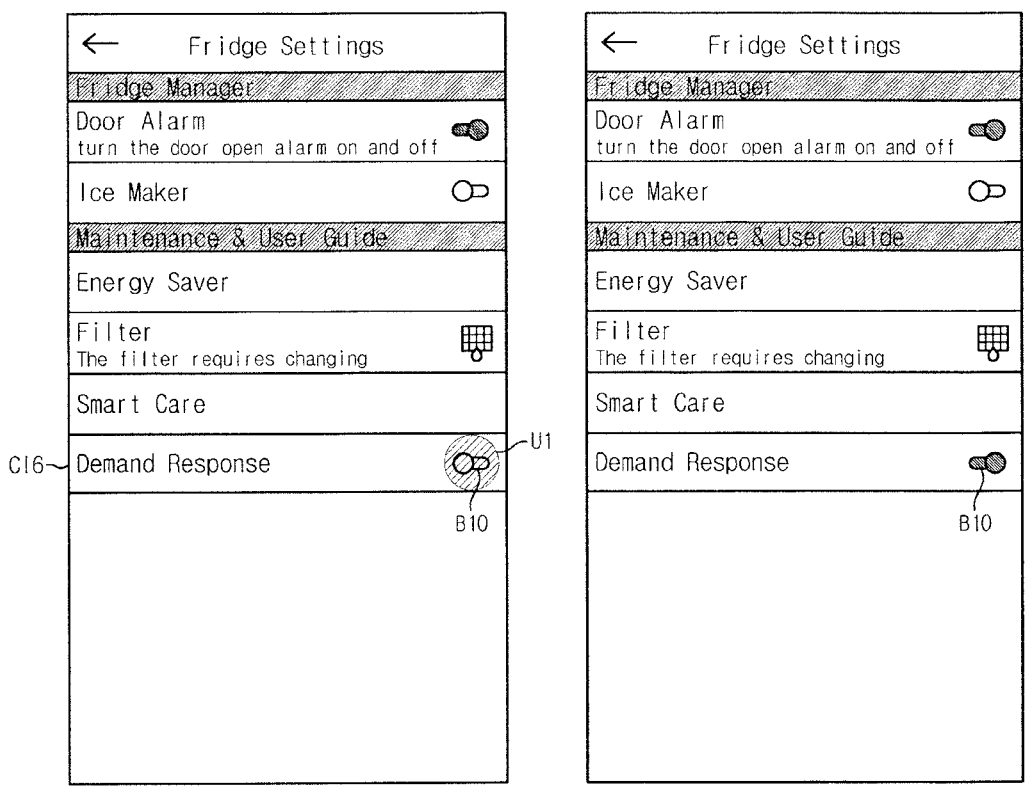

If user touch U1 is detected in the on/off setting button B10 of the demand reaction item (CI6) as shown in FIG. 16B, the on/off setting of the demand reaction function may be switched. The demand reaction function may change a power consumption pattern by reflecting economical incentive and a signal of the electric charges in the demand reaction function, and the refrigerator 1 according to the embodiment may apply the demand response function related to the defrosting function.

For example, if the demand reaction item is switched on, the refrigerator 1 may receive information regarding the power consumption from the electric power company. If the power consumption exceeds a predetermined reference power consumption on the basis of the power consumption received from the power company, the refrigerator 1 may control operation of the refrigerator 1 in a manner that the function (e.g., the function of the defrosting operation) causing high power consumption of the refrigerator 1 is not performed.

The technical visualization function of the refrigerator 1 according to the embodiment will hereinafter be described with reference to FIGS. 17 to 23. Although FIGS. 17 to 23 are exemplary screen images visually illustrating technology of the refrigerator 1, the technical idea of the present invention is not limited thereto.

The refrigerator 1 according to the embodiment may visualize technology related to the refrigerator management screen image S1 of FIGS. 5 to 16B, and may provide the visualized technology to the display 140. For convenience of description, the embodiment of the present disclosure will disclose the exemplary case in which technology related to the first display 150 of the display 140 is visualized.

The refrigerator 1 according to the embodiment may provide the refrigerator map (M) to the display (e.g., the first display 150) mounted to the refrigerator 1 when a predetermined condition is satisfied. The overall map of the refrigerator 1 may be provided to the first display 150 according to the situation, or the expansion map of a specific storage chamber 20, 30 or 40 of the refrigerator 1 may be provided. Current state information of the refrigerator 1 may be provided to the overall map or the expansion map.

Figure 17:
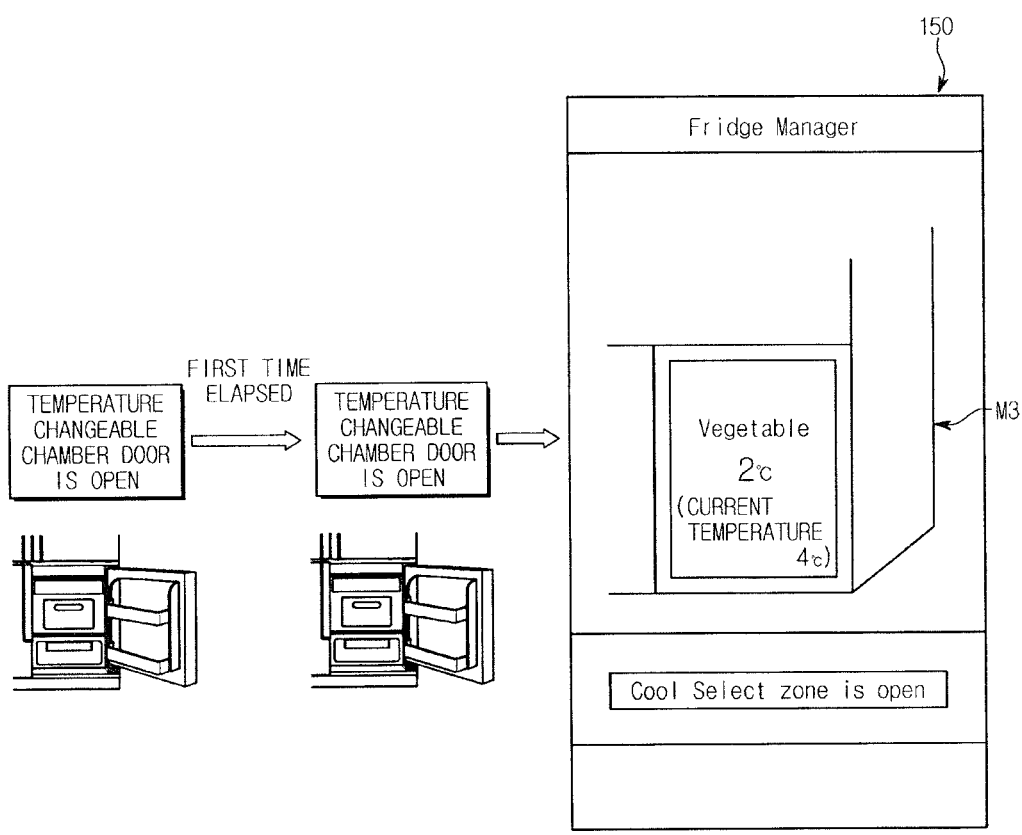
FIGS. 17, 18, 19, 20, 21, 22, and 23 are exemplary screen images visually illustrating technology of the refrigerator.

Referring to FIG. 17, assuming that the temperature changeable chamber door is opened for a predetermined first time on the basis of information collected from the sensing part 70, the controller 90 of the refrigerator 1 may provide the expansion map M3 of the temperature changeable chamber 40 to the first display 150. In this case, the first time may be predetermined by the manufacturing company or the user. The setting temperature information of the temperature changeable chamber 40, the current temperature information, etc. may be provided to the expansion map M3 of the temperature changeable chamber 40 provided to the first display 150. For example, the expansion map M3 of the temperature changeable chamber 40 provided to the first display 150 may include not only first content indicating that a current temperature of the temperature changeable chamber 40 is set to a temperature (e.g., 2° C.) appropriate for storage of fresh vegetables, but also second content indicating that the doors of the temperature changeable chamber 40 remain opened for a predetermined time so that the temperature of the temperature changeable chamber 40 increases to 4° C.

As described above, the refrigerator 1 may provide the refrigerator map (M) (e.g., the expansion map of a specific region) to the first display 150 on the basis of the refrigerator door opening/closing information collected by the sensing part 70. As a result, utilization of technology supplied from the refrigerator 1 can be increased, and user accessibility of the refrigerator 1 can be improved.

In addition, the refrigerator 1 according to the embodiment may visualize technology applied to the indoor setting region of the display (e.g., the first display 150) mounted to the refrigerator 1, and may provide the visualized technology to the first display 150. In accordance with the embodiment, the detailed description of the function can also be provided.

Figure 18:
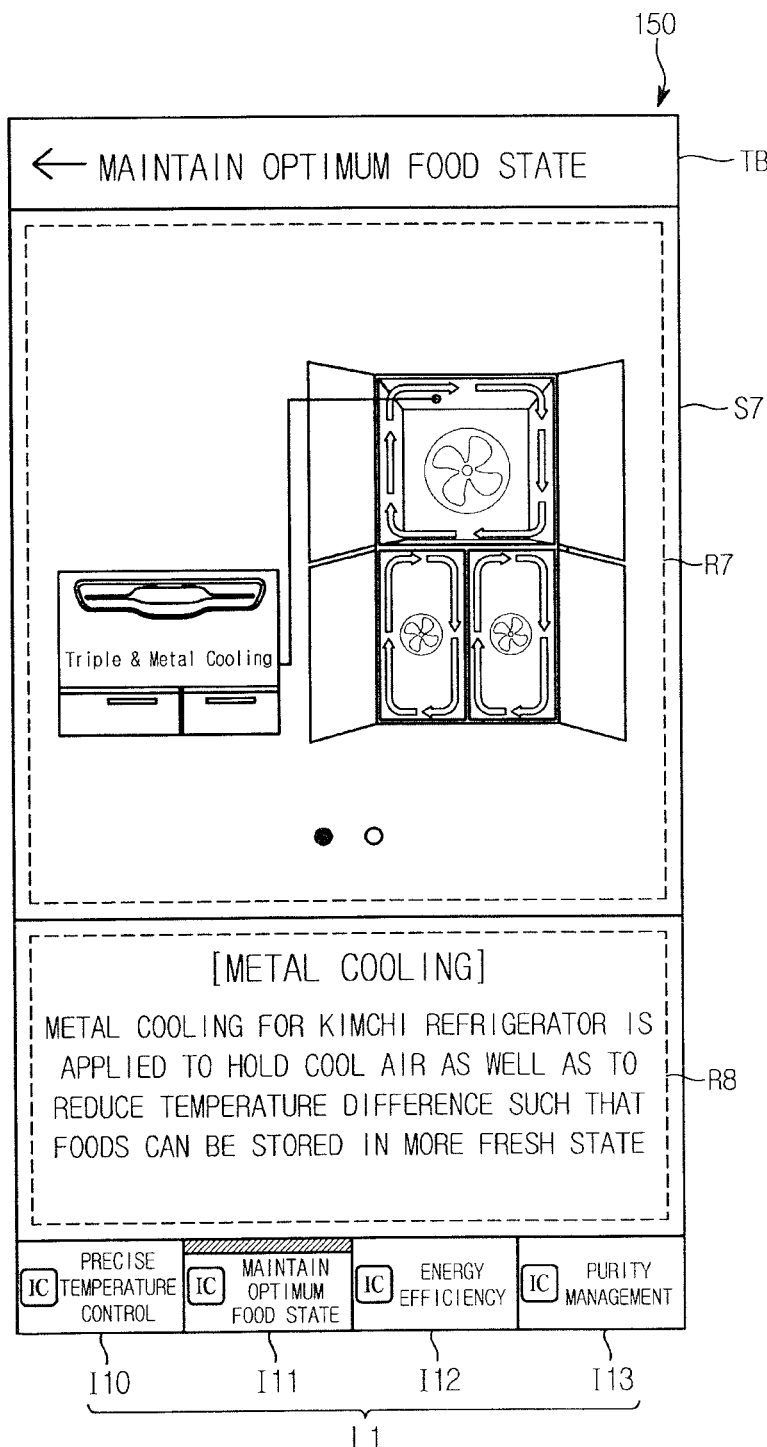

Referring to FIG. 18, the first display 150 may visualize the technology applied to the indoor setting region through the function description screen image S7, and may provide the visualized technology. Words (e.g., Maintain Optimum Food State) for displaying the function description target may be displayed at the top bar (TB) of the function description screen image S7.

The image region R7 for providing the function description image may be provided at the center of the function description screen image S7, and the text region R8 for providing text explaining the functions may be provided at the lower end of the function description screen image S7. The icon list L1 regarding the functions may be provided at the lower end of the function description screen image S7. The refrigerator 1 according to the embodiment may visualize various images regarding the optimum food state maintenance method and the principles thereof, and may provide the visualized images to the image region R7, such that user's technical understanding and usability can be increased.

In addition, the refrigerator 1 according to the embodiment may 3D-visualize the indoor operating technology of the refrigerator 1, and may display the 3D-visualized technology on the display (e.g., the first display 150) mounted to the refrigerator 1.

Figure 19:
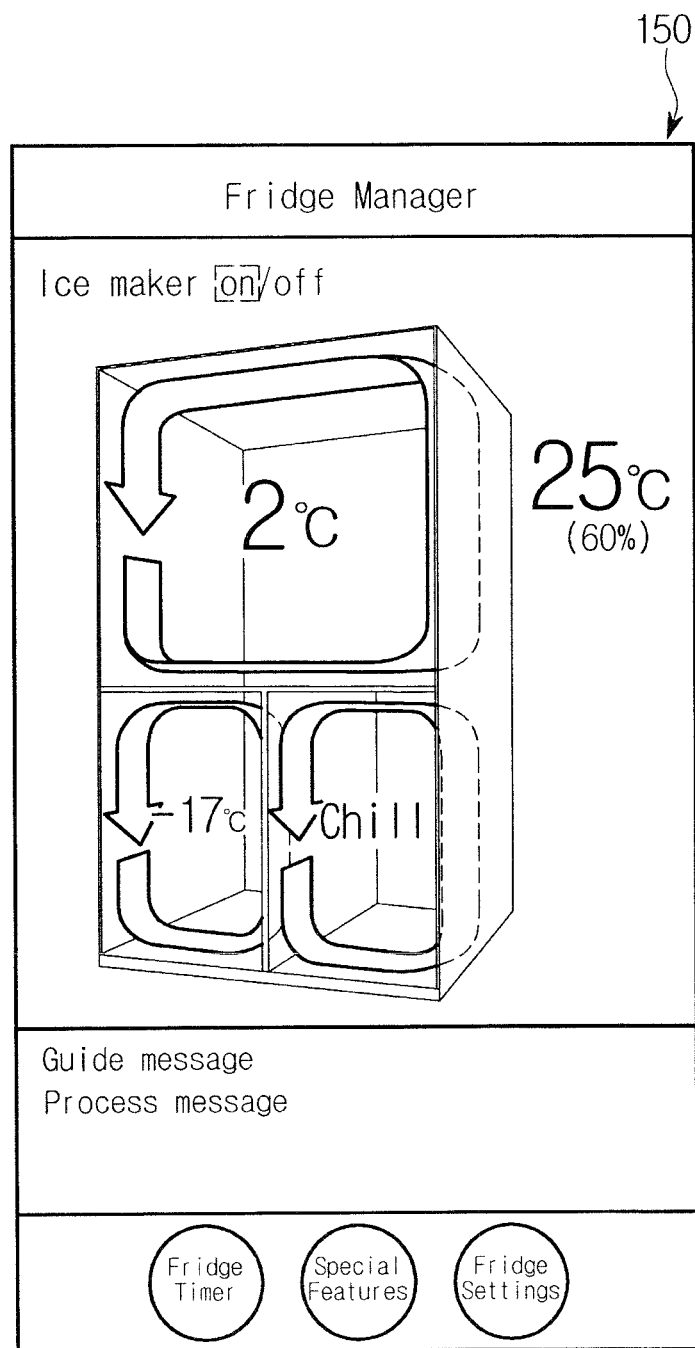

Referring to FIG. 19, the first display 150 may display airflow of indoor air as a 3D visual element, such that user satisfaction may increase when a specific function of the refrigerator 1 is used.

In addition, the refrigerator 1 according to the embodiment may display the setting temperatures of the respective indoor regions of each chamber and the recommendation list of optimum foods of the respective setting temperatures on the display (e.g., the first display 150) mounted to the refrigerator 1. In the meantime, the refrigerator 1 may display outdoor temperature and humidity, on/off states of the ice maker, etc. The refrigerator 1 may simultaneously display a guide message, a process message, etc. at the lower end of the 3D image.

Figure 20:
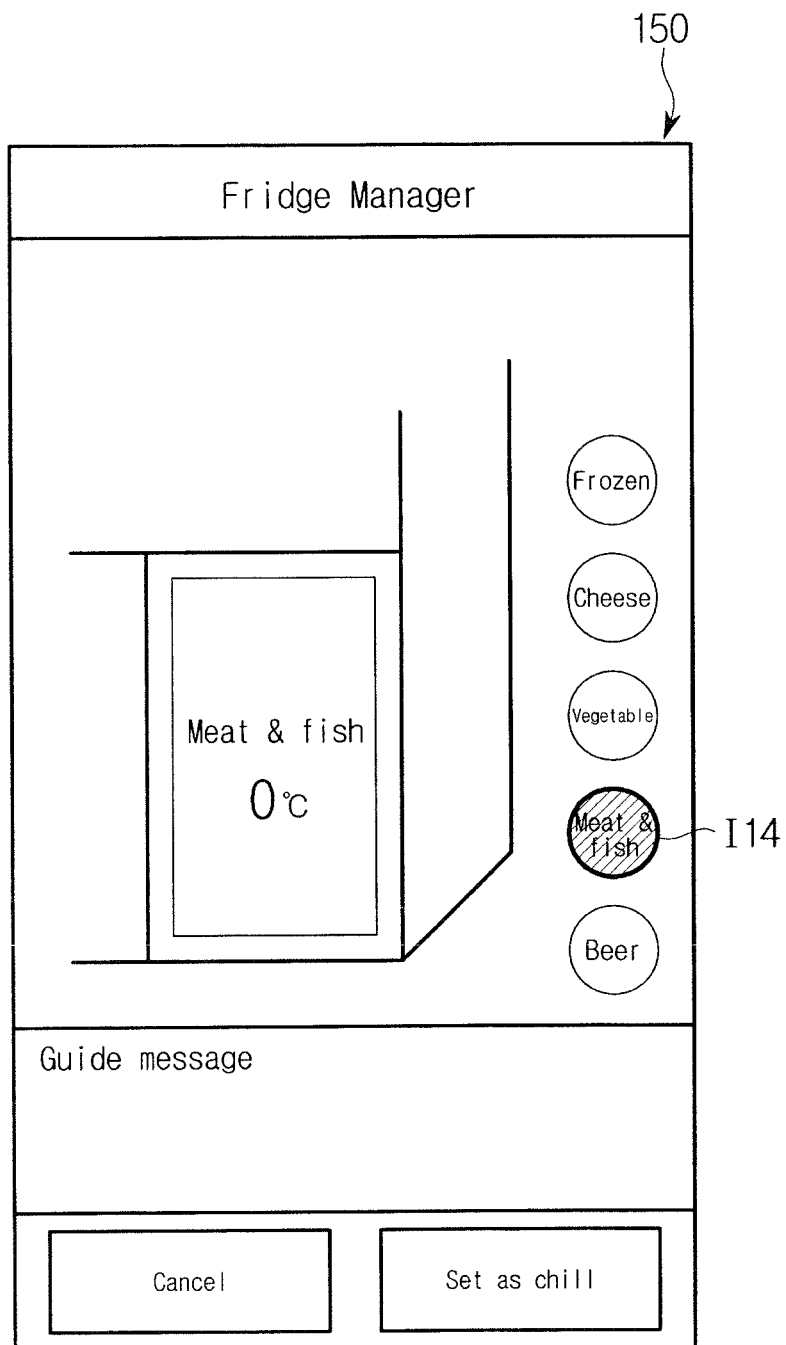

Referring to FIG. 20, the first display 150 may activate the optimum food recommendation icon (I14) for a temperature of a current temperature chamber 40 along with the temperature changeable chamber expansion map M3, and may display the activated optimum food recommendation icon (I14) and the temperature food recommendation icon (I14), such that user satisfaction with the indoor setting temperature may increase.

The refrigerator according to the embodiment may interact with the dispenser 25, such that the refrigerator may visually display information regarding the dispenser 25 on the display (e.g., the first display 150) interacting with the dispenser 25.

Figure 21:
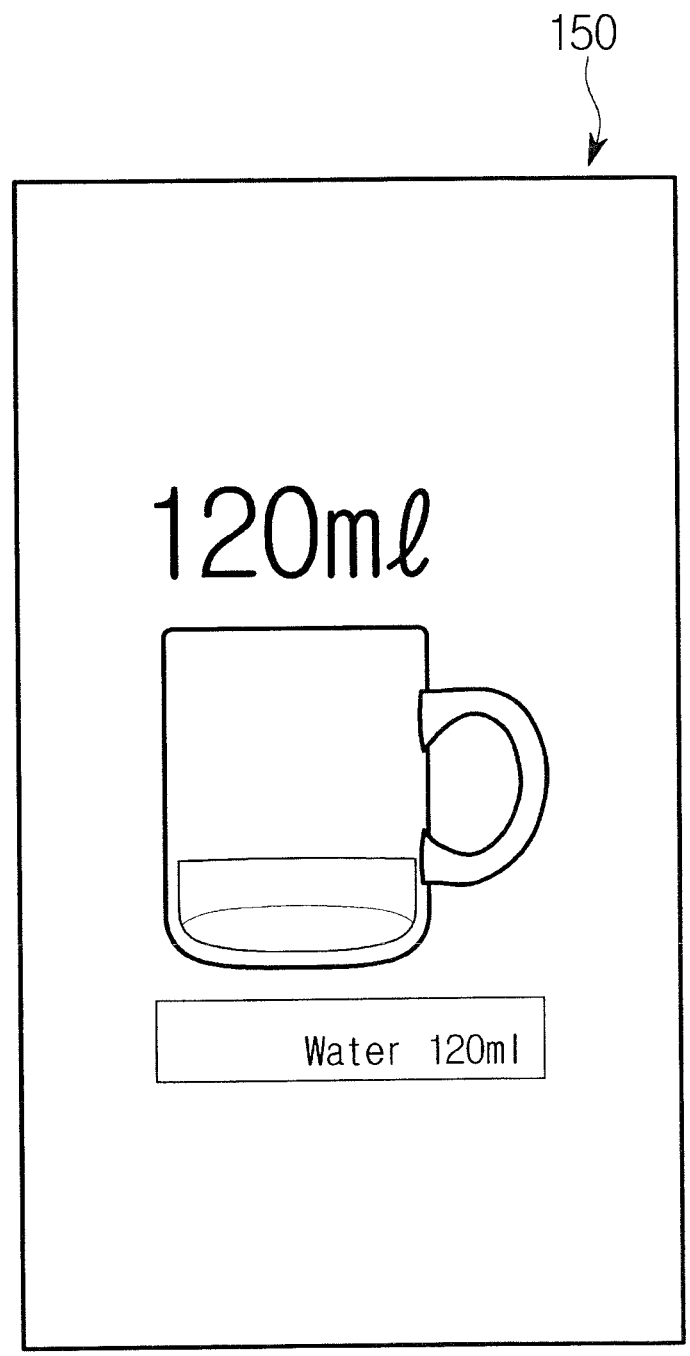
Figure 22:
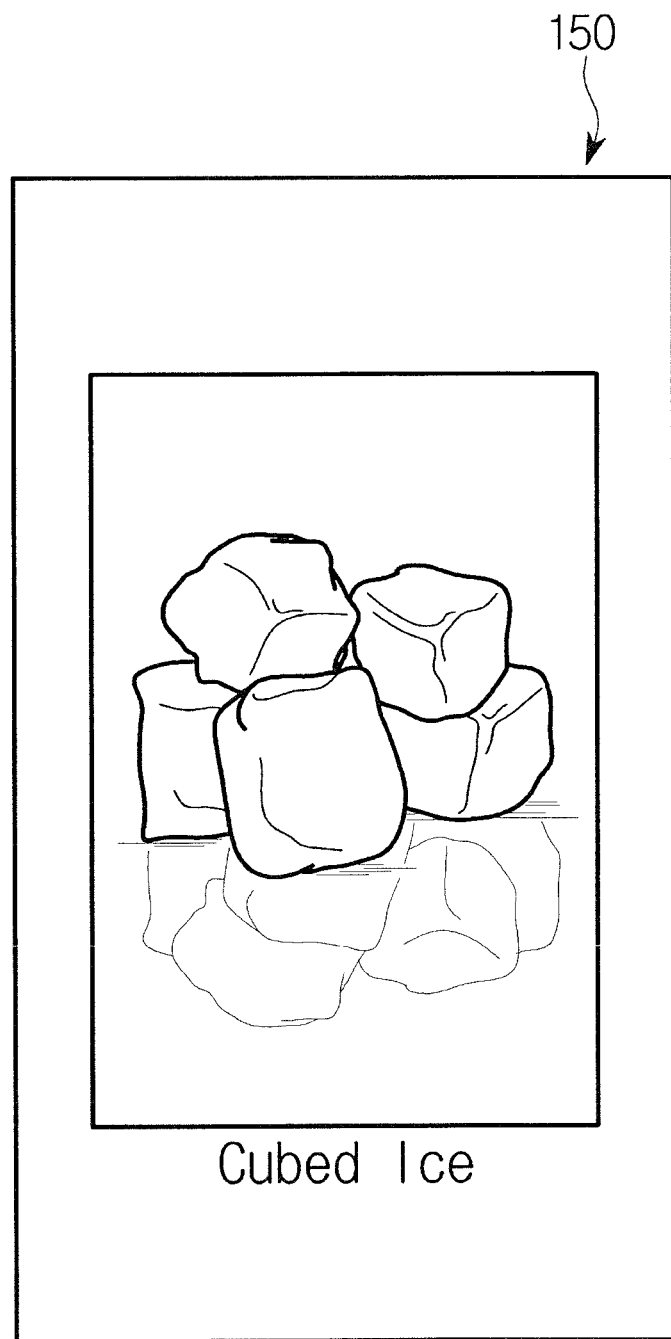

Referring to FIG. 21, the first display 150 may visualize the amount of water received from the dispenser 25, and display the visualized information. Referring to FIG. 22, the first display 150 may visualize and display the ice types (ice cubes, crushed ice, or the like) taken out of the ice maker. In accordance with the embodiment, the first display 150 may visualize and display the appearance of water coming out of the dispenser 25, such that user satisfaction when the user uses the dispenser 25 may increase.

In addition, the display of the refrigerator 1 according to the embodiment may visualize constant (or fixed) temperature technology when the indoor temperature increases by the opening or closing action of the refrigerator door. When a predetermined condition is satisfied in conjunction with the door alarm function, the embodiment may provide the alarm function for user recognition such that the user can quickly close the refrigerator door, and may provide visual information indicating that the indoor temperature is maintained at a constant temperature after the refrigerator door is closed.

Figure 23:
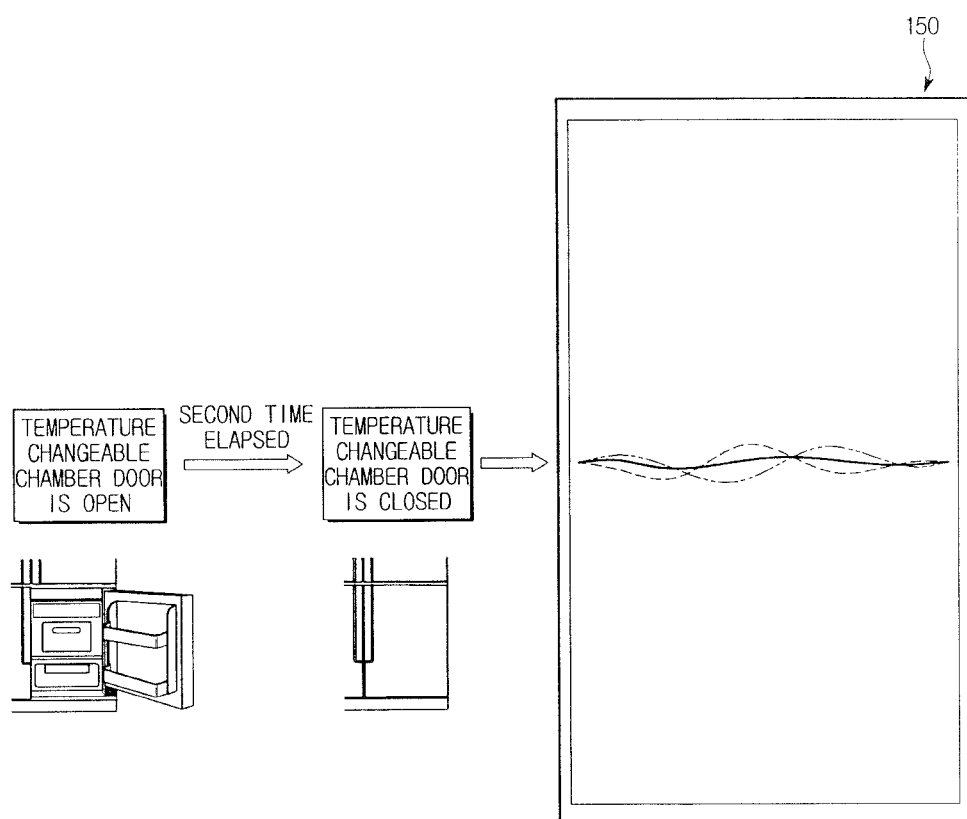

Referring to FIG. 23, assuming that the temperature changeable chamber door is opened on the basis of information collected by the sensing part 70 and is then closed after lapse of a predetermined second time, the controller 90 of the refrigerator 1 may display the appearance of rolling and decreasing of waves. The second time may be established by the manufacturer or may be established by the user.

The refrigerator 1 may provide the first display 150 with visual information indicating the process in which the indoor temperature is kept at a constant temperature on the basis of the refrigerator door opening/closing information collected by the sensing part 70, such that user satisfaction with the constant temperature technology applied to the refrigerator 1 may increase.

The refrigerator 1 according to the embodiment has been described above.

A refrigerator according to another embodiment will hereinafter be described in detail.

The refrigerator according to another embodiment may recognize user voice on the basis of user access information collected by the proximity sensor, such that the refrigerator may allow the user to more conveniently use the input scheme. In addition, the hard key along with the display may be provided to the front surface of the refrigerator, such that the user can use various input methods.

Figure 24:
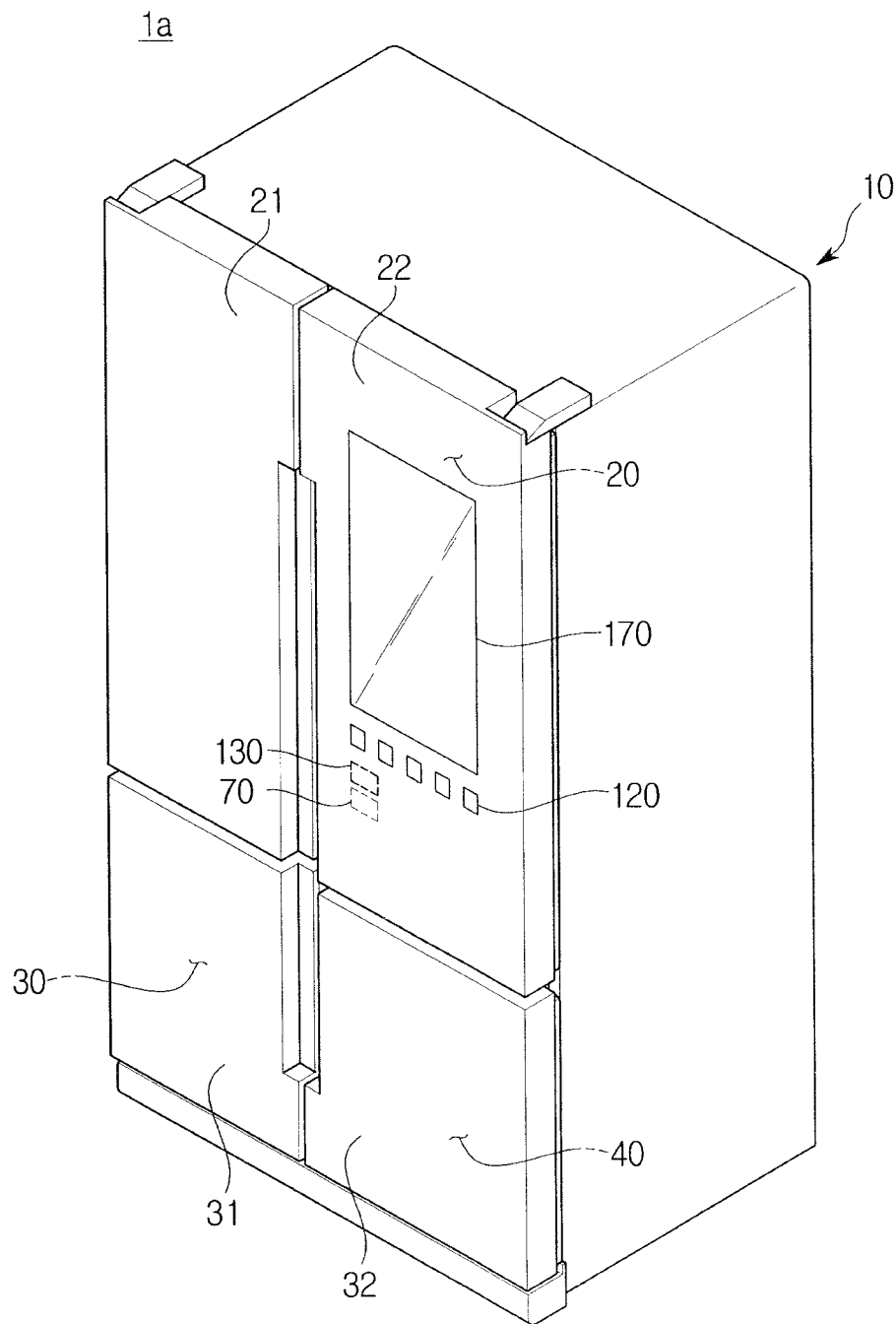
FIG. 24 is a perspective view illustrating a refrigerator according to another embodiment of the present disclosure.

FIG. 24 is a perspective view illustrating a refrigerator 1*a* according to another embodiment of the present disclosure.

Referring to FIG. 24, the refrigerator 1*a* includes a main body 10, storage chambers (20, 30, 40) formed in the main body 10, and a cool air supply device (not shown) to supply cool air to the storage chambers (20, 30, 40).

The main body 10 may include an inner casing to form the storage chambers (20, 30, 40); an outer casing coupled to the exterior of the inner casing so as to form the exterior appearance of the refrigerator 1*a;* and insulation disposed between the inner casing and the outer casing so as to insulate the storage chambers (20, 30, 40).

The storage chambers (20, 30, 40) may be classified into an upper storage chamber 20 and lower storage chambers (30, 40) by a first intermediate partition (not shown). In addition, the lower storage chambers (30, 40) may be classified into a left freezing chamber 30 and a right temperature changeable chamber 40 on the basis of the front surface of the refrigerator 1*a*. However, the partition example of the storage chambers (20, 30, 40) is not limited thereto.

The storage chambers (20, 30, 40) may respectively have open front surfaces for entrance/exit of food. The open front surfaces of the refrigerating chamber 20 may be opened or closed by doors (21, 22) hinged to the main body 10. The open front surfaces of the freezing chamber 30 and the temperature changeable chamber 40 may be opened or closed by the doors (31, 32) hinged to the main body 10.

In addition, the display 170 may be mounted to one of the refrigerating chamber doors (21, 22) such that the user located at the outside of the refrigerator 1*a* can confirm a state of the refrigerator 1*a* or can establish the operation condition of the refrigerator 1*a* without opening the refrigerating chamber doors (21, 22). The button part 120 formed in a hard key shape may be provided in the vicinity of the display 170, such that it can provide the user with various input methods.

In addition, the sensing part 70 for detecting user access may be provided to any one of the refrigerating chamber doors (21, 22), and the voice input part 130 for collecting user voice information may also be provided to any one of the refrigerating chamber doors (21, 22). In accordance with the embodiment, the camera provided for entrance of food in the storage chambers (20, 30, 40) may be installed at any one of the refrigerating chambers (21, 22). The same description as in the refrigerator 1 of FIGS. 1 and 2 will herein be omitted for convenience of description.

Figure 25:
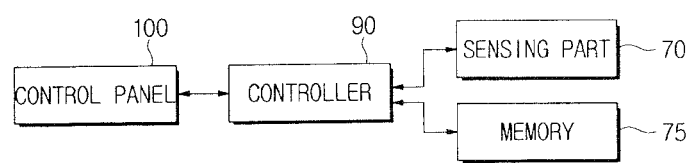
FIGS. 25 and 26 are control block diagrams illustrating the refrigerator according to another embodiment of the present disclosure.
Figure 26:
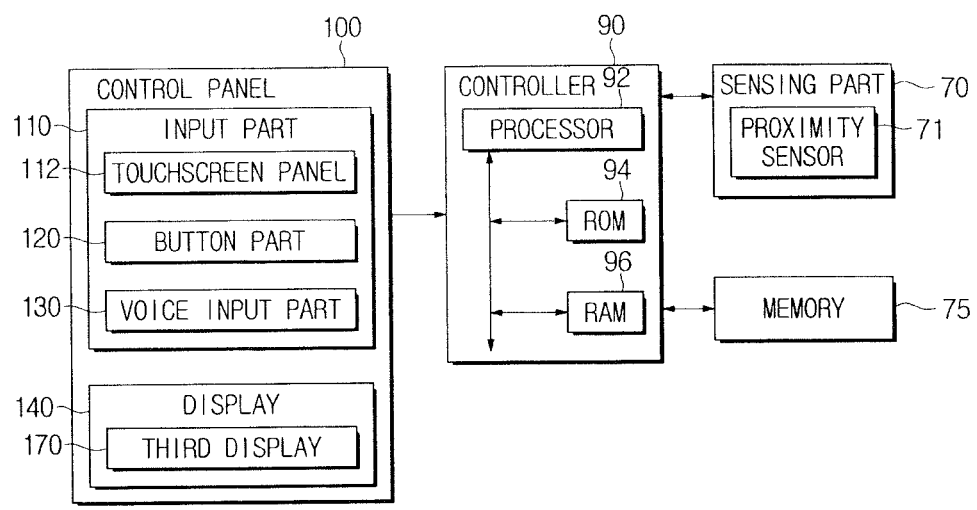

FIGS. 25 and 26 are control block diagrams illustrating the refrigerator (1*a*) according to another embodiment of the present disclosure.

Referring to FIGS. 25 and 26, the refrigerator 1*a* according to another embodiment may include a control panel 100, a sensing part 70, a memory 75, and a controller 90.

The control panel 100 may be used to interface with the user. Therefore, the control panel 100 may be arranged at the front surfaces of the refrigerating chamber doors (21, 22) such that user access and manipulation can be facilitated.

The control panel 100 may include an input part 110 for facilitating user manipulation, and a display 140 for providing information to the user.

The input part 110 may receive a control command of the refrigerator 1*a* from the user.

This input part 110 may be implemented by at least one of various schemes, for example, a hard key scheme, a proximity sensor scheme, and a GUI scheme such as a touchpad (U1). The touchpad U1 is implemented as a touchscreen panel, and the touchpad and the display 140 may construct a mutual layer structure.

The input part 110 according to the embodiment may be implemented as any one of the above-mentioned input schemes so as to provide the user with various input schemes.

Figure 27:
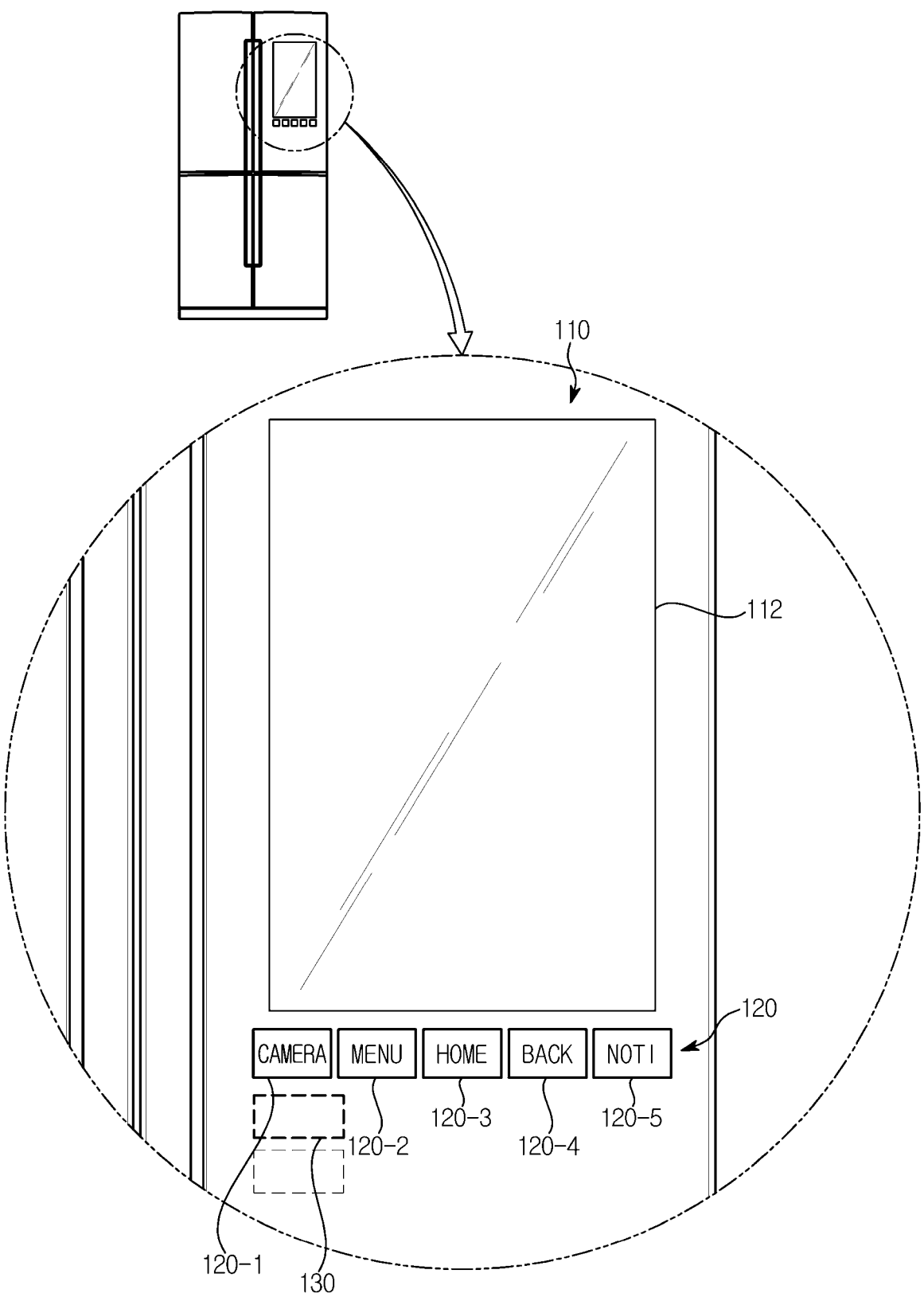
FIG. 27 is a view illustrating exemplary formation of an input part of a refrigerator according to an embodiment of the present disclosure.

FIG. 27 is a view illustrating exemplary formation of the input part 110 of the refrigerator (1*a*) according to an embodiment of the present disclosure. Referring to FIG. 27, the input part 110 may include a touchscreen panel 112 incorporated with the display 140, a button part 120 separated from the display 140, and a voice input part 130 configured to collect voice information of the user.

The button part 120 may be provided at the front surfaces of the refrigerating chamber doors (21, 22). The button part 120 may be implemented as a hard key or a touchscreen. The button part 120 may operate independently from the operation of the application provided from the refrigerator 1*a*. That is, execution of the input command generated by the button part 120 may have priority in certain situations, such that the user can more easily use various functions supplied from the respective buttons through the button part 120.

The button part 120 may be comprised of a combination of the plurality of buttons. For example, the button part 120 may include a camera (CAMERA) button 120-1, a menu (MENU) button 120-2, a home (HOME) button 120-3, a back button 120-4, and a notification (NOTI) button 120-5. However, the buttons are not limited thereto.

The voice input part 130 may collect control command information provided as a voice message from the user. Although the voice input part 130 may include a microphone module to collect voice information of the user, the scope of the voice input part 130 is not limited thereto. The voice input part 130 may convert the voice signal collected from the user into a data format, and may provide the data format to the voice recognition process of the controller 90.

The display 140 may visually provide the user with information regarding the indoor setting region. The display 140 may include a display 170 for displaying state information of the refrigerator 1*a*. In order to distinguish the display of this embodiment from the first and second displays (150, 160) of the refrigerator 1*a*, the display according to the embodiment will hereinafter be defined as a third display 170.

The third display 170 may be constructed as a large display having a size of about 20 inches. However, the size of the third display 170 is not limited thereto. In addition, the third display 170 may be configured to receive user touch input. In contrast, in association with the category of the third display 170, the same description as in the first and second displays (150, 160) will herein be omitted for convenience of description.

The sensing part 70 may collect user access information contained in the sensing region. Although the sensing part 70 may include the proximity sensor 71, the scope or spirit of the sensing part 70 is not limited thereto, and all constructions for collecting access of the user located in the vicinity of the refrigerator 1a may be used. For example, the sensing part 70 is implemented as the proximity sensor 71 for convenience of description.

The proximity sensor 71 may be installed in the refrigerating chamber doors (21, 22). The proximity sensor 71 may always operate when information collected by the proximity sensor 71 is needed when a specific program or application operates in the refrigerator 1a, and the collected information may be provided to the control process of the controller 90 upon receiving a request from the controller 90.

The memory 75 may store various data for driving and controlling the refrigerator 1a, a control program or application therein. In more detail, the memory 75 may perform user voice recognition, and may store data, a control program or an application needed to control the refrigerator 1a. In accordance with the embodiment, the memory 75 may store the application related to user voice recognition (e.g., Food-Reminder application, Morning-Brief application, etc.) therein, and these applications may be stored in the initial stage, or may be downloaded from the user during operation of the refrigerator 1a.

The memory 75 may store a control program to control the refrigerator 1a, User Interface (UI) related to the application, an object (e.g., image, text, icon, button, etc.) to provide the UI, user information, documents, databases (DBs), or associated data. For example, the memory 75 may display user information to identify user voice, may display user access, and may store an object for displaying a user voice recognition state.

Upon receiving a control signal from the controller 90, the memory 75 may store a touch signal U1 detected by the input part 110, and may store position information of successive touch signals U1 corresponding to successive movement of the touch action U1. In addition, the memory 75 may store input signal information detected by the button part 120.

The controller 90 may control flow of signals between internal constituent elements of the refrigerator 1a and overall operation of the refrigerator 1a, and may process data. The controller 90 may perform the control program or application stored in the memory 75 when a control command (e.g., input of the button part 120, a voice command, etc.) from the user is input or a predetermined condition (e.g., when the proximity sensor 71 detects user access) is satisfied.

The controller 90 may include a Read Only Memory (ROM) 94 for storing the control program or application needed to control the processor 92 and the refrigerator 1a; and a Random Access Memory (RAM) 96 for storing the external input signal or data of the refrigerator 1a or used as a storage region corresponding to various tasks executed in the refrigerator 1a. ROM 94 and RAM 96 of the controller 90 may conceptually include ROM and RAM of the memory 75.

The processor 92 may include a graphics processor to process images or video data. The processor may be implemented as a System on Chip (SoC) including a Core and a GPU. In accordance with the embodiment, the controller 90 may include a graphics processor and a graphics processing board including RAM or ROM in a separate circuit board electrically connected to the controller 90.

The processor 92 may include a voice recognition processor for processing and interpreting a user voice signal. In accordance with the embodiment, the controller 90 may include a voice recognition processor and a voice recognition processing board including ROM or ROM in a separate circuit board electrically connected to the controller 90. The controller 90 may perform voice recognition of an isolated language through the voice recognition processor, and may provide the user with a Speech to Text (STT) regarding a voice command.

The embodiments of the present disclosure will hereinafter be described with reference to the attached drawings.

Figure 28:
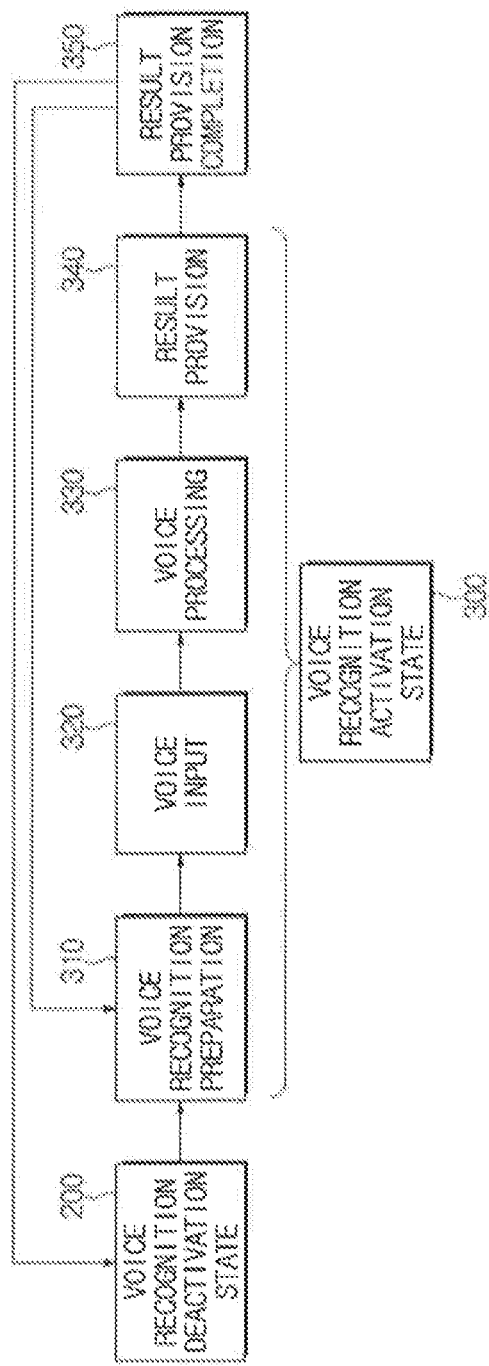
FIG. 28 is a conceptual diagram illustrating a voice recognition process of the refrigerator according to an embodiment of the present disclosure.

FIG. 28 is a conceptual diagram illustrating a voice recognition process of the refrigerator (1a) according to an embodiment of the present disclosure.

Referring to FIG. 28, if the user inputs a voice recognition activation command to the refrigerator 1a, or if a predetermined condition is satisfied, the refrigerator 1a may transition from a voice recognition deactivation state 200 to a voice recognition activation state 300.

If the user inputs a voice command to the refrigerator 1a in the voice recognition activation state 300, the voice recognition process is carried out. The voice recognition process may be carried out after passing through the voice recognition preparation step 310, the voice input step 320, the voice processing step 330, the result provision step 340, and the result provision completion step 350. The voice recognition process of the present disclosure may recognize isolated language and natural language, and the following user interface (UI) provision method can be applied to both the isolated language recognition process and the natural language recognition process.

The third display 170 may provide text, icons, or animation screen images regarding the corresponding steps according to progression of the voice recognition process, and may also provide an Auditory User Interface (AUI) according to the embodiment.

In the result provision completion step 350, if the voice recognition activation command from the user is received, or if the predetermined condition is satisfied, the voice recognition process may be carried out again. In addition, if the voice recognition deactivation command from the user is received, or if the predetermined second time elapses, the refrigerator 1a may switch to the voice recognition deactivation state 200.

The process for switching to the voice recognition activation state 300 in the voice recognition deactivation state 200 will hereinafter be described.

If the voice recognition activation command from the button part 120 is input, or if the proximity sensor 71 detects user access, the controller 90 may provide a voice control screen image to the third display 170. In addition, if the predetermined voice signal is recognized, the controller 90 may also provide the voice control screen image to the third display 170. Subsequently, if the user voice command is input through the voice input part 130, the voice recognition process regarding the input voice command may be visually displayed on the voice control screen image of the third display 170.

Figure 29:
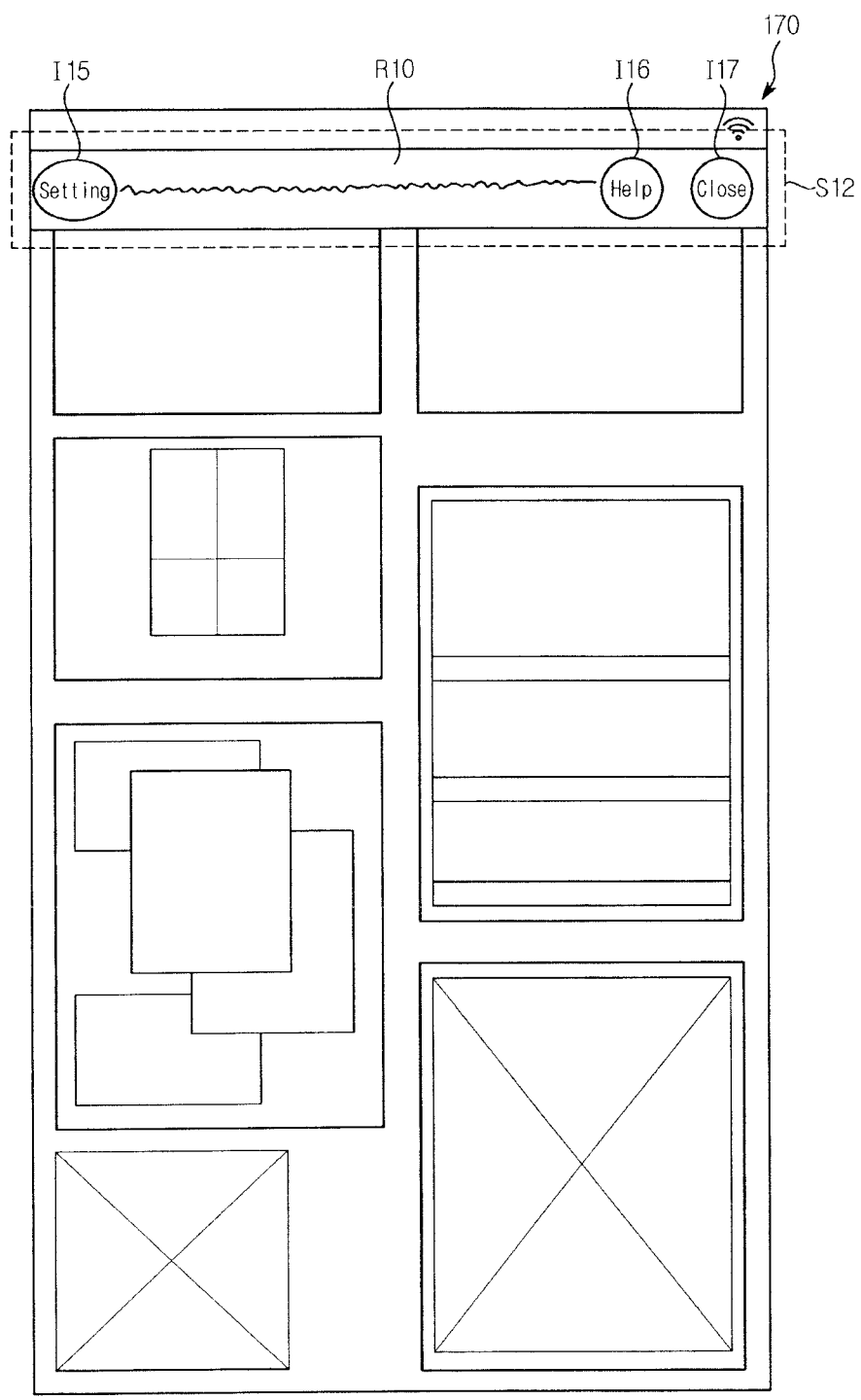
FIG. 29 is a conceptual diagram illustrating exemplary provision of a voice control screen image.
Figure 30:
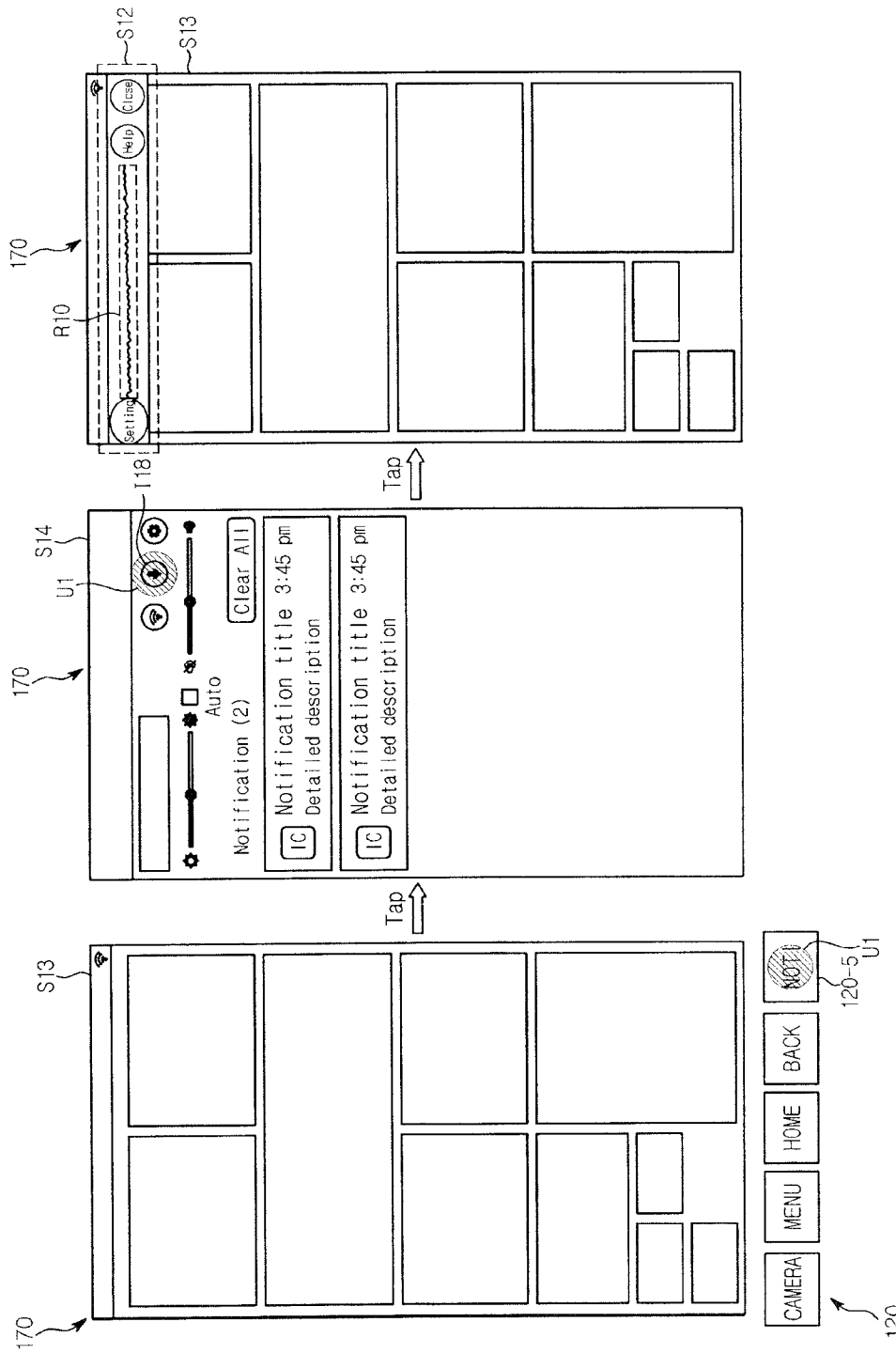
FIGS. 30 and 31 are exemplary views illustrating an activation process of the voice control screen image.
Figure 31:
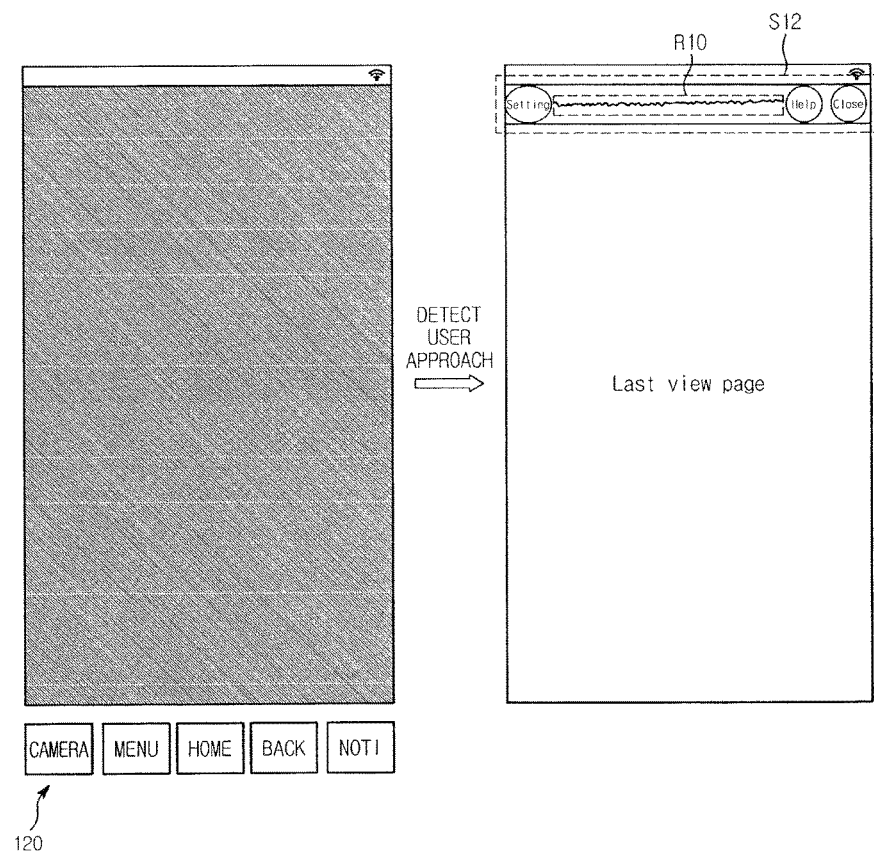

FIG. 29 is a conceptual diagram illustrating exemplary provision of a voice control screen image. FIGS. 30 and 31 are exemplary views illustrating an activation process of the voice control screen image.

Referring to FIG. 29, the voice control screen image S12 may be provided at the top of the third display 170. The voice control screen image S12 may include an environment setting icon (I15), a voice recognition state display region R10, a help icon (I16), and a close icon (I17).

If user touch U1 is input to the environment setting icon (I15), the environment setting screen image may be displayed. If user touch U1 is input to the help icon (I16), the help popup menu may be displayed. If user touch U1 is input to the close icon (I17), the voice control screen image S12 may be closed and the voice recognition function may also be ended.

The voice recognition state display region R10 may display the voice recognition process using text, images, or animation images, such that the user can easily recognize the voice recognition state. The voice control screen image S23 may be activated as follows.

Referring to FIG. 30, if the user touches (U1) the notification (NOTI) button 120-5 of the button part 120, the home screen image S13 of the third display 170 may be switched to the notification screen image S14. If the user touches (U1) the microphone icon (I18) provided at the top of the notification screen image S14, the notification screen image S14 may be switched again to the home screen image S13. The voice control screen image S12 may also be provided at the top of the home screen image S13. However, the scope of the method for providing the voice control screen image S12 is not limited thereto. Of course, the voice control screen image S12 may also be provided at the lower end of the home screen image. In addition, the method for activating the voice control screen image S12 may also be achieved by user voice recognition or the like as described above.

Referring to FIG. 31, when the third display 150 is turned off or when the screen saver is displayed on the third display 170, if the proximity sensor 71 detects user access, the controller 90 may provide the third display 170 with the voice control screen image S12.

Although the third display 170 may provide not only the latest display screen image but also the voice control screen image S12 provided at the top of the latest display screen image, the method for providing the voice control screen image S12 is not limited thereto, and the voice control screen image S12 may also be provided at the lower end of the latest displayed screen image. If the voice control screen image S12 is activated, the voice command from the user may be input. Upon receiving the voice command from the user, the controller 90 may visualize the voice recognition process on the voice recognition state display region R10.

Figure 32:
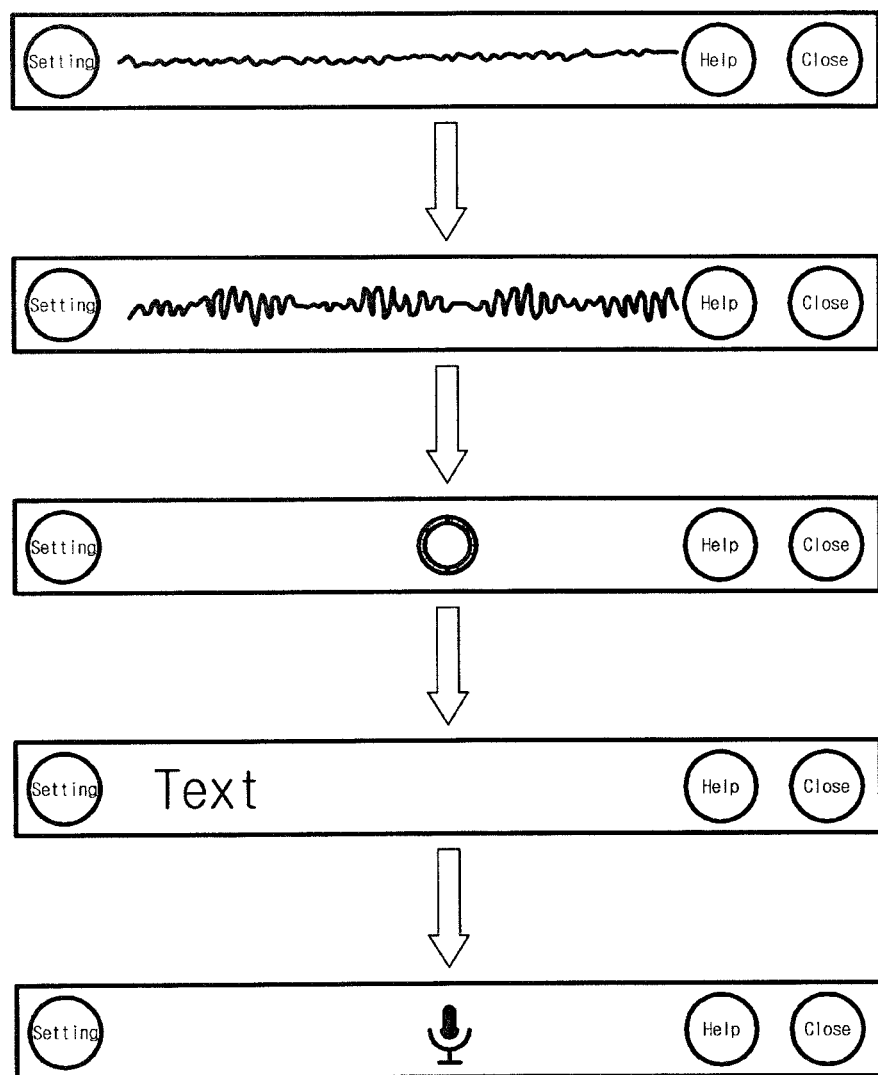
FIG. 32 is a view illustrating an example of visualizing a voice recognition process and providing the visualized voice recognition process in the voice control screen image.
Figure 33:
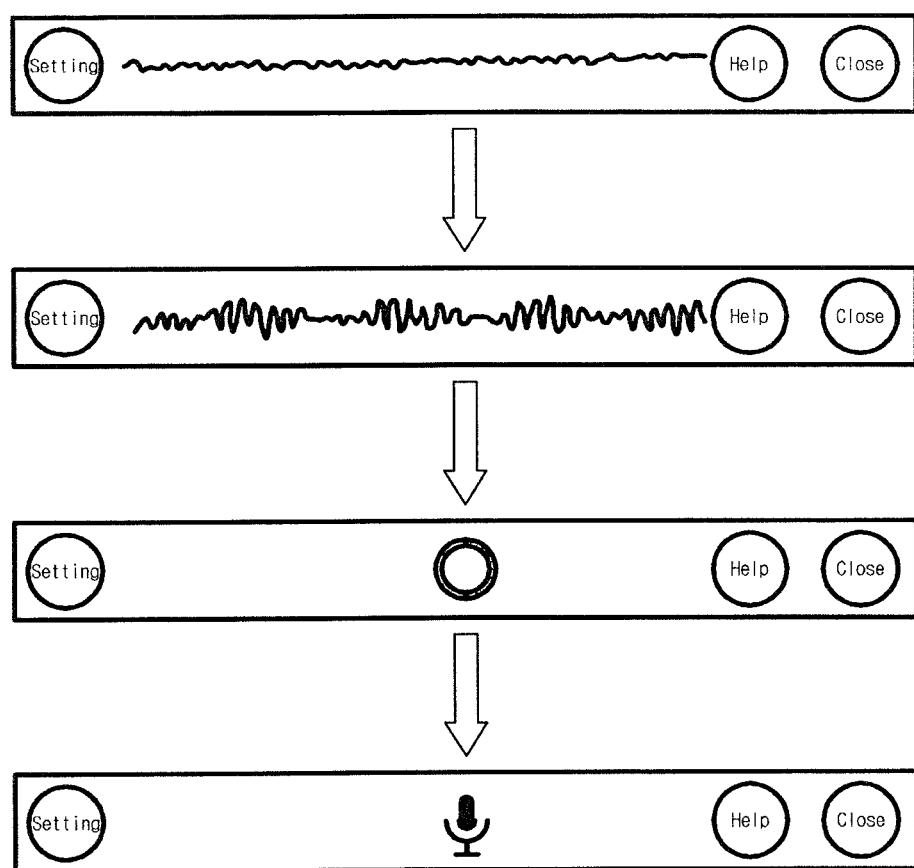
FIG. 33 is a view illustrating an example of displaying the voice recognition process in the voice control screen image.

FIGS. 32 and 33 are views illustrating exemplary display of the voice recognition process in the voice control screen image S12.

Referring to FIG. 32, if the voice control screen image S12 is activated, the animation image indicating the voice recognition preparation state may be displayed on the voice recognition state display region R10.

If the voice command from the user is input, the animation image indicating that the voice command from the user is currently input may be displayed on the voice recognition state display region R10.

If the voice command from the user is input, the image indicating that voice processing is currently executed may be displayed on the voice recognition state display region R10.

If voice processing is completed, the voice recognition result may be provided as text on the voice recognition state display region R10.

After the voice recognition result is provided, if a predetermined third time elapses or an AUI for the text is provided, the icon indicating completion of the voice recognition process may be displayed on the voice recognition state display region R10.

Meanwhile, if voice recognition is not performed in the voice recognition process, the voice recognition state display region R10 may not provide the text-shaped voice recognition result.

Referring to FIG. 33, if voice recognition is not performed in the voice recognition process, the image indicating the current voice processing state is displayed on the voice recognition state display region R10, and the icon indicating completion of the voice recognition process may also be displayed thereon.

The displaying scheme of the voice recognition state display region R10 is not limited to the examples of FIGS. 32 and 33, and the voice recognition process may also be provided according to other schemes other than the above-mentioned schemes.

If a voice command from the user is input to the controller 90, the controller may perform the refrigerator (1a) function corresponding to the voice command, and may provide the function execution screen image corresponding to the corresponding function to the third display 170.

Figure 34A:
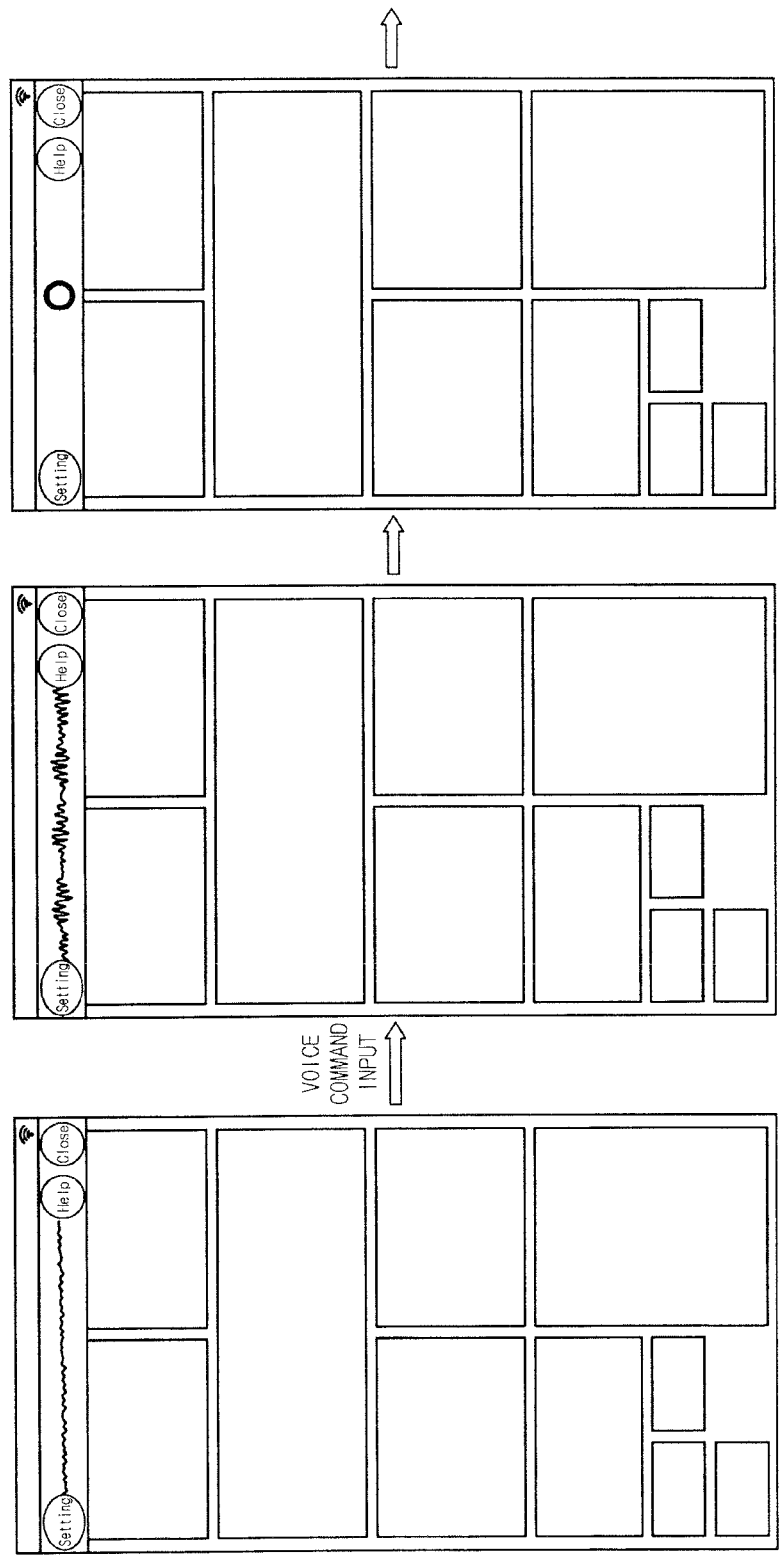
FIGS. 34A and 34B are views illustrating examples of providing a function execution screen image using a voice command
Figure 34B:
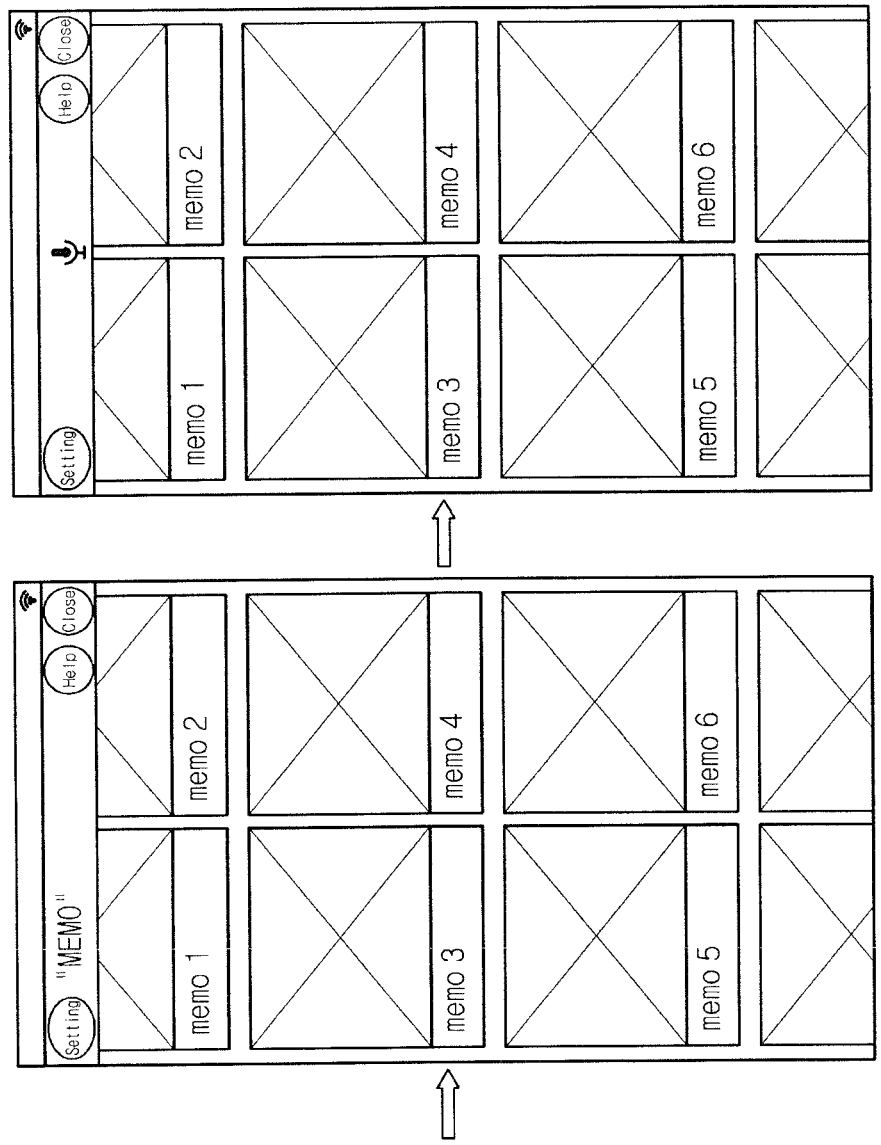

FIGS. 34A and 34B are views illustrating examples for providing a function execution screen image S15 using a voice command Referring to FIGS. 34A and 34B, if a voice command of the user is input, the voice recognition process may be visualized and displayed on the voice recognition state display region R10 of the voice control screen image S12.

For example, if the user inputs a voice command "Open Memo", the third display 170 may be switched to the refrigerator function execution screen image S15 corresponding to the "Open Memo" command That is, the memo program or the memo application of the refrigerator 1a may be executed according to a user voice command, and the screen image of the third display 170 may be switched to the home screen image regarding the memo function.

If successive voice commands from the user are input, the controller 90 may execute the corresponding function of the refrigerator 1a in response to the successive voice commands, and may display the execution screen image S15 of the corresponding function on the third display 170.

For example, assuming that the user desires to add the plurality of items to the shopping list of the food reminder application, if the user inputs the command "Add Item", the screen image of the third display 170 may be switched to the image of the shopping list contained in the food reminder application. Thereafter, if the user further inputs the commands (e.g., "Apple", "Orange", and "Water"), the apple, orange, and water may be added to the shopping list. In other words, the user may add the plurality of items to the shopping list by successively inputting the food names If the user touches (U1) the help icon of the voice control screen image S12, the controller 90 may provide the voice command guide screen image.

Figure 35:
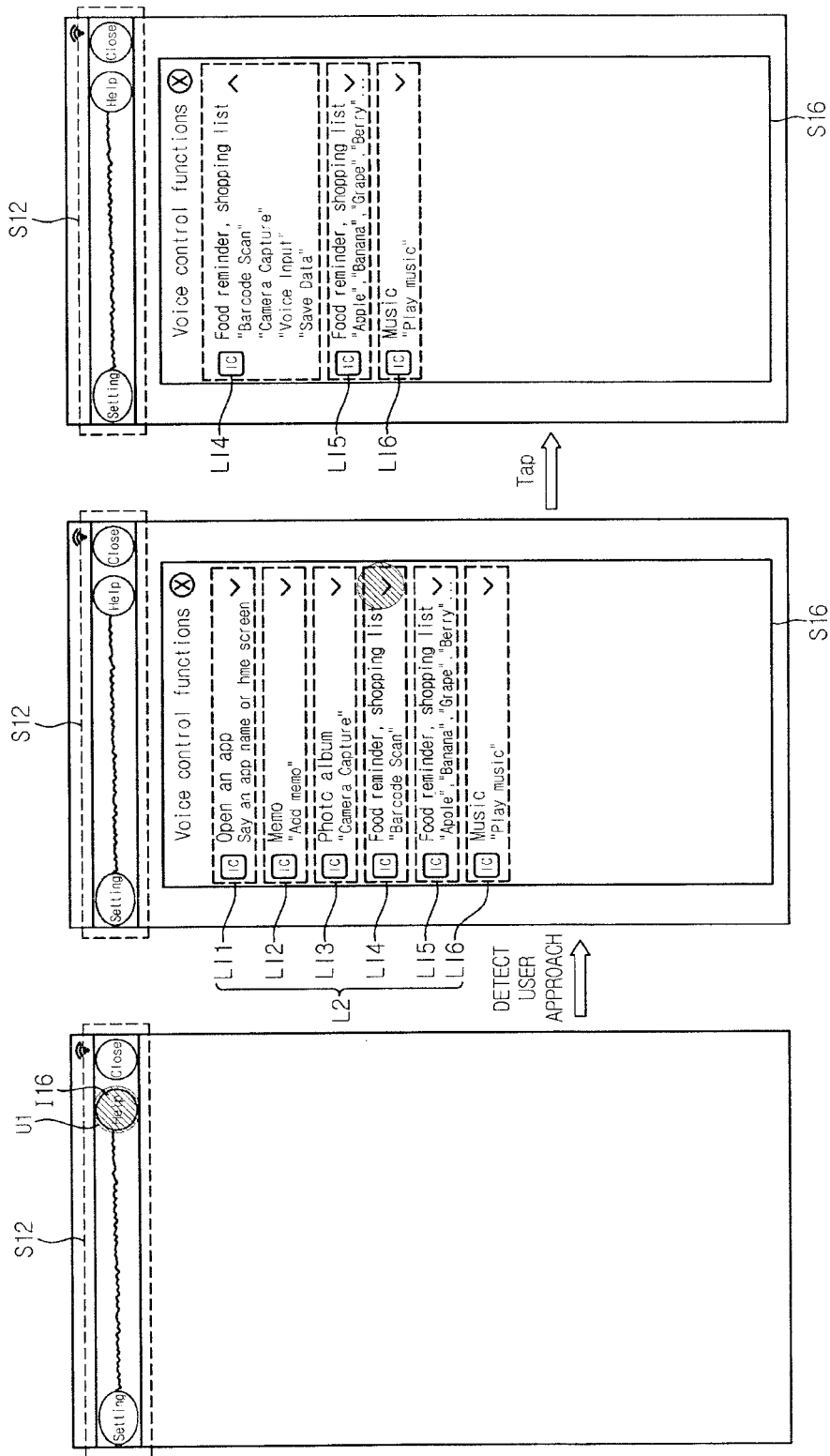
FIG. 35 is a view illustrating an example of providing a voice command guide screen image.

FIG. 35 is a view illustrating an example for providing a voice command guide screen image.

Referring to FIG. 35, if the user touches (U1) the help icon (I16) of the voice control screen image S12, the voice command guide screen image S16 may be provided. If the words (e.g., "Voice Control Function") indicating the entry to the voice command guide screen image may be displayed at the top of the voice command guide screen image S16, and the voice control function list L2 may be provided at the lower end of the voice command guide screen image S16. The voice control function list L2 may include the plurality of voice control items (LI1, LI2, LI3, LI4, LI5, LI6), and each item may include a title part and expansion display button B11. Description of the corresponding items may be displayed at the lower end of the title part, and the latest commands for the corresponding items may be displayed at the lower end of the title part. In addition, if user touch U1 is input to the expansion display button B11, all commands for the corresponding item (LI4) may be displayed.

The refrigerator 1a according to the embodiment has been described above.

The refrigerator configured to provide the food entrance/exit management function according to another embodiment will hereinafter be described.

In accordance with one aspect of the present disclosure, the refrigerator has the food capture function, and can manage foods stored in the compartment on the basis of the captured information. More specifically, the refrigerator or the mobile terminal 500 can manage foods according to the captured information.

In accordance with another aspect of the present disclosure, the refrigerator can receive the purchase items of the shopping list in association with the shopping list, and can manage the stored foods on the basis of the purchase information.

In accordance with another aspect of the present disclosure, the refrigerator can receive the purchase list of the user in association with the shopping mall, and can manage the stored foods on the basis of the purchase information.

Figure 36:
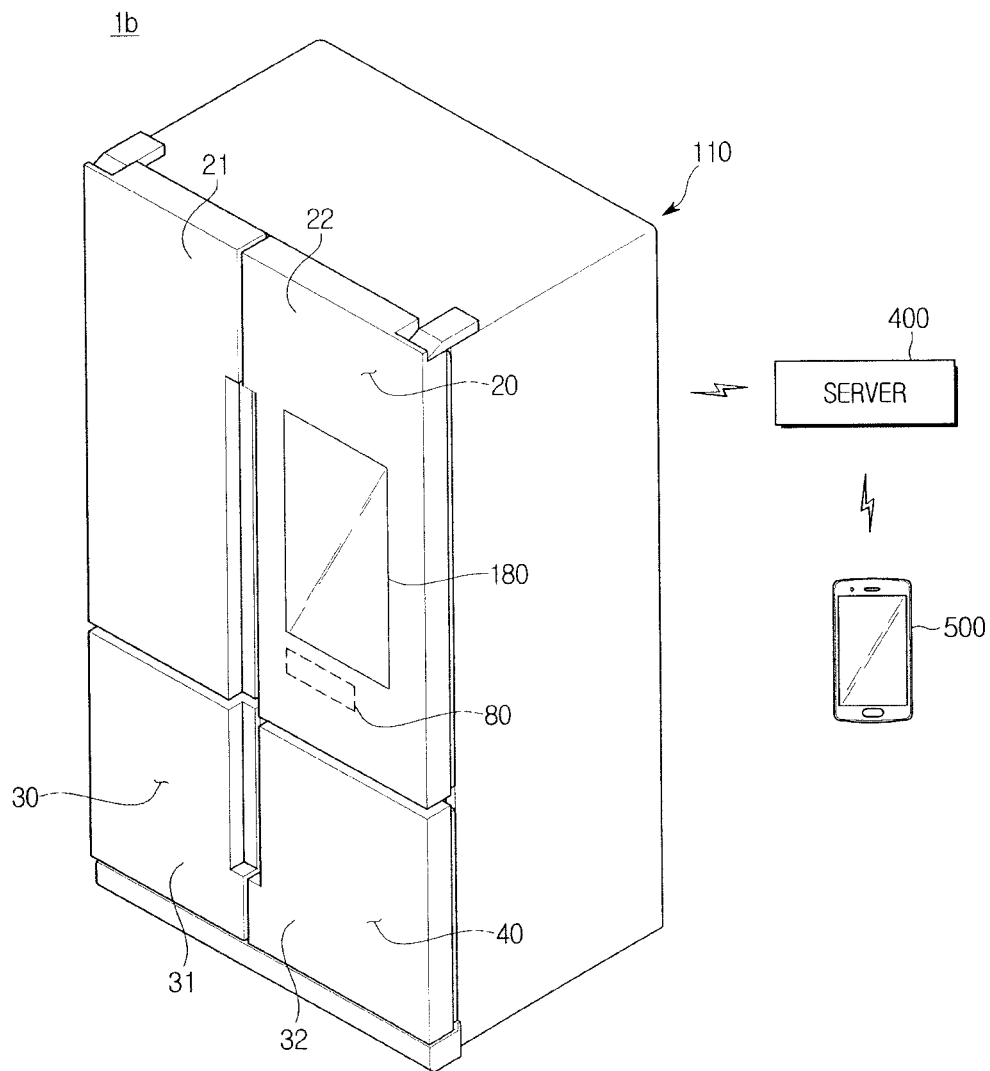
FIG. 36 is a view illustrating a refrigerator according to another embodiment of the present disclosure.
Figure 37:
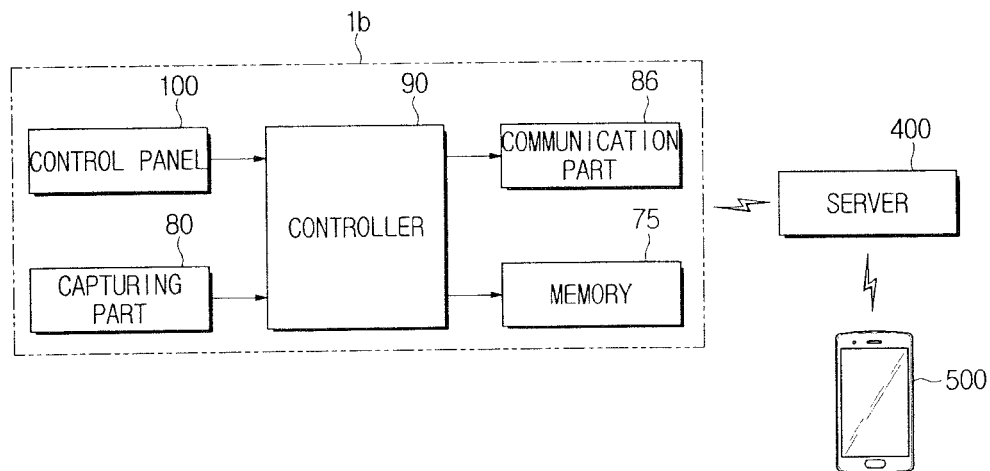
FIGS. 37 and 38 are block diagrams illustrating the refrigerator according to another embodiment of the present disclosure.
Figure 38:
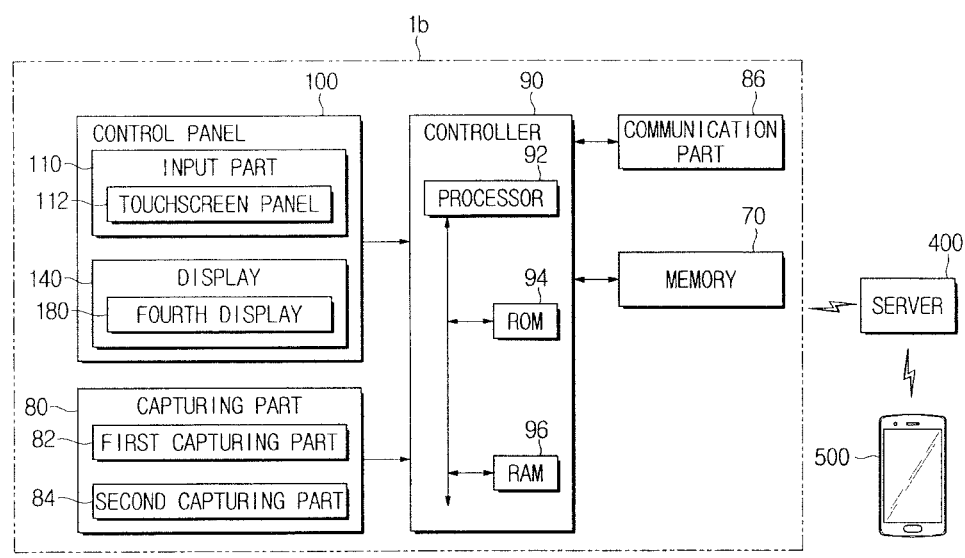

FIG. 36 is a view illustrating the refrigerator 1b according to another embodiment of the present disclosure. FIGS. 37 and 38 are block diagrams illustrating the refrigerator 1b according to another embodiment of the present disclosure.

Referring to FIGS. 36 to 38, the refrigerator 1b according to another embodiment may exchange data with the mobile terminal 500 through the server 400.

The refrigerator 1b according to another embodiment may include a main body 10, storage chambers (20, 30, 40) formed in the main body 10, and a cool air supply device (not shown) to supply cool air to the storage chambers (20, 30, 40).

The main body 10 may include an inner casing to form the storage chambers (20, 30, 40); an outer casing coupled to the exterior of the inner casing so as to form the exterior appearance of the refrigerator 1b; and insulation disposed between the inner casing and the outer casing so as to insulate the storage chambers (20, 30, 40).

The storage chambers (20, 30, 40) may respectively have open front surfaces for entrance/exit of food. The open front surfaces of the refrigerating chamber 20 may be opened or closed by refrigerating chamber doors (21, 22) hinged to the main body 10. The open front surfaces of the freezing chamber 30 and the temperature changeable chamber 40 may be opened or closed by the doors (31, 32) hinged to the main body 10.

The display 180 may be mounted to one of the refrigerating chamber doors (21, 22) such that the user located at the outside of the refrigerator 1b can confirm a state of the refrigerator 1b or can establish the operation condition of the refrigerator 1b without opening the refrigerating chamber doors (21, 22).

In addition, one of the refrigerating chamber doors (21, 22) may include the capturing part 80 configured to capture bar codes attached to the stored foods or a packing container of the foods.

The server 400 may be connected to the Internet, and may store user information of the refrigerator 1b and the mobile terminal 500. The mobile terminal 500 may communicate with the refrigerator 1b over the network. The mobile terminal 500 may include various applications related to remote control, monitoring, or food management functions. Thus, the user can confirm a state of the stored foods or manage entrance/exit of the foods using the mobile terminal 500. The refrigerator 1a will hereinafter be described in detail.

The refrigerator 1b may include a control panel 100, a capturing part 80, a communication part 86, a memory 75, and a controller 90.

The control panel 100 may interface with the user. Therefore, the control panel 100 may be arranged at the front surfaces of the refrigerating chamber doors (21, 22) so that the user can easily approach and manipulate the control panel 100.

The control panel 100 may include the input part 110 for user manipulation, and a display 140 for providing the user with necessary information.

The input part 110 may receive a control command for the refrigerator 1b from the user, and the display 140 may display the screen image for managing foods. The input part 110 and the display 140 may be incorporated with each other. More particularly, the display 140 may include the display 180 mounted to the front surfaces of the refrigerating chamber doors (21, 22), and the input part 110 may include a touchscreen panel 112 incorporated with the display 180 provided to the front surfaces of the refrigerating chamber doors (21, 22). In order to distinguish the display 180 from the first to third displays (150, 160, 170), the display 180 will hereinafter be referred to as the fourth display 180 according to the embodiment.

The capturing part 80 may include a camera configured to capture bar codes attached to the stored foods or a packing container of the foods. The capturing part 80 may include a first capturing part 82 to capture foods stored in the chamber, and a second capturing part 84 to capture bar codes attached to the stored foods or a packing container of the foods.

The first capturing part 82 may be installed in the chamber. More particularly, the first capturing part 82 may be installed in the French bar of each of the storage chamber doors (21, 22, 31, 32), and the number of the first capturing parts 82 may be identical to the number of shelves contained in each storage chamber (20, 30, 40). Although the first capturing part 82 can be installed in each storage chamber (20, 30, 40), the following description assumes that the first capturing part 82 is installed in the refrigerating chamber 20 for convenience of description.

The first capturing part 82 may capture the indoor state of the refrigerating chamber as soon as the refrigerating chamber doors (21, 22) are opened and closed. In accordance with the embodiment, the specific time at which the refrigerating chamber doors (21, 22) are opened and closed may be detected by a circuit mounted to the refrigerating chamber doors (21, 22) or the French bar, and the first capturing part 82 may capture the indoor state by this detection signal.

A circuit, lens, tool, or software of the camera contained in the first capturing part 82 may be configured in a manner that a viewing angle of the camera can maintain a predetermined first angle or higher. In addition, the camera of the first capturing part 82 may include a heater located in the vicinity of the camera lens or the circuit, and the heater may be controlled in a manner that the ambient temperature of the camera is maintained at a predetermined temperature or higher. Therefore, the influence that humidity or dew condensation of the indoor space of the refrigerating chamber 20 is applied to the lens or circuit of the camera can be minimized.

The second capturing part 84 may be installed in the storage chamber doors (21, 22, 31, 32). The second capturing part 84 may be installed in any of the storage chamber doors (21, 22, 31, 32), and may be installed at the front surface of any one of the refrigerating chamber doors (21, 22) so that the user can easily approach the refrigerating chamber doors (21, 22).

The second capturing part 84 may capture bar codes attached to the stored foods or a packing container of the foods.

The communication part 86 may control the refrigerator 1*b* to communicate with the external device under the control of the controller 90. The communication part 86 may receive a remote control signal from the mobile terminal 500 under the control of the controller 90, such that the communication part 86 can connect the refrigerator 1*b* to the mobile terminal 500.

The communication part 86 may include a wireless Ethernet, a wireless LAN (WLAN), and a local area network (LAN) unit according to performance and structure of the refrigerator 1*b*.

The LAN unit may be wirelessly connected to an Access Point (AP) at an AP installed position according to a control signal of the controller 90. The LAN unit may support IEEE1002.11x. Short-range communication of the LAN unit may include Bluetooth, Bluetooth low energy, infrared data association (IrDA), Wireless Fidelity (Wi-Fi), Ultra Wideband (UWB), Near Field Communication (NFC), etc.

The memory 75 may store various data, control programs or applications to drive and control the refrigerator 1*b*. More particularly, the memory 75 may store data, control program, and applications to manage foods stored in the refrigerator 1*b*. For example, the memory 75 may store the application (e.g., Food-Reminder application, etc.) related to food management of the refrigerator 1*b*, and the application may be stored in the initial stage, or may be downloaded from the user during operation of the refrigerator 1*b*.

The memory 75 may store a control program to perform food management, User Interface (UI) related to the application, an object (e.g., image, text, icon, button, etc.) to provide the UI, user information, documents, DBs, or associated data. For example, the memory 75 may store food information to identify bar codes attached to the packing container of the food, food image information to identify the food captured by the capturing part 80, food image information to display an image of the food captured by the capturing part 80 on the display 140, and images or text information to allow the food reminder application to manage the expiration date of the stored foods.

The controller 90 may control signal flow of the internal constituent elements of the refrigerator 1*b* and overall operation of the refrigerator 1*b*, and may perform data processing.

If the user inputs a control command or a predetermined condition is satisfied, the controller 90 may perform the control program or application stored in the memory 75.

The controller 90 may include a Read Only Memory (ROM) 94 for storing the control program or application needed to control the processor 92 and the refrigerator 1*b*; and a Random Access Memory (RAM) 96 for storing the external input signal or data of the refrigerator 1*b* or used as a storage region corresponding to various tasks executed in the refrigerator 1*b*. ROM 94 and RAM 96 of the controller 90 may conceptually include ROM and RAM of the memory 75.

The processor 92 may include a graphics processor to process images or bar codes. The processor 92 may be implemented as a System on Chip (SoC) including a Core and a GPU. In accordance with the embodiment, the controller 90 may include a graphics processor and a graphics processing board including RAM or ROM in a separate circuit board electrically connected to the controller 90.

The embodiment of the present disclosure will hereinafter be described with reference to the attached drawings.

The refrigerator 1*b* according to the embodiment may provide the user with the stored food management function using the food reminder application. The food reminder application may provide the user with visual information indicating the presence or absence of the stored foods, the expiration date of the foods, etc. The user may recognize the above-mentioned information through the display 140 (e.g., the fourth display 180) of the refrigerator 1*b* or the display screen of the mobile terminal 500.

Figure 39:
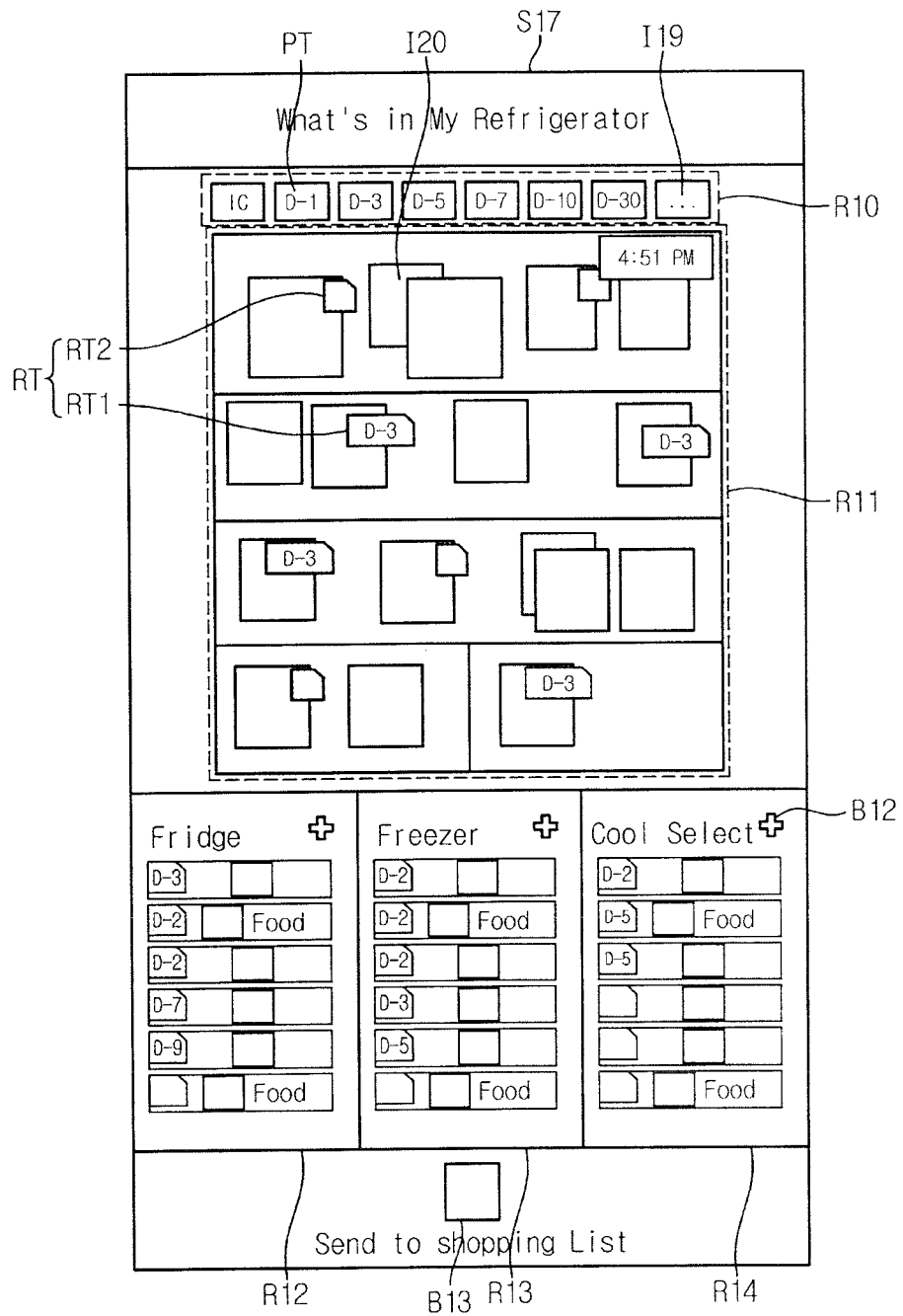
FIGS. 39 and 40 are views illustrating the principal screen images of a food reminder application according to an embodiment of the present disclosure.
Figure 40:
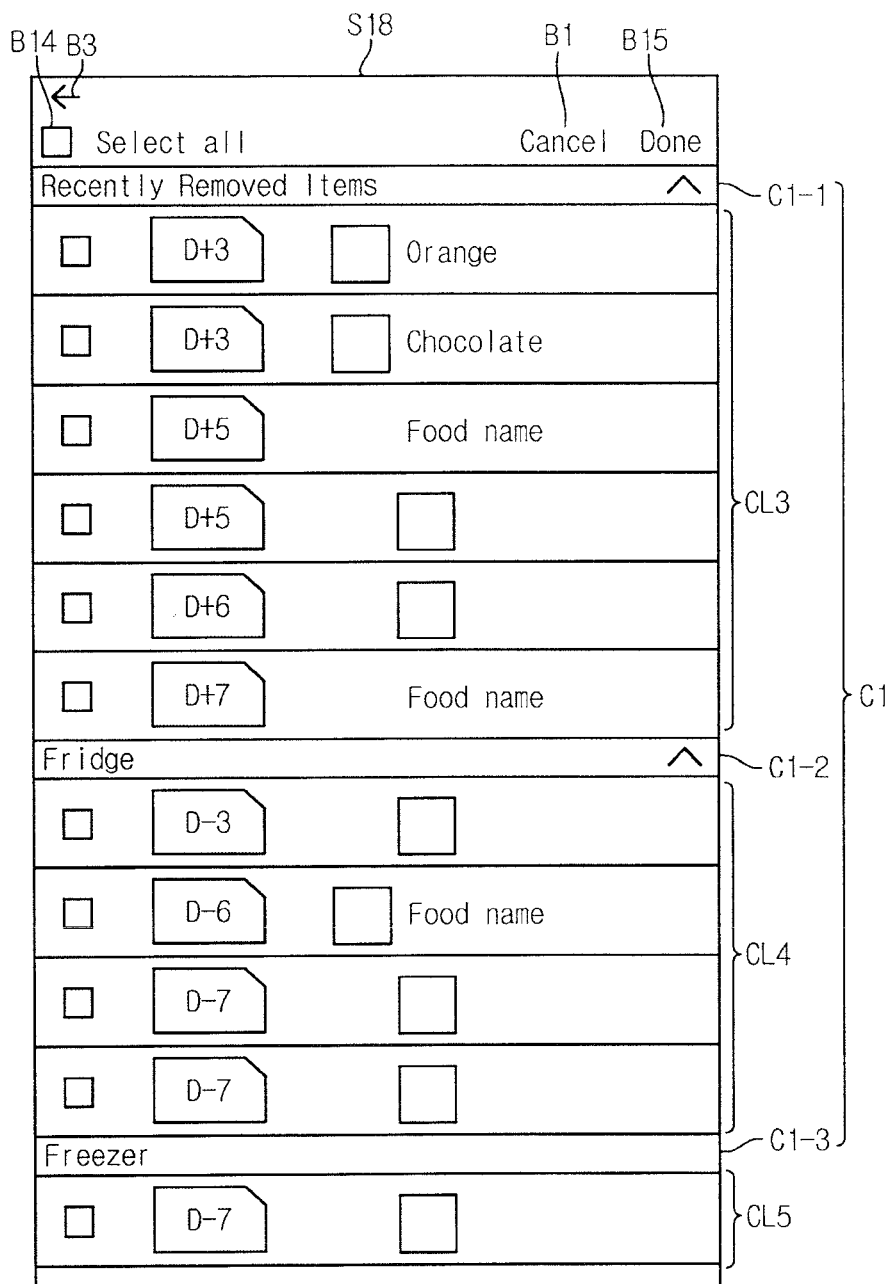

FIGS. 39 and 40 are views illustrating the principal screen images of a food reminder application according to an embodiment of the present disclosure.

FIG. 39 is a view illustrating the main screen image S17 of the food reminder application, and FIG. 40 is a view illustrating the shopping list transmission screen image S180.

Referring to FIG. 39, the main screen image S17 of the food reminder application may include a preset tag region R10, a food display region R11, a refrigerating chamber management region R12, a freezing chamber management region R13, and a temperature changeable chamber management region R14. The preset tag region R10 may be provided at the top of the main screen S17, and the food display region R11 may be installed at the center of the main screen image S17. The refrigerating chamber management region R12, the freezing chamber management region R13, and the temperature changeable management region R14 may be provided at the lower end of the food display region R11.

The plurality of preset tags (PT) to which the reminder tag (RT) can be easily attached may be mounted to the food image (I20) provided to the food display region R11. In addition, a calendar icon (I19) to which the reminder tag (RT) is attached may be provided at the food image using the calendar.

The visual image of the refrigerating chamber 20, the images (I20) of foods stored in the refrigerating chamber 20, and the reminder tags (RT) attached to the respective food images (I20) may be displayed on the food display region (R11). The visual image of the refrigerating chamber 20 may be provided from the camera of the first capturing part 82 mounted to the refrigerating chamber. Of course, the visual image of the refrigerating chamber 20 may also be provided from the camera installed at a rotation bar.

Meanwhile, the food image (I20) of the food display region R11 may be periodically updated. More particularly, the controller 90 may control the camera of the first capturing part 82 to capture the foods stored in the refrigerating chamber 20 using the opening/closing information of the refrigerating chamber doors (21, 22) as a trigger. The controller 90 may receive capture information from the first capturing part 82, and may update the food image (I20) displayed on the food display region R11.

The reminder tag (RT) may provide the user with food information (e.g., the expiration date information). The reminder tag (RT) may be displayed in different ways according to information to be provided by the reminder tag (RT). For example, the reminder tag (RT) indicating that the remaining time of the expiration dates is at least 7 days may be denoted by RT1. The reminder tag (RT) indicating that the remaining time of the expiration dates is shorter than 7 days may be denoted by RT2.

The refrigerating chamber management region R12 may display the list of foods stored in the refrigerating chamber 20. The food items of the food list may be added by clicking the food add button B12 contained in the refrigerating chamber management region R12. In accordance with the embodiment, the foods included in the door guard of the refrigerating chamber 20 may not be displayed on the food display region R11, and the foods may be managed through the refrigerating chamber management region R12.

The freezing chamber management region R13 may display the list of foods stored in the freezing chamber 30. The food items of the food list may be added by clicking the food add button B12 contained in the freezing chamber management region R13. In accordance with the embodiment, the foods stored in the refrigerating chamber 20 may be mainly displayed on the food display region R11, such that the foods stored in the freezing chamber 30 may be managed through the freezing chamber management region R13.

The temperature changeable chamber management region R14 may display the list of foods stored in the temperature changeable chamber 40. The food items of the food list may be added by clicking the food add button B12 contained in the temperature changeable chamber management region R14. In accordance with the embodiment, the foods stored in the refrigerating chamber 20 may be mainly displayed on the food display region R11, such that the foods stored in the temperature changeable chamber 40 may be managed through the freezing chamber management region R13.

In accordance with the embodiment, the button "Send to Shopping List" B13 may be provided at the lower end of the main screen image S17. If the user touches (U1) the "Send to Shopping List" button B13, the shopping list send screen image S18 for selecting whether to send the food list contained in the food reminder application to the shopping list application may be provided.

Referring to FIG. 40, the "All select" button B14, the "Back" button B3, the "Cancel" button B1, the "Finish" button B15, etc. may be provided at the top bar (TB) of the shopping list transmission screen image S18. The shopping list transmission item C1 and the item lists (CL3, CL4, CL5) for the corresponding items may be provided at the lower end of the top bar (TB).

The shopping list transmission item C1 may include the "Recently Removed Items" item C1-1, the refrigerating chamber food transmission item (Fridge) C1-2, and the freezing chamber food transmission item (Freezer) C1-3, and the item lists (CL3, CL4, CL5) for the corresponding items may be displayed on the respective items.

The food management function of the refrigerator 1b according to the embodiment will hereinafter be described with reference to the attached drawings.

For example, the reminder tag (RT) may be established by dragging the preset tag (PT) to the corresponding food image of the food display region R11.

Figure 41:
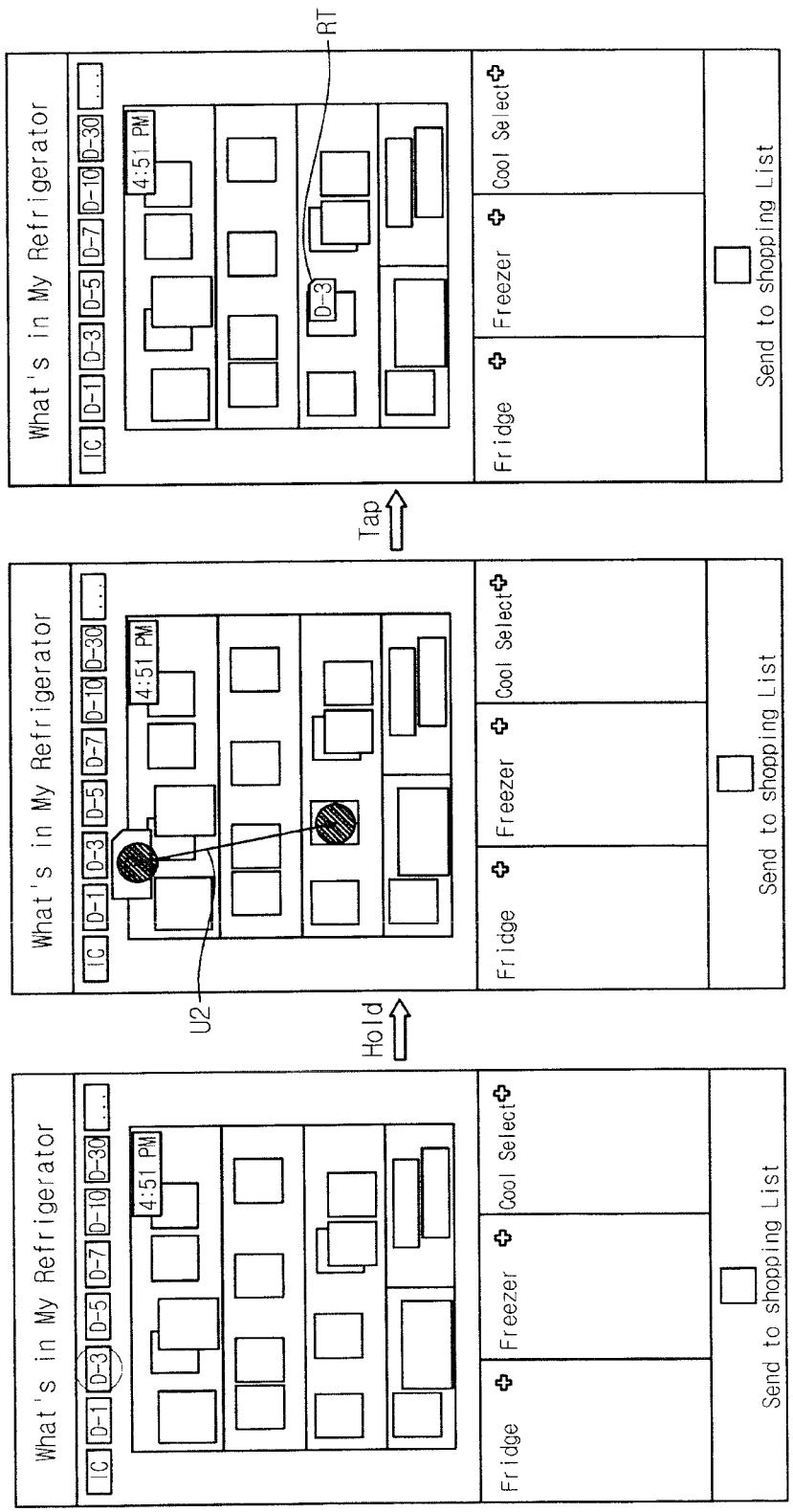
FIG. 41 is a conceptual diagram illustrating a method for setting a reminder tag by dragging a preset tag.

FIG. 41 is a conceptual diagram illustrating a method for setting a reminder tag (RT) by dragging a preset tag (PT).

Referring to FIG. 41, if the user drag touch U2 is input to the preset tag (PT), the reminder tag (RT) may be created at the finish time of the user drag touch U2. In accordance with the embodiment, the reminder tag (RT) may be dragged again so that it can be movable. If the user touch U1 is input to the reminder tag (RT), the popup menu for editing the reminder tag (RT) may be provided.

In accordance with the embodiment, the user may drag the calendar icon (I19) to the corresponding food image of the food display region R11 so that the reminder tag (RT) may be established. The user may establish the reminder tag (RT) by dragging the calendar icon (I19), so that a schedule not provided from the preset tag (PT) may be established.

In addition, the user may add the food item to the refrigerating chamber management region R12 by clicking the food add button B12 of the refrigerating chamber management region R12. Foods may also be added to the freezing chamber management region R13 and the temperature changeable chamber management region R14 in the same manner as in the refrigerating chamber management region R12, and detailed description of the refrigerating chamber management region R12 may include detailed description of the freezing chamber management region R13 and the temperature changeable chamber management region R14.

Figure 42:
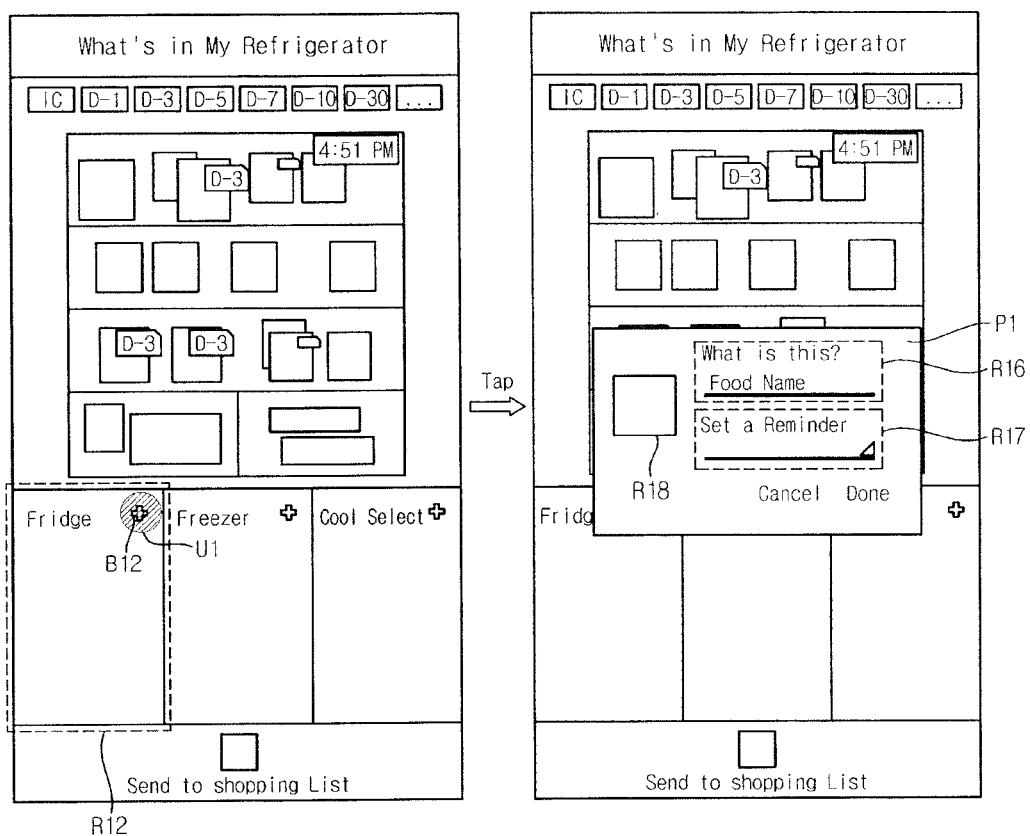
FIG. 42 is a conceptual diagram illustrating a method for adding a food item to a refrigerating chamber management region by clicking a food add button of the refrigerating chamber management region.

FIG. 42 is a conceptual diagram illustrating a method for adding a food item B12 to a refrigerating chamber management region R12 by clicking a food add button of the refrigerating chamber management region R12.

Referring to FIG. 42, if user touch U1 is input to the food add button B12 of the refrigerating chamber management region R12, the food add popup menu P1 may be provided. The food add popup menu P1 may include the test input region R16, the reminder schedule setting region S17, and the image region R18.

The user may directly input the names of foods desired to be managed through the food add popup menu P1, and may also input the reminder date, the food image, etc. through the food add popup menu P1. The food image may provide the image of food directly captured by the camera of the second capturing part 84. In accordance with the embodiment, the food image acquired through bar codes of the food container or the image of a photo album may be provided.

Meanwhile, through account interworking the contracted shopping mall and the food reminder application, the user may view or inquire about the list of foods purchased from the shopping mall through the food reminder application, and it may be possible to generate and manage the food information on the basis of the corresponding data.

In addition, data of the food reminder application is shared with data of the shopping list application in a manner that food information can also be created and managed. That is, the food reminder application may receive the food purchase list from the shopping list application, and may automatically update the overall list to the food reminder application, such that food information can be created and managed.

In contrast, the user may view the food list through the shopping list transmission screen image S18 of the food reminder application, and may transmit necessary foods to the shopping list application such that the corresponding food list may also be added to the memo list of the shopping list application.

In addition, the refrigerator 1b may receive indoor image information of each chamber from the mobile terminal 500, may generate food information, and may manage the generated food information. In this case, the indoor image information may be captured by the mobile terminal 500.

In addition, the refrigerator 1b may provide food management information to the mobile terminal 500 upon receiving a request from the mobile terminal 500. In accordance with the embodiment, the screen image of the fourth display 180 of the refrigerator 1b may be mirrored on the display 140 of the mobile terminal 500, such that the user can recognize information of the stored foods through the mobile terminal 500 while in motion.

The refrigerator 1b according to the embodiment has been described above.

The refrigerator for providing images mirrored on the display device according to another embodiment will hereinafter be described. In this case, the display device may include an image display device, for example, television, desktop computer, laptop, smartphone, mobile phone, etc.

Figure 43:
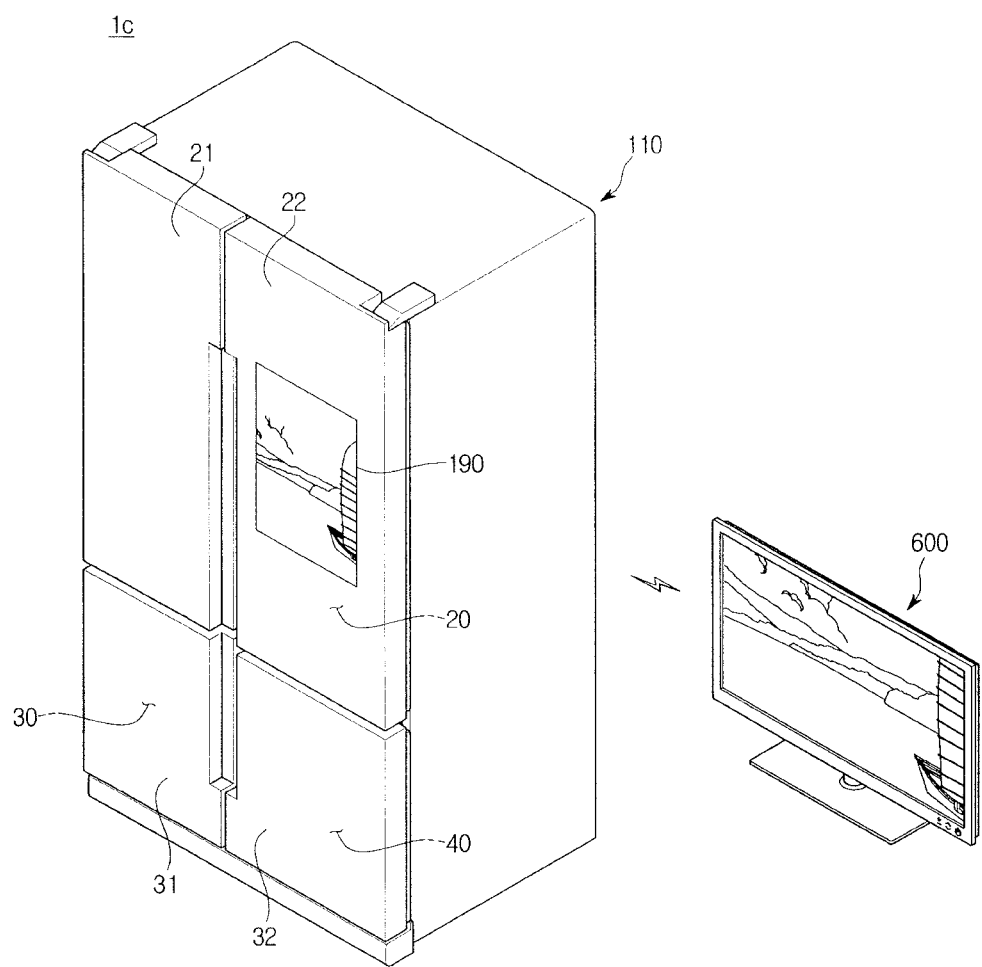
FIG. 43 is a view illustrating a refrigerator according to another embodiment of the present disclosure.
Figure 44:
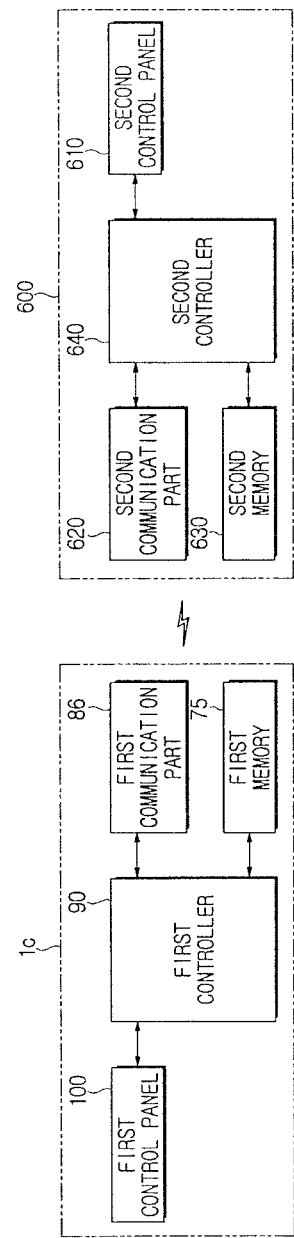
FIG. 44 is a block diagram illustrating the refrigerator according to another embodiment of the present disclosure.
Figure 45:
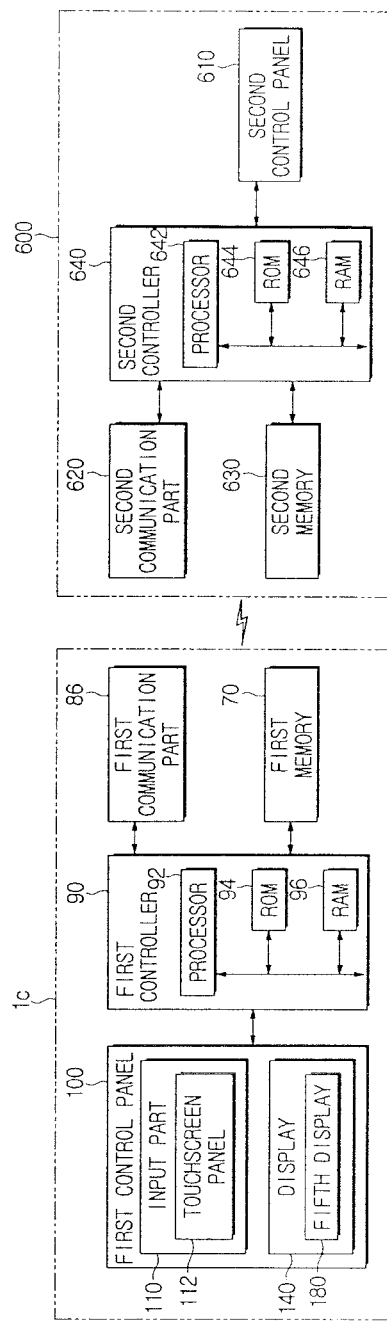
FIG. 45 is a block diagram illustrating the refrigerator according to another embodiment of the present disclosure.

FIG. 43 is a view illustrating the refrigerator 1c according to another embodiment of the present disclosure. FIG. 44 and FIG. 45 are a block diagram illustrating the refrigerator 1c according to another embodiment of the present disclosure.

Referring to FIGS. 43 and 44, the refrigerator 1c includes a main body 10, storage chambers (20, 30, 40) formed in the main body 10, and a cool air supply device (not shown) to supply cool air to the storage chambers (20, 30, 40).

The main body 10 may include an inner casing to form the storage chambers (20, 30, 40); an outer casing coupled to the exterior of the inner casing so as to form the exterior appearance of the refrigerator 1a; and insulation disposed between the inner casing and the outer casing so as to insulate the storage chambers (20, 30, 40).

The storage chambers (20, 30, 40) may respectively have open front surfaces for entrance/exit of food. The open front surfaces of the refrigerating chamber 20 may be opened or closed by refrigerating chamber doors (21, 22) hinged to the main body 10. The open front surfaces of the freezing chamber 30 and the temperature changeable chamber 40 may be opened or closed by the doors (31, 32) hinged to the main body 10.

The display 190 may be mounted to one of the refrigerating chamber doors (21, 22) such that the user located at the outside of the refrigerator can confirm a state of the refrigerator or can establish the operation condition of the refrigerator without opening the refrigerating chamber doors (21, 22).

The display 190 may communicate with the display device 600 over the network. If the refrigerator 1c is connected to the display device 600, the display 190 of the refrigerator 1c may display the mirroring screen image of the display device 600.

Detailed structures of the refrigerator 1c and the display device 600 will hereinafter be described.

The refrigerator 1c may include a control panel 100, a communication part 86, a memory 75, and a controller 90. The display device 600 may include a control panel 610, a communication part 620, a memory 630, and a controller 640.

In order to make a distinction between the refrigerator 1c and the display device 600, the control panel 100 of the refrigerator 1c will hereinafter be referred to as a first control panel 100, the communication part 86 will hereinafter be referred to as a first communication part 86, the memory 75 will hereinafter be referred to as a first memory 75, and the controller 90 will hereinafter be referred to as a first controller 90. In addition, the control panel 610 of the display device 600 will hereinafter be referred to as a second control panel 610, the communication part 620 will hereinafter be referred to as a second communication part 620, the memory 630 will hereinafter be referred to as a second memory 630, and the controller 640 will hereinafter be referred to as a second controller 640.

The control panel 100 may interface with the user. Therefore, the control panel 100 may be arranged at the front surfaces of the refrigerating chamber doors (21, 22) so that the user can easily approach and manipulate the control panel 100.

The control panel 100 may include the input part 110 for user manipulation, and a display 140 for providing the user with necessary information.

The input part 110 may receive a control command for the refrigerator 1c from the user, and the display 140 may display the mirroring screen image for the display device 600 thereon.

The input part 110 and the display 140 may be incorporated with each other. More particularly, the display 140 may include the display 190 mounted to the front surfaces of the refrigerating chamber doors (21, 22), and the input part 110 may include a touchscreen panel 112 incorporated with the display 190 provided to the front surfaces of the refrigerating chamber doors (21, 22). In order to discriminate among the first to fourth displays (150, 160, 170, 180), the display 180 will hereinafter be referred to as the fifth display 190 according to the embodiment.

The first communication part 86 may control the refrigerator 1c to communicate with the external device under the control of the first controller 90. The first communication part 86 may receive a remote control signal from the second communication part 620 of the display device 600 under the control of the first controller 90, such that the first communication part 86 can connect the refrigerator 1c to the mobile terminal 600.

The first communication part 86 may include a wireless Ethernet, a wireless LAN (WLAN), and a local area network (LAN) unit according to performance and structure of the refrigerator 1c.

The LAN unit may be wirelessly connected to an Access Point (AP) at an AP installed position according to a control signal of the controller 90. The LAN unit may support IEEE1002.11x. Short-range communication of the LAN unit may include Bluetooth, Bluetooth low energy, infrared data association (IrDA), Wireless Fidelity (Wi-Fi), Ultra Wideband (UWB), Near Field Communication (NFC), etc.

The first memory 75 may store various data, control programs or applications to drive and control the refrigerator 1c. More particularly, the first memory 75 may store programs or applications (e.g., Kitchen TV application) to provide the fifth display 190 of the refrigerator 1c with the mirroring screen image of the display device 600. This application may be stored in the initial stage, or may be downloaded from the user during operation of the refrigerator 1c.

The first memory 75 may store a control program to provide the fifth display 190 of the refrigerator 1c with the mirroring screen image of the display device 600, User Interface (UI) related to the application, an object (e.g., image, text, icon, button, etc.) to provide the UI, user information, documents, DBs, or associated data.

The first controller 90 may control signal flow of the internal constituent elements of the refrigerator 1c and overall operation of the refrigerator 1c, and may perform data processing.

If the user inputs a control command or a predetermined condition is satisfied, the first controller 90 may perform the control program or application stored in the memory 75.

The controller 90 may include a Read Only Memory (ROM) 94 for storing the control program or application needed to control the processor 92 and the refrigerator 1c; and a Random Access Memory (RAM) 96 for storing the external input signal or data of the refrigerator 1c or used as a storage region corresponding to various tasks executed in the refrigerator 1c. ROM 94 and RAM 96 of the controller 90 may conceptually include ROM and RAM of the memory 75.

The embodiment of the present disclosure will hereinafter be described with reference to the attached drawings.

The refrigerator 1c according to the embodiment may provide the user with the mirroring screen image of the display device 600 through the application supporting the mirroring function. The user may receive the mirroring screen image of the display screen image through the fifth display 190.

Figure 46:
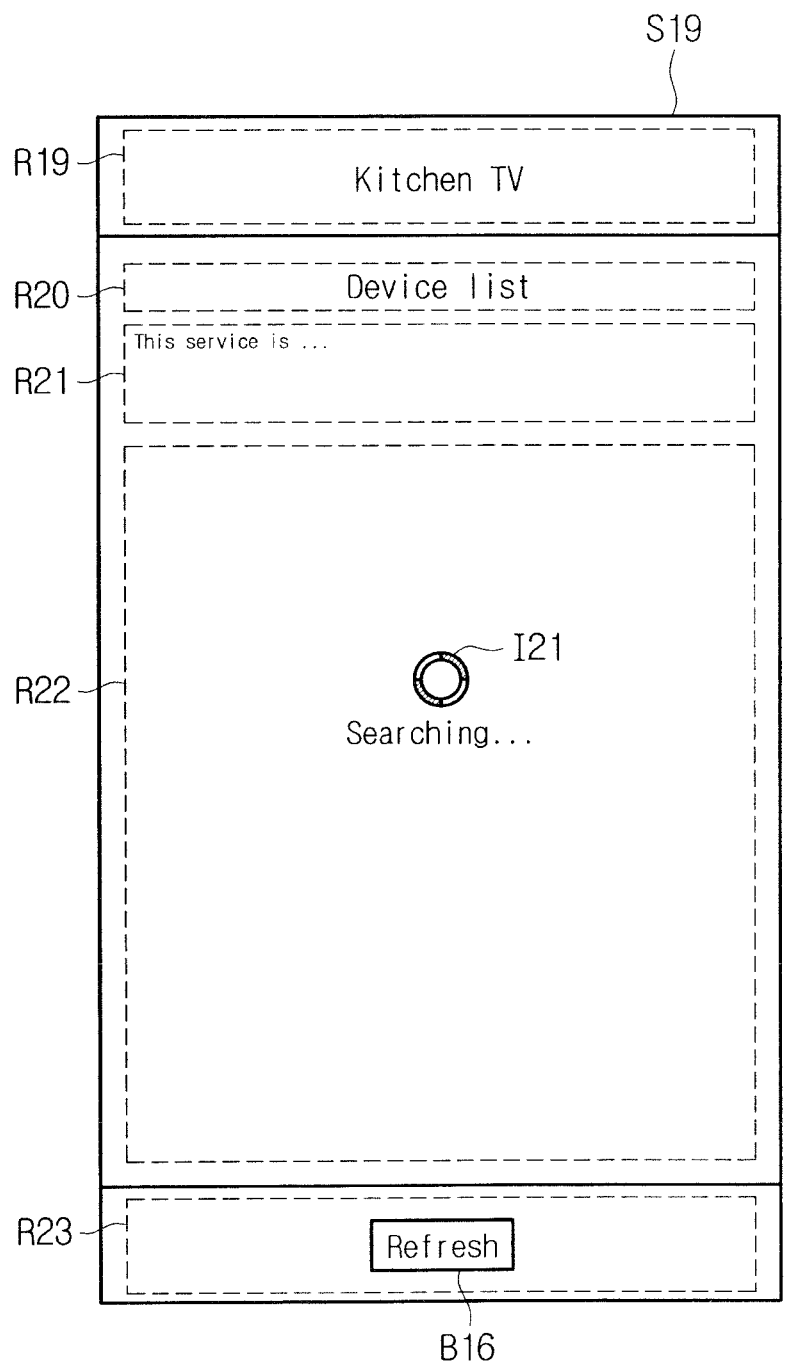
FIG. 46 is a view illustrating a device search screen image.
Figure 47:
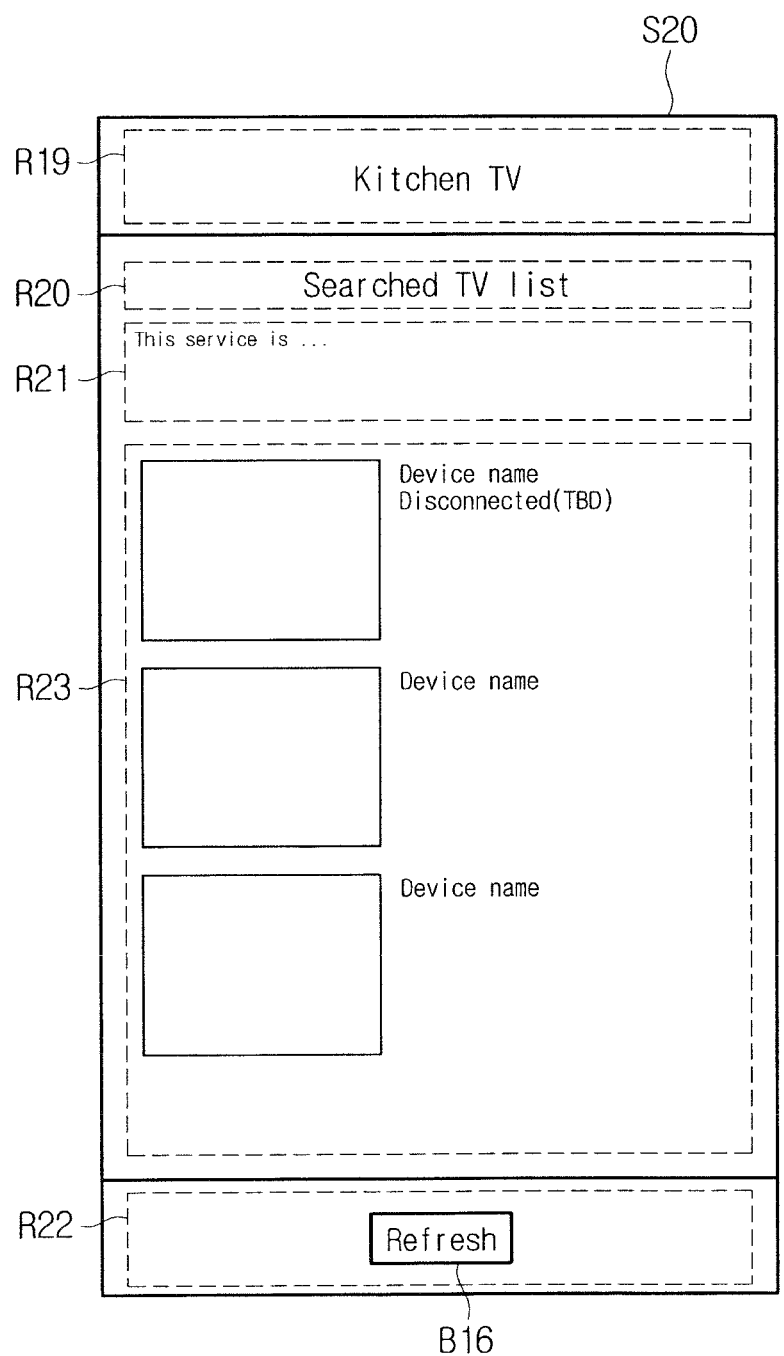
FIG. 47 is a view illustrating an exemplary channel search screen image for a display device.
Figure 48:
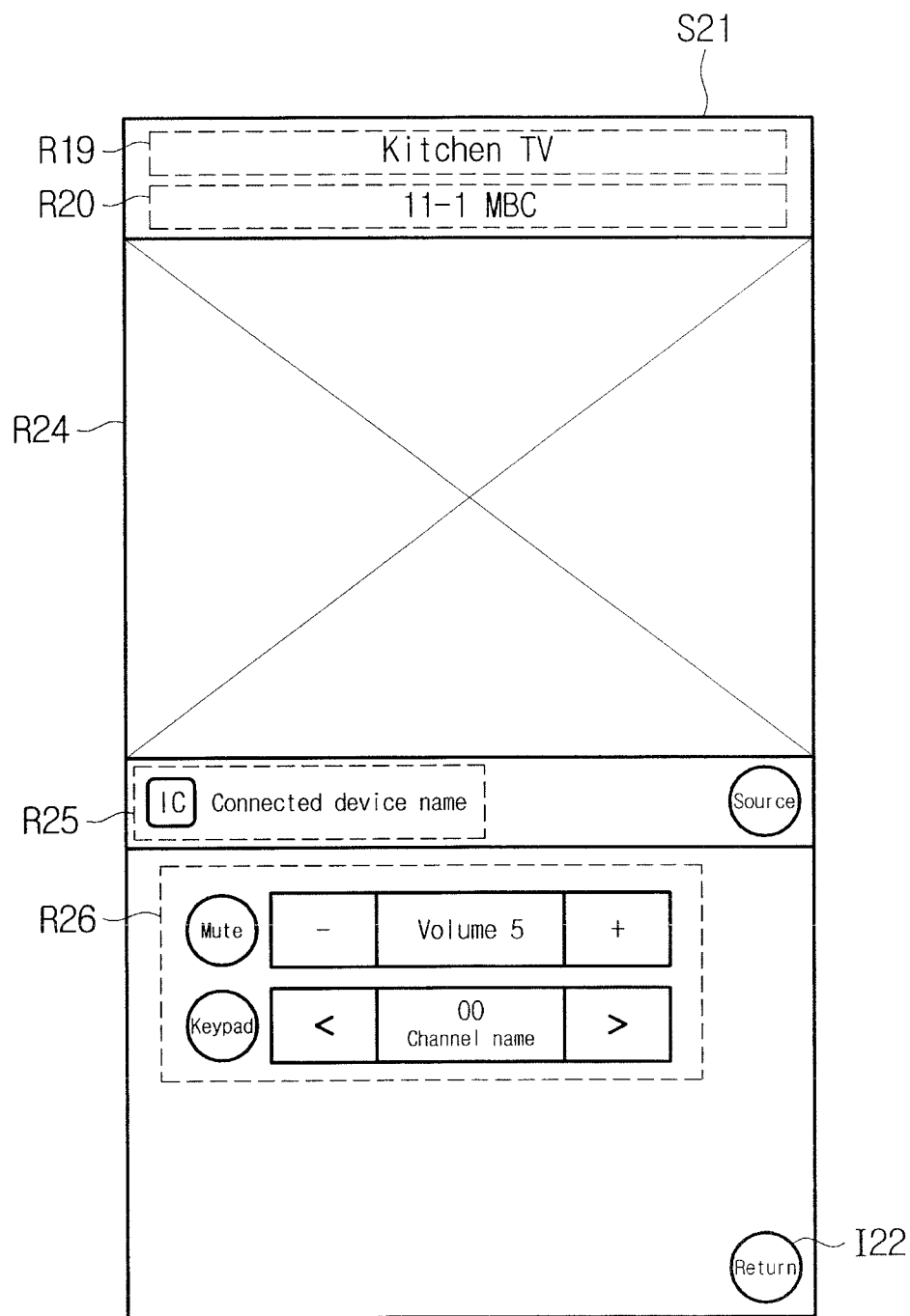
FIG. 48 is a view illustrating an exemplary set-top box screen image of a single channel

FIGS. 46 to 48 are exemplary views illustrating the principal screen images of the application supporting the mirroring function.

FIG. 46 is a view illustrating the device search screen image S19, FIG. 47 is a view illustrating the channel search screen image of the display device 600, and FIG. 48 is a view illustrating the set-top box (STB) screen image S21 for a single channel Referring to FIG. 46, the device search screen image S19 may include a title region R19, a subtitle region R20, a description region R21, a search region R22, and a re-search button region R23.

The title region R19 may be provided at the uppermost part of the device search screen image S19, and may display the name (e.g., "Kitchen TV") of a current execution application.

The subtitle region R20 may be provided at the lower end of the title region R19, and may display the name (e.g., "Searched TV list") of a current execution application.

The description region R21 may be located at the lower end of the subtitle region R20, and may provide text or images for describing detailed content of the current execution application screen image.

The search region R22 may be provided at the center of the device search screen image S19, and the search icon (I21) for indicating that the refrigerator 1c is searching for the devices located in the vicinity of the refrigerator 1c may be displayed on the search region R22. The search icon (I21) may be provided in the form of images or animation images.

The re-search button region R23 may be located at the lowermost part of the connection screen image, and the re-search button B16 for re-searching for the device may be provided in the re-search button region R23. While the refrigerator 1c is searching for the device located in the vicinity of the refrigerator 1c, the re-search button B16 may be deactivated. If the searching of the peripheral device is completed, the re-search button B16 may be activated.

If the searching of the peripheral device of the refrigerator 1c is completed, the device search screen image S19 of FIG. 46 may be switched to the channel search screen image S20 of FIG. 47.

Referring to FIG. 47, the channel search screen image may include a title region R19, a subtitle region R20, a description region R21, a device list display region R23, and a re-search region R22. In association with the title region R19, the subtitle region R20, the description region R21, and the re-search region R22, the same description as in FIG. 47 will herein be omitted for convenience of description.

The images and titles of the searched devices may be displayed on the device list display region R23. If the plurality of devices is searched, all the corresponding devices may be displayed. In accordance with the embodiment, if the devices are not searched, the message indicating that no device is searched may be displayed.

If the user touches at least one of the device lists of the channel search screen image S20, the device search screen image S19 of FIG. 47 may be switched to the set-top box (STB) screen image S21 of FIG. 48.

Referring to FIG. 48, the STB screen image S21 may include a title region R18, a subtitle region R20, a screen display region R24, a device information provision region R25, and a control region R26. In accordance with the embodiment, the channel search screen image S20 may also display the return icon (I22) for returning to the channel search screen image S20. In association with the title region R19, the same description as in FIG. 47 will herein be omitted for convenience of description.

The subtitle region R20 may be provided at the lower end of the title region R19, and the current provision channel information (e.g., a channel number, a channel title, etc.) may be displayed on the subtitle region R20.

The screen display region R24 may be provided at the lower end of the subtitle region R20, and may provide the mirroring screen image for the display device 600. In other words, the same screen image as the current display device 600 may also be displayed on the screen display region R24.

The device information provision region R25 may be provided at the center of the STB screen image S21, and may display information regarding the display device 600 connected to the refrigerator 1c. For example, although the image of the display device 600 and the name of the connected display device 600 may be displayed on the device information provision region R25, and the scope of exemplary displayable information is not limited thereto.

The control region R26 may be provided at the lower end of the STB screen image S21, and the control tool for controlling the mirroring screen image of the screen display region may be provided in the control region. The user may control the on or off operation of the mirroring screen image using the control tool, or may control the channel or volume. In the meantime, the scope of the control region R26 is not limited to the above-mentioned example, and various control methods can be made available according to the design of the control tool.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A refrigerator comprising:
   a proximity sensor;
   a display;
   a microphone;
   a main body including at least one or more chambers;
   at least one chamber door including the proximity sensor, the display and the microphone, and coupled to the main body via a hinge; and
   at least one processor configured to:
      based on a first predetermined condition being detected by the proximity sensor while the refrigerator is in a voice recognition deactivation state and the display is turned off, control the display to display a first screen of a voice control screen, the first screen indicating a voice recognition preparation step of a voice recognition activation state,
      based on a first voice command being received by the microphone while the refrigerator is in the voice recognition activation state and the first screen being displayed, control the display to display a second screen of the voice control screen, the second screen indicating a voice processing step of the voice recognition activation state and being different from the first screen, perform a function associated with the first voice command, after performing the function associated with the first voice command, switch from the voice recognition activation state to the voice recognition deactivation state, based on a predetermined voice signal being received by the microphone while the refrigerator is in the voice recognition deactivation state, control the display to display the first screen indicating the voice recognition preparation step of the voice recognition activation state, based on a second voice command being received by the microphone while the refrigerator is in the voice recognition activation state, control the display to display the second screen indicating the voice processing step of the voice recognition activation state, and based on a second predetermined condition being satisfied, control the display to display temperature information of at least one of the one or more chambers of the main body.

2. The refrigerator of claim 1, wherein the first predetermined condition comprises detecting an initiation of access to the refrigerator in a sensing region of the proximity sensor.

3. The refrigerator of claim 1, wherein the second screen includes images of text and an animation according to a progress of the voice processing step.

4. The refrigerator of claim 1, wherein the at least one processor is further configured to:

after controlling the display to display the second screen indicating the voice processing step, control the display to display a third screen indicating a result providing step of the voice recognition activation state.

5. The refrigerator of claim 1,
wherein the second predetermined condition comprises detecting a change in a state of the at least one chamber door, and
wherein the state of the at least one chamber door including an open state or a closed state.

6. The refrigerator of claim 1, wherein the at least one processor is further configured to:
based on a voice recognition deactivation command being received while the refrigerator is in the voice recognition activation state, switch from the voice recognition activation state to the voice recognition deactivation state.

7. The refrigerator of claim 6, wherein the voice recognition deactivation command includes a state change of the at least one chamber door.

8. The refrigerator of claim 1, further comprising:
a control panel including at least one button at a front surface of the at least one chamber door,
wherein the display is integrated into the control panel and the at least one button is disposed separately from the display.

9. The refrigerator of claim 1, wherein the at least one processor is further configured to:
based on an input for changing a power consumption parameter being received, apply an energy saver function to change a power consumption pattern of the refrigerator.

10. The refrigerator of claim 1, wherein the one or more chambers of the main body include an upper chamber and a lower chamber.

11. The refrigerator of claim 10, wherein the at least one chamber door includes a first door and a second door associated with the upper chamber and a third door associated with the lower chamber.

12. The refrigerator of claim 11, wherein the proximity sensor, the display, and the microphone are disposed in the second door associated with the upper chamber.

13. The refrigerator of claim 12, wherein the first door is disposed on a left side of the upper chamber and the second door is disposed on a right side of the upper chamber.

14. The refrigerator of claim 1, wherein the at least one processor is further configured to:
control the display to display information associated with a temperature of the at least one chamber.

15. The refrigerator of claim 14, wherein the display information associated with the temperature of the at least one chamber includes information for setting a temperature of the at least one chamber.

16. The refrigerator of claim 1, wherein the at least one processor is further configured to:
in a case that a predetermined time has elapsed, control the display to turn off.

17. The refrigerator of claim 1, wherein the at least one processor is further configured to:
in response to a third predetermined condition being detected, control the display to turn on.

18. The refrigerator of claim 17, wherein the third predetermined condition includes at least one of detecting a change of state of the at least one chamber door to an open position, detecting an input associated with the at least one chamber door, or detecting an input using the proximity sensor.

19. The refrigerator of claim 1, wherein the voice control screen includes a visual indicator comprising at least one of text or animation image indicating that the refrigerator is in the voice recognition preparation step.

20. The refrigerator of claim 19, wherein the second screen includes a visual indicator comprising at least one of text or animation indicating that the refrigerator is in the voice processing step.

* * * * *